US009444597B2

United States Patent
Ode

(10) Patent No.: US 9,444,597 B2
(45) Date of Patent: Sep. 13, 2016

(54) WIRELESS COMMUNICATION SYSTEM AND COMMUNICATION METHOD

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 268 days.

(21) Appl. No.: 14/177,415

(22) Filed: Feb. 11, 2014

(65) Prior Publication Data

US 2014/0204871 A1 Jul. 24, 2014

Related U.S. Application Data

(63) Continuation of application No. PCT/JP2011/068475, filed on Aug. 12, 2011.

(51) Int. Cl.
| | |
|---|---|
| *H04W 4/00* | (2009.01) |
| *H04B 7/216* | (2006.01) |
| *H04L 1/00* | (2006.01) |
| *H04L 5/00* | (2006.01) |
| *H04B 7/02* | (2006.01) |
| *H04W 24/00* | (2009.01) |
| *H04L 27/26* | (2006.01) |

(52) U.S. Cl.
CPC ............... *H04L 5/005* (2013.01); *H04B 7/024* (2013.01); *H04L 5/0035* (2013.01); *H04W 24/00* (2013.01); *H04L 27/2607* (2013.01)

(58) Field of Classification Search
CPC . H04L 5/005; H04L 5/0035; H04L 27/2607; H04B 7/024; H04W 24/00
See application file for complete search history.

(56) References Cited

U.S. PATENT DOCUMENTS

| | | | |
|---|---|---|---|
| 2011/0064060 A1* | 3/2011 | Suga et al. | 370/335 |
| 2012/0140660 A1* | 6/2012 | Kang et al. | 370/252 |
| 2014/0146788 A1* | 5/2014 | Wallentin et al. | 370/331 |

FOREIGN PATENT DOCUMENTS

| | | | |
|---|---|---|---|
| JP | 2009-225137 | 10/2009 | |
| JP | 2010-040832 | 2/2010 | |
| JP | 2010-239417 | 10/2010 | |
| WO | 2010-005036 | 1/2010 | |
| WO | 2010-016607 | 2/2010 | |
| WO | 2010-134792 | * 11/2010 | |

(Continued)

OTHER PUBLICATIONS

JPOA—Office Action mailed on Apr. 28, 2015 issued with respect to the corresponding Japanese Patent Application No. 2013-528856, with partial English translation.

(Continued)

*Primary Examiner* — Kiet Tang
(74) *Attorney, Agent, or Firm* — Fujitsu Patent Center

(57) ABSTRACT

A wireless communication system includes a primary base station; a plurality of base stations other than the primary base station; and a mobile station. Coordinated communication is executed among the primary base station, the base stations, and the mobile station. When configuring a set of one or more transmission stations and one or more reception stations of the coordinated communication, one of the reception stations of the coordinated communication transmits information about a result of measuring a known signal as a pilot from the transmission stations in response to request signals from the other base stations, respectively, to the primary base station.

10 Claims, 44 Drawing Sheets

(56) References Cited

FOREIGN PATENT DOCUMENTS

| WO | 2010-150463 | 12/2010 |
|---|---|---|
| WO | 2011-052067 | 5/2011 |

OTHER PUBLICATIONS

3GPP TR 36.912 V9.3.0, 3rd Generation Partnership Project; Technical Specification Group Radio Access Network; "Feasibility study for Further Advancements for E-UTRA (LTE-Advanced) (Release 9)", "Annex A: Simulation model A.2 CoMP assumption for evaluation" (Jun. 2010).

3GPP TR 36.814 V9.0.0, 3rd Generation Partnership Project; Technical Specification Group Radio Access Network; Evolved Universal Terrestrial Radio Access (E-UTRA); "Further Advancements for E-UTRA Physical Layer Aspects (Release 9)", (Mar. 2010).

3GPP TS 36.211 V8.9.0, "6.2.3 Resource blocks", Release 8 (Dec. 2009).

International Search Report, mailed in connection with PCT/JP2011/068475 and mailed Nov. 15, 2011.

\* cited by examiner

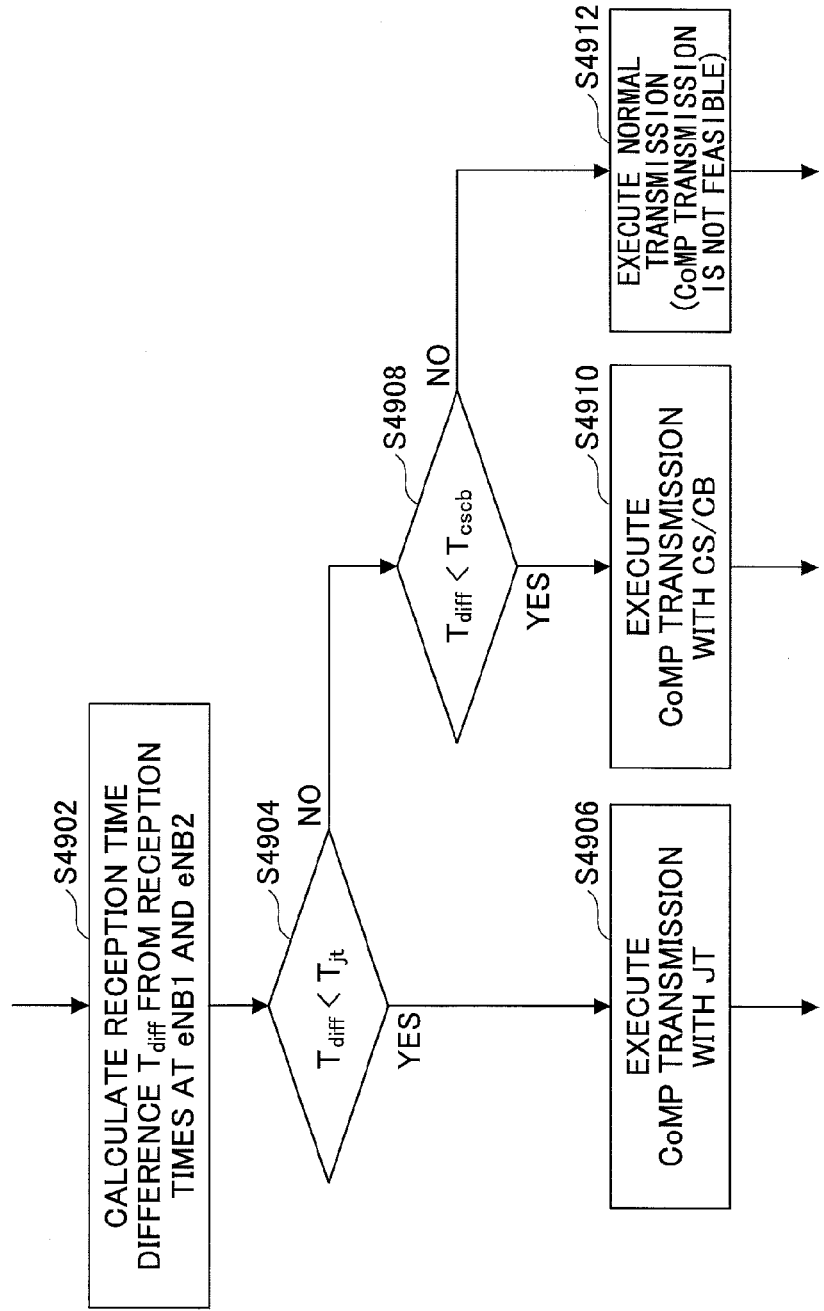

WIRELESS COMMUNICATION SYSTEM AND COMMUNICATION METHOD

CROSS-REFERENCE TO RELATED APPLICATIONS

This application is a continuation application of International Application PCT/JP2011/068475 filed on Aug. 12, 2011 and designated the U.S., the entire contents of which are incorporated herein by reference.

FIELD

The disclosures herein generally relate to a wireless communication system.

BACKGROUND

Specifications of the LTE (Long Term Evolution) system and LTE-Advanced system are under investigation in 3GPP (3rd Generation Partnership Project).

In Japan, a specification of LTE is defined as the LTE Rel '8, and the service has started in December, 2010.

Also, the specification of the LTE Rel '9 is being defined with additional functions of MBMS (Multimedia Broadcast Multicast Service). A specification of the LTE-Advanced system, which is an advanced version of the LTE system, has been investigated as LTE Rel '10.

Moreover, investigation of the LTE Rel '11 has been also started. As one of the technologies that are considered to be introduced into the LTE Rel '11, CoMP (Coordinated Multi-Point transmission and reception) technology is known (see, for example, Non-Patent Document 1). In the following, coordinated multi-point transmission and reception will be referred to as "CoMP transmission".

CoMP transmission will be described below.

CoMP transmission is a technology for a plurality of base stations to execute coordinated transmission and reception for communications between a user terminal and the plurality of base stations. CoMP is also called "coordinated communication". CoMP and coordinated communication means the same unless otherwise stated, hereafter.

It is also known that objects of CoMP transmission include network MIMO, SDM (Spatial Division Multiplex), ICIC (Inter-Cell Interference Coordination or Inter-Cell Interference Cancelation) (see, for example, Non-Patent Document 2).

Therefore, depending on an object of CoMP transmission, the following embodiments are under investigation.

For example, for downlink transmission, JP (Joint Processing) and CS/CB (Coordinated Scheduling/Coordinated Beamforming) are under investigation. For uplink transmission JR (Joint Reception) and CS (Coordinated Scheduling) are under investigation (see, for example, Non-Patent Document 3).

With JP, data is transmitted from a plurality of base stations. With JP, JT (Joint Transmission), DCS (Dynamic Cell Selection), and the like are considered.

With CS/CB, for example, scheduling for transmission from a terminal is coordinated between a first base station and a second base station where the first base station covers a certain cell, and the second base station covers a cell adjacent to or overlapping with the cell covered by the first base station, and the terminal is positioned around an edge of one or more of the cells.

Interference can be reduced with coordinated scheduling or with coordinated forming of an antenna beam (called "beam", "beamforming", hereafter). The former is called "CS" and the latter is called "CB".

JR includes technologies for executing coordinated reception of a radio wave from a user terminal (transmission side) at a reception side configured with a plurality of base stations, or for executing the same reception method.

For example, JR includes a technology that executes MIMO reception at a plurality of base stations via a network, or executes reception diversity among base stations.

DCS transmits data from one transmission point in a CoMP Cooperating set at a certain time. A CoMP Cooperating set is a set of transmission points from which the same or different data is transmitted at the same time. DCS is one of the methods for interference control or ICIC.

Specifically, data is transmitted from a base station to a user terminal at time T, and data is transmitted from another base station to the same user terminal at time T+1. Namely, the other base station may transmit data to another user terminal at time T+1. By separating transmitting base stations by time in this way, it is possible to reduce interference.

JT transmits the same or different data at the same time to a user terminal from a plurality of transmission points. A set of transmission points is called a "CoMP cooperating set". Also, coordinated transmitting of data among transmission points improves reception characteristics at a user terminal. Also, precoding may be executed to reduce interference from another user terminal.

If different pieces of data are transmitted from a plurality of base stations, respectively, it is called Network MIMO. Network MIMO can improve downlink transmission speed. Also, if the same data is transmitted, downlink transmission quality can be improved.

JT is under investigation to be used for communication between sectors that are covered by a base station, or communication between different base stations.

CoMP transmission described above differs from macro diversity in general. Macro diversity in general includes transmission diversity between base stations.

1) W-CDMA, DHO (Diversity Handover), which is adopted for downlink data transmission in a wireless communication system such as PDC or the like, SHO (Soft Handover), and macro diversity assume that the same data is transmitted to a plurality of base stations. Based on the assumption that the same data is transmitted to a plurality of base stations, the same data is distributed to the plurality of base stations from an upper apparatus in advance.

Therefore, it is not necessary for the base stations to transmit (transfer) the data to be transmitted with each other.

On the other hand, with CoMP transmission, data is transmitted only to a serving base station from an upper apparatus. Therefore, the serving base station needs to transfer the data to non-serving base stations.

2) The upper apparatus does not transmit the data to the non-serving base stations. Usually, for downlink data transmission, data is transmitted to a base station via an upper apparatus. If the data is transmitted from the upper apparatus to the base station without an error, the data transmitted to the base station is deleted at the upper apparatus. Therefore, the data transmitted from the upper apparatus to the base station without an error cannot be transmitted to the non-serving base stations. Therefore, for downlink CoMP transmission, the serving base station needs to transmit the downlink transmitting data to the non-serving base station.

3) If considering to use macro diversity and the like, it is a system wide selection whether to use the macro diversity. Namely, base stations cannot determine whether to use the macro diversity individually. On the other hand, with CoMP transmission, an individual base station can determine whether to use CoMP transmission.

Also, in the LTE system, two types of CPs (Cyclic Prefixes), normal CP and extended CP, are defined (see, for example, Non-Patent Document 4).

Specifically, for example, a downlink normal CP is calculated as follows.

Normal Cyclic Prefix $T_{cp}=160 \times T_s$ (1st symbol)

$T_{cp}=144 \times T_s$ (2nd symbol to 6th symbol)

Extended Cyclic Prefix $T_{cp}=512 \times T_s$ (1st symbol to 6th symbol)

here, "$T_{cp}$" represents a CP length. CP length may be represented by time.

$T_s=1/(2048 \times \Delta f)=32.552$ ns

Therefore, if $\Delta f=15$ kHz, the normal CP is 5.21 μs or 4.69 μs, and the extended CP is 16.67 μs. Here, in the following description, although it is assumed that the normal CP is 4.69 μs for the sake of simplicity, it is substantially the same as 5.21 μs.

An extended CP is set longer than a normal CP in terms of time to prevent communication quality from degrading when propagation delay increases. Therefore, it is used with a large cell radius in the suburbs or the like, or with MBSFN (Multicast-Broadcast over Single-Frequency Network), which transmits MBMS data and receives and combines a lot more transmission waves from a plurality of base stations. Also, whether to use the normal CP or the extended CP is notified by the base station as system information. For example, in an LTE system, communication is specified in units of subframes in which a subframe transmitting data for MBSFN and a subframe transmitting normal data are used with time-division multiplexing. To make it possible for a user terminal to receive and combined MBSFN subframes transmitted from a plurality of base stations, the extended CP is used. When transmitting a MBSFN subframe, it is notified to a user terminal whether it is a MBSFN subframe in advance, the user terminal can identify that it is a normal CP or an extended CP. Also at the transmission side, a selected subframe can be transmitted as a MBSFN subframe for MBMS data with an extended CP. In this way, the CP to be used can be controlled.

Here, in an LTE system, a wireless frame of 10 ms is partitioned into 20 slots (0.5 ms), and two slots constitute one subframe (1.0 ms).

RELATED-ART DOCUMENTS

Non-Patent Documents

[Non-Patent Document 1] TR36.912 V9.3.0, "Feasibility study for Further Advancements for E-UTRAN (LTE-Advanced) (Release 9)"
[Non-Patent Document 2] TR36.814 V9.0.0, "Further Advancements for E-UTRAN Physical Layer Aspects (Release 9)"
[Non-Patent Document 3] TR36.912 V9.3.0, "Annex A: Simulation model A.2 CoMP assumption for evaluation", 2010 June
[Non-Patent Document 4] TS36.211 V8.9.0, "6.2.3 Resource blocks", 2009 December Although the specification specifies the concept of CoMP transmission, required functions are not specified for an actual implementation.

Also, in the study at 3GPP, the CP to be used for CoMP transmission is not discussed.

SUMMARY

According to at least one embodiment of the present invention, a wireless communication system includes a primary base station; a plurality of base stations other than the primary base station; and a mobile station. Coordinated communication is executed among the primary base station, the base stations, and the mobile station. When configuring a set of one or more transmission stations and one or more reception stations of the coordinated communication, one of the reception stations of the coordinated communication transmits information about a result of measuring a known signal as a pilot from the transmission stations in response to request signals from the other base stations, respectively, to the primary base station.

BRIEF DESCRIPTION OF DRAWINGS

FIG. 49 illustrates an example of operation of a wireless communication system according to an embodiment.

DESCRIPTION OF EMBODIMENTS

Figure 1:
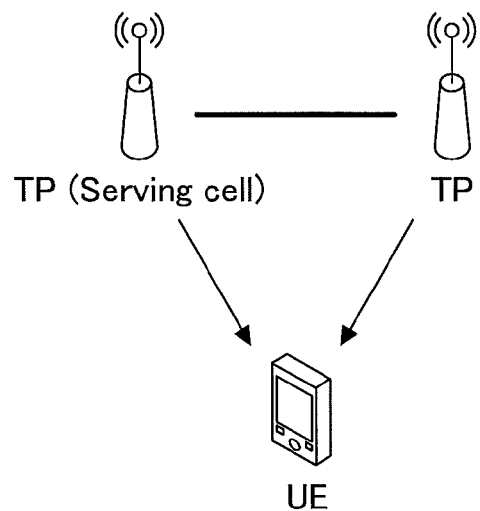
FIG. 1 illustrates an example of a wireless communication system according to an embodiment.

Next, embodiments of the present invention will be described with reference to the drawings. Here, throughout the drawings for describing the embodiments, elements having the same functions are assigned the same numeral codes, and their description may not be repeated.

According to at least one embodiment of the present invention, CoMP transmission can be executed.

A wireless communication system will be described according to an embodiment.

The wireless communication system includes a primary base station eNB1, a base station eNB2 subordinate to the primary base station eNB1, and a user terminal (UE: User Equipment).

In the wireless communication system, CoMP transmission is executed between the primary base station eNB1 or the base station eNB2 and the user terminal.

The primary base station eNB1 is also called a "serving base station". Also, the base station eNB2 subordinate to the base station eNB1 is called a "non-serving base station".

The serving base station eNB1 may be a base station that transmits a control signal for executing CoMP transmission when executing CoMP transmission. Also, the non-serving base station eNB2 may be a base station that does not transmit a control signal for executing CoMP transmission when executing CoMP transmission.

The serving base station eNB1 may be a base station to be communicated with or to be connected with when executing CoMP transmission. Also, the non-serving base station eNB2 may be a base station that is added for executing CoMP transmission when executing CoMP transmission.

Also, the serving base station eNB1 may be called a "first base station". Also, the non-serving base station eNB2 may be called a "second base station".

Also, the area covered by the serving base station eNB1 may be called a "serving cell". Also, the area covered by the non-serving base station eNB2 may be called a "non-serving cell." Each of the base stations called as above has a wireless communication band and configures a single service area. A service area is also called a "cell". A serving cell or a non-serving cell may be a cell that complies with the definition of a cell in 3GPP.

Also, the area covered by the serving base station may be called a serving cell or a serving sector. Also, the area covered by the non-serving base station may be called a non-serving cell or a non-serving sector. Each of the base stations called as above has a wireless communication band and covers a plurality of areas. The service area is also called a "cell" or a "sector". Also, each of the base stations called as above may have a plurality of wireless communication bands and cover a plurality of areas. Also, with CoMP transmission, only the serving cell and the serving sector may receive transmission data from an upper apparatus. Therefore, it is required to transfer the transmission data from the serving cell to the non-serving cell, or the serving sector to the non-serving sector.

The serving base station eNB1 controls CoMP transmission. CoMP transmission includes uplink transmission from the user terminal UE to the base stations and downlink transmission from the base stations to the user terminal UE. Also, the serving base station eNB1 notifies a control signal to the user terminal UE that is required for CoMP transmission using a physical downlink control channel (PDCCH: Physical Downlink Control CHannel). The serving base station eNB1 is a base station that transmits the control signal to the user terminal UE. The serving base station eNB1 may be determined system wide in a wireless communication system, or may be determined for each user terminal UE.

Downlink data is transmitted to the user terminal UE from both of or one of the serving base station eNB1 and the non-serving base station eNB2 using a physical downlink shared channel (PDSCH: Physical Downlink Shared Channel).

Uplink data is transmitted to both of or one of the serving base station eNB1 and the non-serving base station eNB2 using a physical uplink shared channel (PUSCH: Physical Uplink Shared CHannel).

A shared channel is a channel in which a wireless resource included in the shared channel is used with at least one of time-division multiplexing and frequency-division multiplexing among user terminals UE. A common channel is a channel used for transmitting the same data to a plurality of user terminals UE, which differs from a shared channel. In a system performing wireless communication according to LTE (called an "LTE system", hereafter), a resource block (RB) is defined that is configured with six or seven symbols in the time direction and 12 subcarriers in the frequency direction. In an LTE system, a wireless channel is shared by allocating wireless resources to user terminal UEs with a resource block as a minimum unit.

A procedure for starting CoMP transmission will be described.

Suppose that the user terminal UE moves to the edge of the cell (called the "cell edge", hereafter) covered by the serving base station eNB1. At this moment, for example, a radio wave transmitted by the serving base station eNB1 attenuates while propagating from the serving base station eNB1 to the user terminal UE. This makes it inevitable that a reception characteristic is degraded at the user terminal UE that receives the radio wave transmitted by the serving base station eNB1. As a result of degradation of the reception characteristic of the radio wave, a transmission characteristics (transmission speed) degrades between the serving base station eNB1 and the user terminal UE. Degradation of the transmission characteristics may cause a fault in which a communication channel is disconnected, required transmission speed is not satisfied, or the like.

To reduce degradation of the transmission characteristics, the following method is considered.

The user terminal UE measures reception power of radio waves from non-serving base stations eNB2-eNBm (m is an integer where m>1) other than the serving base station eNB1. The user terminal UE compares the reception power of a radio wave from the serving base station eNB1 currently connected with the reception power of the radio waves from the non-serving base stations eNB2s eNB2-eNBm, and executes a handover to a base station eNBn (n is an integer where 0<n<m+1) that has the maximum reception power.

When measuring the reception power, the user terminal UE receives pilot signals that are transmitted from the respective base stations eNB1-eNBm to measure the power (reception power) of the received signals, or the pilot signals. In an LTE system, a reference signal (RS) is used as a pilot signal. The user terminal UE may measure the reception power of a reference signal. The user terminal UE notifies the measurement results of the reception power to the serving base station eNB1. The serving base station eNB1 determines whether to execute a handover for the user terminal UE based on the measurement results of the reception power notified by the user terminal UE. Moreover, if the serving base station eNB1 determines to execute the handover for the user terminal UE, the serving base station eNB1 determines which base station is used for the handover. If the serving base station eNB1 determined to execute the handover, the serving base station eNB1 notifies that a handover is to be executed to the base station used for the handover and the user terminal UE. By notifying from the serving base station eNB1 to the base station used for the handover and the user terminal UE that the handover is executed, the handover can be executed.

However, even if the handover is executed, there may be a case where a difference between the reception power of the radio wave at the destination base station of the handover and the reception power of the radio wave at a base station before handover is small. Namely, it is highly likely that the edge of the cell covered by the base station eNB1 is also the edge of a cell covered by the other base station eNBn. If the difference of the reception power is small, improvement of the transmission characteristics is small even if the handover is executed. As a result of small improvement of the transmission characteristics, an effect of the handover is small. Namely, there is a likelihood that the transmission characteristics may not be improved even if a handover is executed.

By executing CoMP transmission, it is possible to improve the transmission characteristics when the user terminal UE is positioned at the edge of a cell.

To execute CoMP transmission, the user terminal UE measures the reception power of radio waves from the base stations, as similarly done with a handover, then notifies the measurement results of the reception power to the serving base station eNB1. In response to receiving the measurement results of the reception power, the serving base station eNB1 selects a base station for executing CoMP transmission based on the reception power from the base stations. Assume here that the base station eNBn is selected as a base station for executing CoMP transmission. By selecting a base station for executing CoMP, the serving base station eNB1 and the non-serving base station eNBn are specified.

A base station with the maximum reception power may be selected as a base station for executing CoMP transmission among base stations other than the base station that is currently connected with. Also, a base station for executing CoMP transmission may be selected by calculating differences of the reception power between the reception power from the base station currently connected with and the reception power from other base stations, respectively, then selecting a base station that has a difference of the reception power less than a threshold value of reception power difference.

According to the present embodiment of the wireless communication system, a method of CoMP transmission is selected for executing CoMP transmission. Methods of CoMP transmission include JP, CS and CB. JP includes JT and Dynamic Cell Selection (DCS).

Moreover, a CP is set that is added to transmission data. Specifically, the CP may have a predetermined fixed CP length. The CP may be the normal CP or the extended CP. Also, the CP may be a CP that has a length other than that of the normal CP or the extended CP. The CP may be set for each occurrence of wireless communication. The CP may be set for each service of wireless communication. The CP may be set for each provider(operator) of wireless communication. The CP may be set for each cell. The CP may be set for each country or region.

FIG. 1 illustrates a wireless communication system according to an embodiment.

The wireless communication system in FIG. 1 uses JP. As described above, with JP, data is transmitted to a user terminal UE from a plurality of base stations TP (Transmission Points). FIG. 1 illustrates an example in which data is transmitted from two TPs to the user terminal UE. One of the two TPs is a serving cell.

Figure 2:
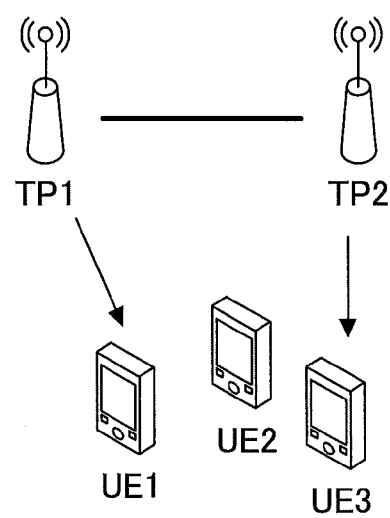
FIG. 2 illustrates an example of a wireless communication system according to an embodiment.

FIG. 2 illustrates a wireless communication system according to an embodiment.

The wireless communication system in FIG. 2 uses CS/CB. As described above, scheduling for transmission from a terminal is coordinated between a first base station TP1 and a second base station TP2 where the first base station TP1 covers a certain cell, and the second base station TP2 covers a cell adjacent to the cell covered by the first base station TP1. The second base station TP2 may cover a cell overlapping with the cell covered by the first base station TP1. Interference can be reduced with coordinated scheduling or with coordinated antenna beamforming.

Instead of reception power, CPICH (Common Pilot Indicator CHannel), RSCP (Received Signal Code Power), CPICH $E_C/N_0$, RSRP (Reference Signal Received Power), or RSRQ (Reference Signal Received Quality) may be used for selecting a serving base station and a non-serving base station. Reception power, RSCP, RSRP, and the like may be considered together as wireless channel quality. Also, reception power, RSCP, RSRP, and the like may be discretized to be handled as wireless channel quality information similar to wireless channel quality.

Here, similarly to a W-CDMA system, a CPICH may be a channel that transmits a pilot signal transmitted from a base station to a user terminal UE. RSCP may be signal power per code that corresponds to a spread code of a CPICH. Also, EC/N0 is a ratio between energy per chip of a spread signal and noise power density per Hz, which may be simply interpreted as SNR.

Also, similarly to an LTE system, RSRP may be the reception power of a Reference Signal (pilot signal in general), which may be considered to correspond to CPICH RSCP. Moreover, RSRQ may be considered to correspond to CPICH $E_C/N_0$.

In a wireless communication system using wireless channel quality such as reception power or the like, a serving base station and a non-serving base station are selected to execute CoMP transmission, which are determined to be feasible for executing CoMP transmission.

For example, with JT, which is one of the methods of CoMP transmission, signal transmission is executed at a transmission side that is constituted with a plurality of base stations in a coordinated way. Moreover, it is under investigation that JT may be executed as multi base station transmission diversity, or executed as what-is-called "network MIMO". Multi-base station transmission diversity is also called "transmission site diversity" or "transmission macro diversity". Multi-base station diversity is also called transmission diversity, transmission macro diversity or the like. Network MIMO is also called multi-sector MIMO, multi base station MIMO, or the like. Multi-base station MIMO is also called multi-cell MIMO. Here, network MIMO will be described as an example.

If a plurality of base stations execute MIMO transmission, reception timings at a user terminal need to be identical for the MIMO transmission from the base stations, or MIMO reception cannot be executed. Assuming reception timings are identical, it is possible to separate streams by assigning weights to the streams and estimating wireless channel. In other words, a stream is a sequence of transmission data elements. Here, a stream differs from a generic word of "stream" (used in the field of wired communication services, especially), but a term specifically used for wireless transmission, especially, for spatially multiplexed transmission. For example, if the same data is transmitted as with transmission diversity, streams are the same, or if different sequences of data elements are transmitted as with MIMO transmission, a plurality of streams are set for each of the sequences of data elements.

If signals from a plurality of base stations cannot be received, the streams cannot be separated, which degrades the transmission characteristics.

Also, in a multiple access method using OFDMA such as an LTE system or terrestrial digital broadcasting, a guard interval (GI) or a cyclic prefix (CP) is inserted before a signal to avoid multipath interference and fading.

If a reception time difference is within the CP length, the received signal can be combined. Namely, the received signal cannot be combined if the reception time difference is greater than the CP length. Moreover, a received signal having a reception time difference greater than the CP length interferes with another received signal less than the CP length. Therefore, a received signal having a reception time difference greater than the CP length degrades the transmission characteristics. Therefore, if a reception time difference between base stations is greater than the CP length, CoMP transmission cannot be executed.

If a non-serving base station is selected without considering such a reception time difference between base stations, problems may arise in that the transmission characteristics are degraded when executing CoMP transmission, or the transmission characteristics do not improve better than a case where CoMP transmission is not executed. Moreover, there is a risk in that CoMP transmission may be executed even when the above problems occur.

It is considered that a reception time difference between base stations occurs for the following reasons.

1) Difference between the distance from a base station eNB1 to a user terminal UE and the distance from a base station eNBn to the user terminal UE.

Even if the cell radii of the base stations are all the same, the user terminal UE may not be at a equidistant position from the base stations. If the user terminal UE is not at an equidistant position from the base stations, the distances from the user terminal UE to the base stations differ from each other. Therefore, even if transmission is executed at the base stations at the same timing, propagation delays differ from each other due to the different distances. Due to different propagation delays, reception time differences are generated.

2) Difference between the propagation distance from the base station eNB1 to the user terminal UE and the propagation distance from the base station eNBn to the user terminal UE.

Even if the user terminal UE is at a equidistant position from the base stations and transmission is executed at the base stations at the same time, propagation delays may differ from each other due to different propagation paths. If propagation distances differ from each other, so do propagation delays. Due to different propagation delays, reception time differences are generated.

3) The base stations eNB1 and eNBn are not synchronized.

Even if the propagation distances from the base stations to the user terminal UE are the same, reception time differences are generated as long as the base stations are not synchronized and transmission is executed at different timings.

Although it is considered that synchronization between base stations is assumed in CoMP transmission, accuracy of the synchronization is not specified, which may virtually induce an asynchronous state.

A reception time difference between base stations obtained with measurement may be used for controlling CoMP transmission. This is because it is agreed that 3GPP LTE specifications may evolve in a direction where measurement of a reception time difference between base stations is included in the specifications.

Moreover, in a W-CDMA system or an LTE system, base stations are synchronized with accuracy with which reception time differences are contained within a certain limit. For example, downlink transmission timings are substantially the same. Base stations need to be synchronized especially for downlink transmission because MBSFN may be introduced in an LTE system.

A concrete method of controlling CoMP transmission will be described that uses a measured reception time difference between base stations.

For example, CoMP transmission may be controlled based on a reception time difference of downlink transmission at a user terminal UE. Also, CoMP transmission may be controlled based on a reception time difference of uplink transmission among a plurality of base stations.

<Controlling CoMP Transmission Based on a Reception Time Difference of Downlink Transmission>

Figure 3:
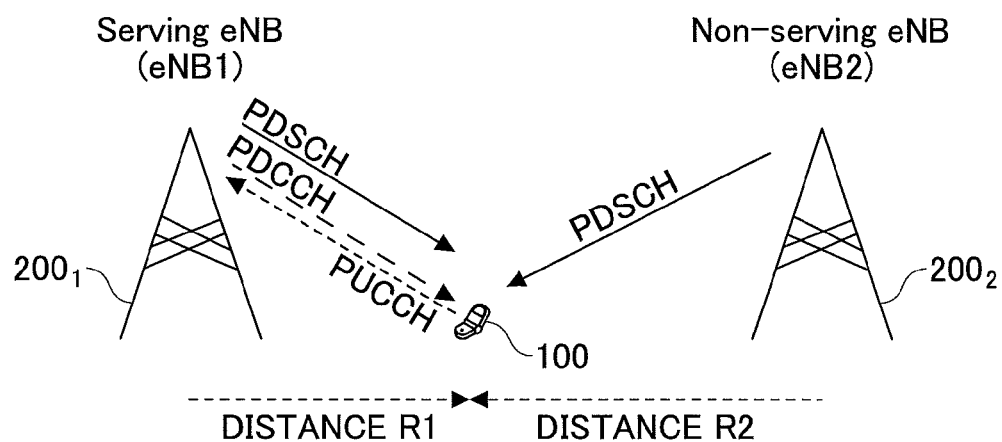
FIG. 3 illustrates an example of CoMP transmission according to an embodiment.

FIG. 3 illustrates a wireless communication system that controls CoMP transmission with a reception time difference of downlink transmission according to an embodiment.

The wireless communication system includes base stations $200_n$ (n is an integer where n>1) and a user terminal 100. FIG. 3 illustrates an example where n=2. It is substantially the same as other examples where n>2. In FIG. 3, the distance between the base station $200_1$ and the user terminal 100 is represented by "DISTANCE R1", and the distance between the base station $200_2$ and the user terminal 100 is represented by "DISTANCE R2". The user terminal 100 receives a PDSCH and a PDCCH from the base station $200_1$ and transmits a PUCCH to the base station $200_1$. The base station $200_2$ transmits a PDSCH to the user terminal 100.

The user terminal 100 communicating with the base station $200_1$ (eNB1) determines that CoMP transmission is required if it detects that transmission speed is reduced due to, for example, degradation of uplink transmission quality. Having determined that CoMP transmission is required, the user terminal 100 requests CoMP transmission to the base station $200_1$. Here, CoMP transmission may be determined to be required if the base station $200_1$ detects reduction of the transmission quality or the transmission speed.

In response to receiving the request for CoMP transmission, the base station $200_1$ requests to the user terminal 100 to measure reception power and a reception time difference of radio waves with the connected base station $200_1$ and the other base station $200_2$, and to report the measurement result to the base station $200_1$. A signal for requesting the measurement and report of the reception power and reception time difference is called a "measurement report request". Specifically, the user terminal 100 may receive pilot signals transmitted from the base stations $200_1$-$200_2$ to measure the reception power and reception time difference. The pilot signals include at least one of a common pilot signal and an individual pilot signal.

In response to receiving the measurement report request, the user terminal 100 measures the reception power of radio waves from the connected base station $200_1$ and the other base station $200_2$, respectively, to report the measurement result to the base station $200_1$.

Moreover, the user terminal 100 measures and calculates a reception time difference of the radio waves between the connected base station $200_1$ and the other base station $200_2$. The user terminal 100 notifies the measured and calculated result of the reception time difference to the connected base station $200_1$.

In response to receiving the notification of the measurement result of the reception power and reception time difference, the base station $200_1$ compares the reception time difference with a reception time difference with which CoMP transmission can be executed (called a "threshold value for reception time difference, hereafter).

Figure 4:
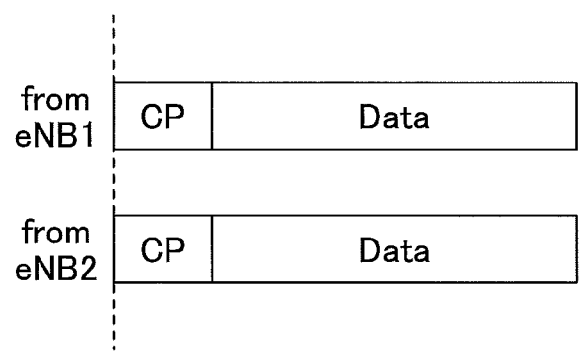
FIG. 4 illustrates an example of CoMP transmission according to an embodiment.

FIG. 4 illustrates a first example of a reception time difference at the user terminal 100. If the base stations $200_1$-$200_2$ are synchronized at symbol level, transmission timings of downlink signals at the base stations $200_1$-$200_2$ are substantially the same. Therefore, if the user terminal 100 is at an equidistant position from the base station $200_1$ and base station $200_2$, the propagation distances are the same, hence, the user terminal 100 receives the downlink signal from the base station $200_1$ and the downlink signal from the base station $200_2$ at substantially the same timing. Therefore, the reception time difference is virtually zero.

Figure 5:
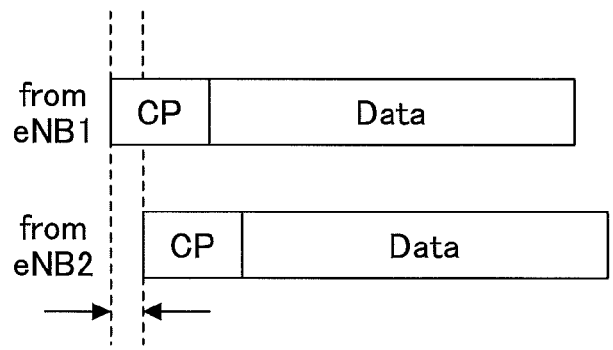
FIG. 5 illustrates an example of CoMP transmission according to an embodiment.
Figure 6:
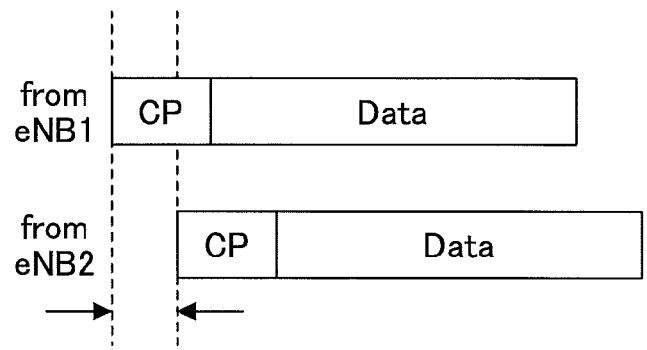
FIG. 6 illustrates an example of CoMP transmission according to an embodiment.

FIGS. 5-6 illustrate a second example of reception time differences at the user terminal 100. If the base stations $200_1$-$200_2$ are synchronized at symbol level, transmission timings of downlink signals at the base stations $200_1$-$200_2$ are substantially the same. Therefore, if the user terminal 100 has a longer distance to the base station $200_2$ than a distance to the base station $200_1$, the propagation distances differ from each other. Due to the different propagation distances, the user terminal 100 receives the downlink signal from the base station $200_1$ and the downlink signal from the base station $200_2$ at different timings. Therefore, the reception time difference is not zero.

The base station $200_1$ extracts base stations that have a reception time difference less than the threshold value for reception time difference, and a reception power difference, which is calculated using the measurement result of reception power, less than a threshold value for reception power difference. In FIGS. 5-6, reception timings of the downlink signals from the base station $200_1$ and base station $200_2$ are illustrated, which are referred to as $T_{enb1}$ and $T_{enb2}$, respectively. Also, the threshold value for reception time difference is referred to as $T_{th}$.

FIG. 5 illustrates a case where a reception time difference $T_{enb2}-T_{enb1}$ is less than the threshold value for reception time difference $T_{th}$. In this case, it is determined that Network MIMO, JT, DCS, or CS/CB can be executed.

FIG. 6 illustrates a case where a reception time difference $T_{enb2}-T_{enb1}$ is greater than the threshold value for reception time difference $T_{th}$. In this case, it is determined that Network MIMO is not executed, but DCS or CS/CB can be executed. This is because the user terminal 100 cannot receive a PDCCH from the base station $200_1$ and a PDSCH from the base station $200_2$ at the same time. To receive a PDCCH from the base station $200_1$ and a PDSCH from the base station $200_2$ at the same time, the user terminal 100 may include two branches of baseband processing units after analog digital conversion (ADC), in which demodulation, decoding process, and the like are executed.

The base station $200_1$ determines not to execute CoMP transmission even if the reception time difference is less than the threshold value for reception time difference, provided there are no base stations whose reception power difference calculated using the reception power measurement result is less than the threshold value for reception power difference.

Also, if the reception time difference is less than the threshold value for reception time difference and there are a plurality of base stations whose reception power difference calculated using the reception power measurement result is less than the threshold value for reception power difference, the base station $200_1$ selects a base station that has at least one of the least reception time difference and the least reception power difference. If the reception time difference is less than the threshold value for reception time difference and there are a plurality of base stations whose reception power difference calculated using the reception power measurement result is less than the threshold value for reception power difference, the base station $200_1$ may select a base station that makes transmission speed the fastest.

The threshold value for reception time difference may be changed depending on a method of CoMP transmission. For example, the threshold value for reception time difference for JT may be set smaller, whereas the threshold value for reception time difference for CS/CB may be set relatively greater. Namely, a method of CoMP transmission is selected depending on an object of executing CoMP transmission, which may be interference coordination, transmission speed improvement, or the like.

The base station $200_1$ sets the selected base station $200_2$ as a non-serving base station. The base station $200_1$ notifies execution of CoMP transmission to the non-serving base station $200_2$. Moreover, the base station $200_1$ notifies execution of CoMP transmission for at least one of uplink transmission and downlink transmission to the user terminal 100. The notification of execution of CoMP transmission may include information about CoMP transmission timing. CoMP transmission timing may include information about transmission and reception timing for CoMP transmission. Specifically, transmission timing is notified with a sequence frame number (SFN), either of a slot number or a subframe number that constitutes a wireless frame, absolute time, or relative time.

The serving base station $200_1$ notifies transmission and reception timing, a modulation method, an encoding rate, a CoMP transmission method, and control information depending on CoMP transmission, to the user terminal 100 and the non-serving base station $200_2$. The control information includes, for example, a weighted coefficient in JT, a precoding matrix, a precoding matrix indicator (PMI), and the like. In the following, a modulation method, an encoding rate, a CoMP transmission method, and the control information depending on CoMP transmission are called "transmission control information" as a whole. The transmission control information includes information about both of or one of uplink transmission and downlink transmission.

Also, the serving base station $200_1$ transfers data to the non-serving base station $200_2$, which is used for transmitting a downlink signal from the non-serving base station $200_2$ to the user terminal 100, following the selected transmission timing. The data for transmitting a downlink signal has not been transmitted from an upper apparatus to the non-serving base station $200_2$, but transmitted to the serving base station $200_1$.

The serving base station $200_1$ may transfer the data for transmitting a downlink signal without applying signal processing. Also, the serving base station $200_1$ may encode the data for transmitting a downlink signal, apply a process to the encoded data following the selected CoMP transmission method, and transfer the processed data. Also, the serving base station $200_1$ may encode and modulate the data for transmitting a downlink signal to transfer the data.

The serving base station $200_1$ encodes downlink data following the downlink transmission timing and downlink control information, modulates the data, applies the process to the data following the selected CoMP transmission method, converts the data to a wireless frequency, and transmits the data to the user terminal 100.

In response to receiving a notification of the transmission timing and downlink control information, the non-serving base station $200_2$ encodes data transmitted from the serving base station $200_1$ following the transmission timing and downlink control information, modulates the data, and applies a process for CoMP transmission to the data. The non-serving base station $200_2$ converts the data, which has the process for CoMP transmission applied, to a wireless signal, then transmits the signal to the user terminal 100. Namely, the non-serving base station does not transmit data transmitted from the upper apparatus directly, but transmits data transmitted via the serving base station $200_1$.

The user terminal 100 receives a signal processed for the CoMP transmission method based on the CoMP transmission/reception timing and the control information notified by the serving base station $200_1$. For example, the user terminal 100 applies frequency conversion from wireless frequency to baseband to the received signal, and applies a process for receiving the signal having the process for CoMP transmission method applied. The user terminal 100 demodulates and decodes the signal that has the process for CoMP transmission method applied.

Uplink transmission will be described.

Figure 7:
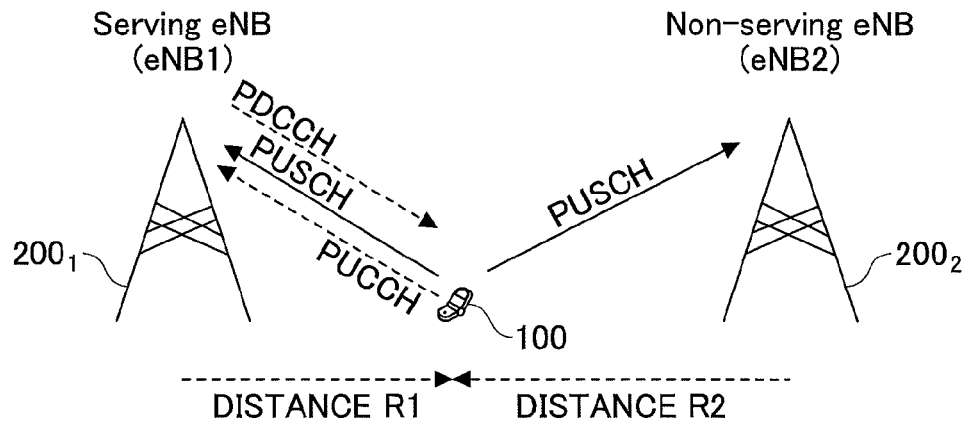
FIG. 7 illustrates CoMP transmission according to an embodiment.

FIG. 7 illustrates a wireless communication system that controls CoMP transmission with a reception time difference of uplink transmission according to an embodiment.

The configuration of the wireless communication system is substantially the same as the one illustrated in FIG. 3. In FIG. 7, the distance between the base station $200_1$ and the user terminal 100 is represented by "DISTANCE R1", and the distance between the base station $200_2$ and the user terminal 100 is represented by "DISTANCE R2". The user terminal 100 receives a PDCCH from the base station $200_1$ and transmits a PUSCH and a PUCCH to the base station $200_1$. The user terminal 100 transmits a PUSCH to the base station $200_2$.

The user terminal 100 encodes and modulates uplink data following the uplink transmission timing and uplink control information notified by the serving base station $200_1$. The user terminal 100 applies a process to the uplink data following the selected CoMP transmission method. The user terminal 100 converts the uplink data that has the process for the selected CoMP transmission method applied into a wireless frequency, to transmit the signal to the base stations $200_1$-$200_2$.

The serving base station $200_1$ and the non-serving base station $200_2$ receive the signal that has the process for the selected CoMP transmission method applied, based on the uplink transmission timing and uplink control information selected by the serving base station $200_1$. For example, the serving base station $200_1$ and the non-serving base station $200_2$ applies frequency conversion from wireless frequency to baseband to the uplink data, and demodulates the data. The serving base station $200_1$ and the non-serving base station $200_2$ apply to the demodulated uplink signal a process for receiving a signal that has the process for the CoMP transmission method applied, and decode the signal.

The uplink data demodulated by the non-serving base station $200_2$ may be transmitted to the serving base station $200_1$ to have the process applied for receiving a signal that has the process for the CoMP transmission method applied.

Here, the newly selected base station $200_2$ may be used as a serving base station, and the currently connected base station $200_1$ may be used as a non-serving base station. In this case, the user terminal 100 may execute a handover from the base station $200_1$ to the base station $200_2$.

<Controlling CoMP Transmission Based on a Reception Time Difference of Uplink Transmission>

The base station $200_1$ communicating with the user terminal 100 determines that CoMP transmission is required if it detects that transmission speed is reduced due to, for example, degradation of uplink transmission quality. Having determined that CoMP transmission is required, the base station $200_1$ requests to adjacent base stations or neighboring base stations of the base station $200_1$ to measure reception power and a reception time of radio waves received from the user terminal 100 to report the measurement result to the base station $200_1$. The user terminal 100 may detect reduction of transmission quality and transmission speed to determine whether CoMP transmission is required.

Moreover, the base station $200_2$ is similarly set to measure reception power and reception time from the user terminal 100. Moreover, a request is made to the user terminal 100 to transmit a pilot signal.

In response to receiving the request for transmitting a pilot signal, the user terminal 100 transmits the pilot signal to the connected base station $200_1$ and base stations around the connected base station. The user terminal 100 may transmit a common pilot signal, or individual pilot signals.

In response to receiving the pilot signal, the base station $200_1$ and base stations $200_2$-$200_m$ measure reception power from the user terminal 100. The base stations $200_2$-$200_m$ notify the measurement result of the reception power to the base station $200_1$.

Moreover, the base station $200_1$ and base stations $200_2$-$200_m$ measure and calculate reception times from the user terminal 100, respectively. The base station $200_1$ and base stations $200_2$-$200_m$ may measure and calculate the reception times based on the pilot signal from the user terminal 100. The base stations $200_2$-$200_m$ notify the reception times to the base station $200_1$.

In response to receiving the notification of the reception times, the base station $200_1$ calculates reception time differences at the base stations $200_2$-$200_m$ based on the reception times. For example, the base station $200_1$ calculates the reception time difference between the base station $200_1$ and the base station $200_2$.

After calculating the reception time difference, the base station $200_1$ compares the reception time difference and a reception time difference with which CoMP transmission can be executed (called a "threshold value for reception time difference, hereafter).

Figure 8:
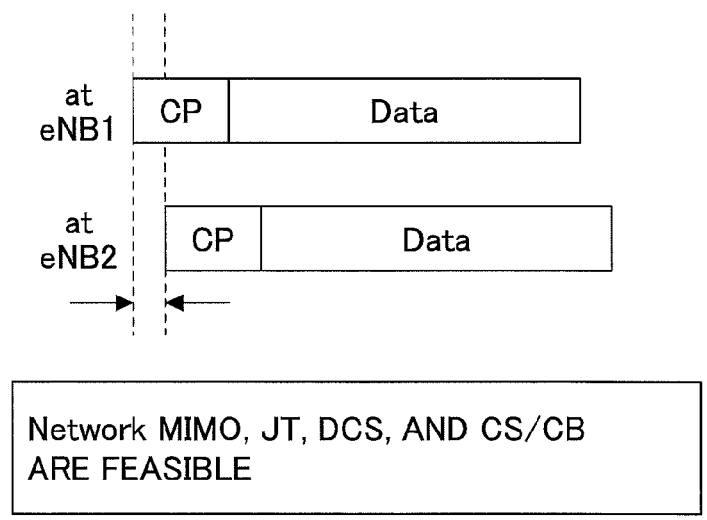
FIG. 8 illustrates an example of CoMP transmission according to an embodiment.
Figure 9:
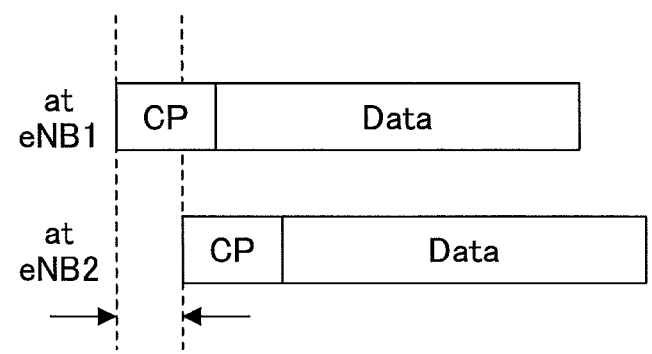
FIG. 9 illustrates an example of CoMP transmission according to an embodiment.

FIGS. 8-9 illustrate an example of reception time differences at the base stations $200_1$-$200_2$. If the base stations $200_1$-$200_2$ are synchronized at symbol level, transmission timings of uplink signals at the base stations $200_1$-$200_2$ are substantially the same. Therefore, if the user terminal 100 has a longer distance to the base station $200_2$ than a distance to the base station $200_1$, the propagation distances differ from each other. Therefore, the user terminal 100 receives an uplink signal from the base station $200_1$ and an uplink signal from the base station $200_2$ at different timings. Therefore, the reception time difference is not zero.

The base station $200_1$ extracts base stations that have a reception time difference less than the threshold value for reception time difference, and a reception power difference, which is calculated using the measurement result of reception power, less than the threshold value for reception power difference. In FIGS. 8-9, reception timings of uplink signals at the base station $200_1$ and base station $200_2$ are illustrated, which are referred to as $T_{enb1}$ and $T_{enb2}$, respectively. Also, the threshold value for reception time difference is referred to as $T_{th}$.

FIG. 8 illustrates a case where a reception time difference $T_{enb2}-T_{enb1}$ is less than the threshold value for reception time difference $T_{th}$. In this case, it is determined that Network MIMO, JT, DCS, or CS/CB can be executed.

FIG. 9 illustrates a case where a reception time difference $T_{enb2}-T_{enb1}$ is greater than the threshold value for reception time difference $T_{th}$. In this case, it is determined that Network MIMO is not executable, but DCS or CS/CB can be executed. This is because the user terminal 100 cannot receive a PDCCH from the base station $200_1$ and a PDSCH from the base station $200_2$ at the same time. To receive a PDCCH from the base station $200_1$ and a PDSCH from the base station $200_2$ at the same time, the user terminal 100 may include two branches of baseband processing units after analog digital conversion (ADC), in which demodulation, decode process, and the like are executed.

The base station $200_1$ determines not to execute CoMP transmission if the reception time difference is less than the threshold value for reception time difference and there are no base stations whose reception power difference calculated using the reception power measurement result is less than the threshold value for reception power difference.

If the reception time difference is less than the threshold value for reception time difference and there are a plurality of base stations whose reception power difference calculated using the reception power measurement result is less than the threshold value for reception power difference, the base station $200_1$ selects a base station that has at least one of the least reception time difference and the least reception power difference. If the reception time difference is less than the threshold value for reception time difference and there are a plurality of base stations whose reception power difference calculated using the reception power measurement result is less than the threshold value for reception power difference, the base station $200_1$ may select a base station that makes transmission speed the fastest.

The threshold value for reception time difference may be changed depending on a method of CoMP transmission. For example, the threshold value for reception time difference for JT may be set smaller, whereas the threshold value for reception time difference for CS/CB may be set relatively greater. Namely, a method of CoMP transmission is selected depending on an object of executing CoMP transmission, which may be interference avoidance, transmission speed improvement, or the like.

The base station $200_1$ sets the selected base station $200_n$ as a non-serving base station. The base station $200_1$ notifies execution of CoMP transmission to the non-serving base station $200_n$. Moreover, the base station $200_1$ notifies execution of CoMP transmission for at least one of uplink transmission and downlink transmission to the user terminal. The notification of execution of CoMP transmission may include information about CoMP transmission timing. CoMP transmission timing may include information about transmission and reception timing for CoMP transmission. Specifically, transmission timing is notified with a sequence frame number (SFN), either of a slot number or a subframe number that constitutes a wireless frame, absolute time, or relative time.

The serving base station $200_1$ notifies transmission and reception timing, a modulation method, an encoding rate, a CoMP transmission method, and control information depending on CoMP transmission to the user terminal 100 and the non-serving base station $200_2$. The control information includes, for example, a weighted coefficient in JT, a precoding matrix, a precoding matrix indicator (PMI), and the like. In the following, a modulation method, an encoding rate, a CoMP transmission method, and the control information depending on CoMP transmission are called "transmission control information" as a whole. The transmission control information includes information about both of or one of uplink transmission and downlink transmission.

In the following, it will be described concretely.

First Embodiment

<Case where a Base Station Determines Whether to Execute CoMP Transmission>
<Case where Downlink CoMP Transmission is Controlled>
<Base Station $200_n$>

Figure 10:
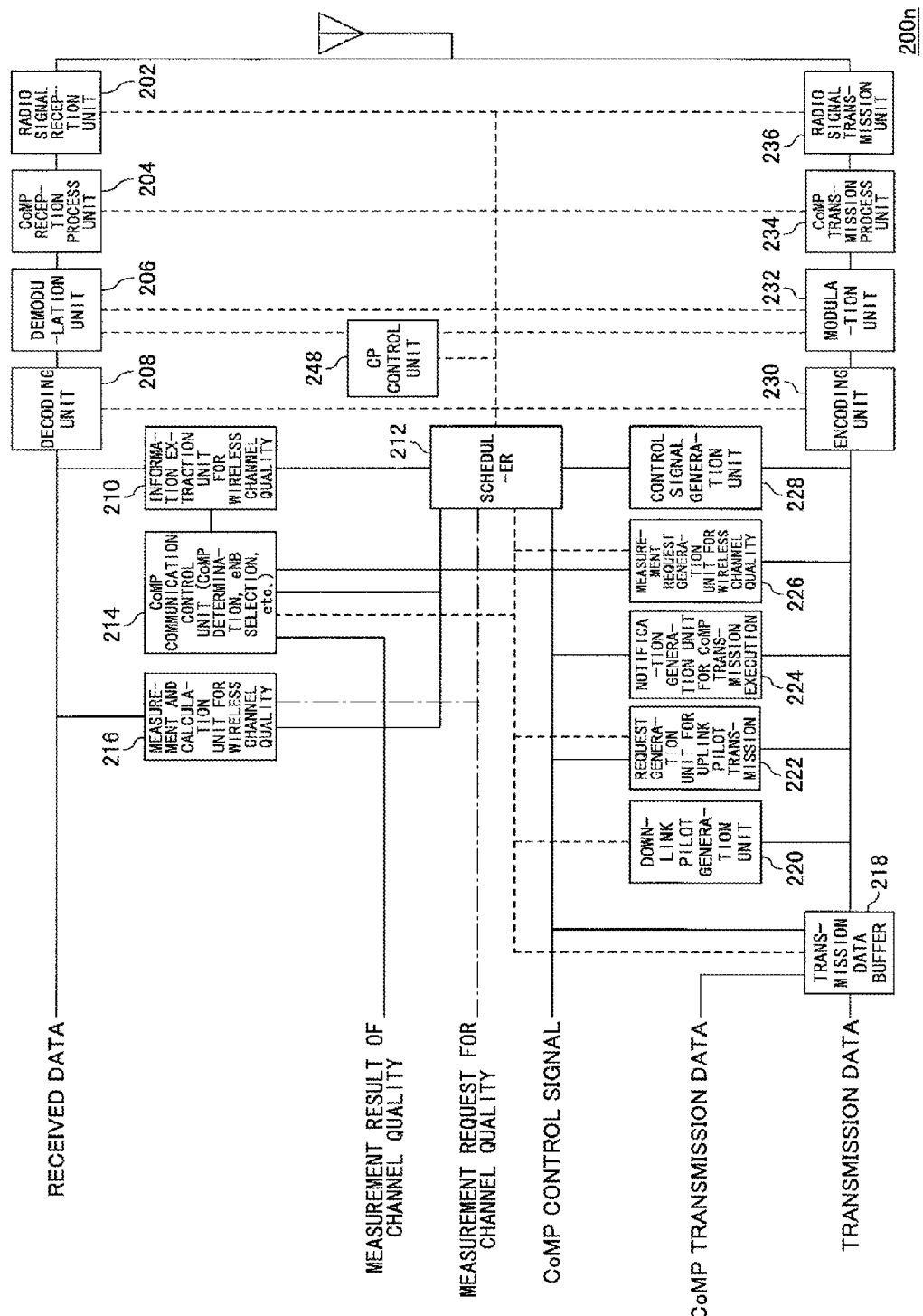
FIG. 10 illustrates an example of a base station according to an embodiment.

FIG. 10 illustrates a base station according to the first embodiment.

The base station $200_n$ includes a radio signal reception unit 202, a CoMP reception process unit 204, a demodulation unit 206, a decoding unit 208, an information extraction unit for wireless channel quality 210, a scheduler 212, a CoMP communication control unit 214, a measurement and calculation unit for wireless channel quality 216, a transmission data buffer 218, a downlink pilot generation unit 220, a request generation unit for uplink pilot transmission 222, an notification generation unit for CoMP transmission execution 224, a measurement request generation unit for wireless channel quality 226, a control signal generation unit 228, an encoding unit 230, a modulation unit 232, a CoMP transmission process unit 234, a radio signal transmission unit 236, and a CP control unit 248.

The radio signal reception unit 202 is connected with an antenna. The radio signal reception unit 202 receives an uplink signal from a user terminal 100. An uplink signal includes wireless channel quality information. The radio signal reception unit 202 applies frequency conversion to the uplink signal to obtain a baseband signal. The radio signal reception unit 202 inputs the uplink signal having frequency conversion applied into the CoMP reception process unit 204.

The CoMP reception process unit 204 is connected with the radio signal reception unit 202. The CoMP reception process unit 204 sets a CoMP transmission method and setting corresponding to the CoMP transmission method following control of the scheduler 212. The CoMP reception process unit 204 processes the uplink signal input from the radio signal reception unit 202 following the CoMP transmission method and setting corresponding to the CoMP transmission method.

The demodulation unit 206 is connected with the CoMP reception process unit 204. The demodulation unit 206 demodulates the input signal from the CoMP reception process unit 204. When demodulating the input signal, the CP control unit 248 controls it depending on a CP length. The demodulation unit 206 inputs the demodulated signal into the decoding unit 208.

The decoding unit 208 is connected with the demodulation unit 206. The decoding unit 208 regenerates the received signal by decoding the demodulated signal input from the demodulation unit 206. The decoding unit 208 inputs the regenerated received signal (called "received data", hereafter) into the information extraction unit for wireless channel quality 210 and the measurement and calculation unit for wireless channel quality 216. Also, the decoding unit 208 outputs the received data.

The information extraction unit for wireless channel quality 210 is connected with the decoding unit 208. The information extraction unit for wireless channel quality 210 extracts wireless channel quality information from the received data input from the decoding unit 208. The information extraction unit for wireless channel quality 210 notifies the wireless channel quality information to the CoMP communication control unit 214 and the scheduler 212.

The scheduler 212 is connected with the information extraction unit for wireless channel quality 210, the radio signal reception unit 202, the CoMP reception process unit 204, the demodulation unit 206, the decoding unit 208, the encoding unit 230, the modulation unit 232, the CoMP transmission process unit 234, the radio signal transmission unit 236, and the CP control unit 248. The scheduler 212 determines whether downlink transmission quality or downlink transmission speed is reduced based on the wireless channel quality information from the information extraction unit for wireless channel quality 210. If determining the downlink transmission quality or the downlink transmission speed is reduced, the scheduler 212 notifies to the CoMP communication control unit 214 that the downlink transmission quality or the downlink transmission speed is reduced.

The scheduler 212 executes the following if the CoMP communication control unit 214 determines to execute CoMP transmission. The scheduler 212 receives information as input from the CoMP communication control unit 214 that notifies execution of downlink CoMP transmission and a method of downlink CoMP transmission. The scheduler 212 selects and sets wireless resources and transmission timing used for executing downlink CoMP transmission. The scheduler 212 may set these into the encoding unit 230. The scheduler 212 selects and sets a modulation method and an encoding rate used for downlink CoMP transmission. The scheduler 212 may set these into the encoding unit 230 and the modulation unit 232. Also, the scheduler 212 selects and sets control information depending on the selected downlink CoMP transmission method. The scheduler 212 may set these into the CoMP transmission process unit 234. For example, the scheduler 212 selects a weighted coefficient, a precoding matrix, and the like if selecting JT MIMO transmission. The scheduler 212 inputs the selected information into the control signal generation unit 228.

Moreover, the scheduler 212 receives information as input from the CoMP communication control unit 214 that notifies execution of downlink CoMP transmission and a method of downlink CoMP transmission. The scheduler 212 sets CP length. The scheduler 212 inputs information about the set CP length into the control signal generation unit 228 and the CP control unit 248.

Also, the scheduler 212 notifies the selected information to a non-serving base station via an interface between sectors (not illustrated) in the base station, an interface between base stations (not illustrated), an upper apparatus (not illustrated), or the like. The selected information may include the wireless resources and transmission timing used for executing downlink CoMP transmission, the modulation method used for downlink CoMP transmission, the encoding rate, the control information depending on the selected downlink CoMP transmission method, and the CP length.

Also, the scheduler 212 controls transmission of data to the non-serving base station from which the data is transmitted. As described above, the non-serving base station is not provided with transmission data. Therefore, transmission data is transmitted to the non-serving base station via an interface between sectors interface (not illustrated) in the base station, an interface between base stations (not illustrated), an upper apparatus (not illustrated), or the like. The scheduler 212 instructs the transmission data buffer 218 to transfer the transmission data to the non-serving base station.

The scheduler 212 is set with the CoMP transmission method, the setting corresponding to the CoMP transmission method, the wireless resources, the encoding rate, the modulation method, and the like. Following an amount of transmission data calculated based on the setting, the scheduler 212 takes the transmission data out of the transmission data buffer 218 to input it into the encoding unit 230. The transmission data is encoded following the encoding rate set with the encoding unit 230, then modulated using the modulation method set with the modulation unit 232. The transmission data is processed following the CoMP transmission method and the setting corresponding to the CoMP transmission method set by the CoMP transmission process unit 234, then has frequency conversion applied by the radio signal transmission unit 236. The transmission data is transmitted to the user terminal 100 via the antenna following the set transmission timing.

At this moment, transmission may be executed using a physical downlink shared channel (PDSCH), similarly to, for example, an LTE system. Also similarly to an LTE system, the transmission data encoded by the encoding unit 230 may have scrambling applied with a scrambling code that uses an initial value generated based on a cell ID, a slot number, or a user terminal number.

The transmission data buffer 218 is connected with the scheduler 212, the CoMP communication control unit 214, and the encoding unit 230. The transmission data buffer 218 inputs the transmission data into the encoding unit 230 following the scheduling by the scheduler 212. Also, the transmission data buffer 218 transfers the transmission data to the non-serving base station following an instruction for transferring the transmission data to the non-serving base station transferred by the scheduler 212 when executing CoMP transmission.

When transmitting the transmission data from the transmission data buffer 218 to the non-serving base station, the transmission data may be transmitted as it is, or transmitted after having signal processing applied. From the viewpoint of the amount of transmission, it is preferable to transmit the transmission data as it is because the amount of transmission increases if the transmission data has signal processing applied. If the signal processing is applied, for example, the transmission data having the signal processing applied is transmitted to the non-serving base station following CoMP transmission. Specifically, the encoding unit 230 encodes the transmission data following the selected encoding rate. The modulation unit 232 modulates it following the selected modulation method. The CoMP transmission process unit 234 executes CoMP transmission for the transmission data modulated by the modulation unit 232 following the selected CoMP transmission method. The transmission data processed for CoMP transmission by the CoMP transmission process unit 234 is transmitted to the non-serving base station via an interface between sectors in the base station, an interface between base stations, an upper apparatus, or the like.

The transmission data transmitted to the non-serving base station is taken out of the transmission data buffer 218 based on the amount of data that can be transmitted following the scheduling by the scheduler 212 of the non-serving base station. The amount of data that can be transmitted is set depending on the CoMP transmission method that is used, the wireless resource that is used, the encoding rate, the modulation method, and the like.

The control signal generation unit 228 is connected with the scheduler 212 and the encoding unit 230. The control signal generation unit 228 generates control information based on information from the scheduler 212. The control signal generation unit 228 inputs a control signal into the encoding unit 230. Moreover, the control signal generation unit 228 may generate a control signal including information about the CP length used for CoMP transmission. When generating the control signal including information about the CP length, the CP length used for CoMP transmission may be explicitly specified in the information about the CP length. Also, when generating the information about the CP length, information about the CP length to be used may be stored in a memory of the user terminal 100 in advance. In this case, the user terminal 100 reads the CP length to be used from the memory if receiving the information about the CP length used for CoMP transmission. Also, for CoMP transmission, either one of the extended CP or the normal CP may be used. Also, a CP that has a length other than that of the normal CP or the extended CP may be used.

CoMP transmission is especially likely to be used when the user terminal 100 is positioned around a boundary with an adjacent cell or at the edge of a cell. Namely, CoMP transmission is highly likely to be used when the propagation distance between the base station and the user terminal 100 is great and the delay time is long. Therefore, when executing CoMP transmission, the extended CP is advantageous. A CP other than the normal CP or the extended CP may be set to be used for CoMP transmission.

The control signal is transmitted to the user terminal 100 via the encoding unit 230, the modulation unit 232, the CoMP transmission process unit 234, and the radio signal transmission unit 236. The control information may be transmitted before transmission of a downlink signal. For example, the control signal is transmitted with a heading part of a wireless frame, and the downlink signal may be transmitted with a trailing part of the same wireless frame. Namely, the control information may be transmitted with a transmission wireless frame that time-wise precedes a wireless frame for transmitting downlink transmission data.

The CoMP communication control unit 214 is connected with the information extraction unit for wireless channel quality 210, the scheduler 212, and the measurement and calculation unit for wireless channel quality 216. If the scheduler 212 notifies that the downlink transmission quality or the downlink transmission speed is reduced, the CoMP communication control unit 214 determines whether downlink CoMP transmission is required based on the wireless channel quality information input from the information extraction unit for wireless channel quality 210. If determining that downlink CoMP transmission is required, the CoMP communication control unit 214 notifies to the measurement request generation unit for wireless channel quality 224 to generate a request signal for measuring wireless channel quality to be transmitted to the user terminal 100.

Also, the CoMP communication control unit 214 selects a non-serving base station based on the wireless channel quality information. Specifically, the CoMP communication control unit 214 obtains a difference of wireless channel quality by calculating the difference between the wireless channel quality of the serving base station and the wireless channel quality of base stations other than the serving base station. The CoMP transmission control unit 214 determines whether there are base stations whose difference of wireless channel quality is less than a threshold value for difference of wireless channel quality. If determining that there are base stations whose difference of wireless channel quality is less than the threshold value for difference of wireless channel quality, the CoMP transmission control unit 214 determines that downlink CoMP transmission is feasible. If determining that downlink CoMP transmission is feasible, the CoMP transmission control unit 214 selects a non-serving base station. For example, the CoMP transmission control unit 214 may select a base station with the least difference of wireless channel quality as a non-serving base station. Here, assume that the base station $200_n$ is selected as a non-serving base station. Moreover, the CoMP transmission control unit 214 selects a method used for downlink CoMP transmission among CoMP transmission methods such as JP, CS/CB, and the like. If JP is selected, the downlink CoMP transmission method may be further selected among JT and DCS.

If determining that there are no base stations that have difference of wireless channel quality less than the threshold value for difference of wireless channel quality, the CoMP communication control unit 214 determines not to execute downlink CoMP transmission. If determining not to execute downlink CoMP transmission, the CoMP communication control unit 214 may control to continue communication with the currently executing transmission method.

Also, the CoMP communication control unit 214 may determine whether downlink CoMP transmission is feasible depending on the wireless channel quality. When determining whether downlink CoMP transmission is feasible depending on the wireless channel quality, the CoMP communication control unit 214 may select a base station with the best wireless channel quality as a non-serving base station. When selecting a base station with the best wireless channel quality as a non-serving base station, if the currently connected base station $200_1$ is not the base station with the best wireless channel quality, the base station with the best wireless channel quality may be set as a serving base station, and the user terminal 100 may execute a handover to the base station with the best wireless channel quality from the currently connected base station $200_1$.

Also, the CoMP communication control unit 214 may select a non-serving base station based on required transmission speed specified with respect to QoS (Quality of Service) class of transmission data, or the like.

Also, if determining that downlink CoMP transmission is feasible, the CoMP communication control unit 214 notifies to the notification generation unit for CoMP transmission execution 224 that downlink CoMP transmission is to be executed. Also, if determining not to execute downlink CoMP transmission, the CoMP communication control unit 214 may notify to the notification generation unit for CoMP transmission execution 224 that downlink CoMP transmission is not to be executed. Also, the CoMP communication control unit 214 may notify information whether downlink CoMP transmission is feasible to the notification generation unit for CoMP transmission execution 224.

Also, the CoMP communication control unit 214 notifies information about CoMP transmission execution to the non-serving base station via an interface between sectors in the base station, an interface between base stations, an upper apparatus, or the like. For example, X2 in an LTE system may be used as an interface between base stations. The information about CoMP transmission execution may include information about the determination that CoMP transmission is to be executed, and timing information of CoMP transmission.

Also, the CoMP communication control unit 214 notifies the information that downlink CoMP transmission is to be executed and information about the selected downlink CoMP transmission method to the scheduler 212.

The measurement request generation unit for wireless channel quality 226 is connected with the CoMP communication control unit 214 and the encoding unit 230. The measurement request generation unit for wireless channel quality 226 generates a request signal for measuring wireless channel quality as a control signal following a request for generating a request signal for measuring wireless channel quality from the CoMP communication control unit 214. The measurement request generation unit for wireless channel quality 226 inputs the control signal into the encoding unit 230.

The downlink pilot generation unit 220 is connected with the scheduler 212 and the encoding unit 230. The downlink pilot generation unit 220 generates a pilot signal following control of the scheduler 212. The downlink pilot generation unit 220 inputs the pilot signal into the encoding unit 230.

The encoding unit 230 is connected with the transmission data buffer 218, the downlink pilot generation unit 220, the request generation unit for uplink pilot transmission 222, the notification generation unit for CoMP transmission execution 224, the measurement request generation unit for wireless channel quality 226, and the control signal generation unit 228. The encoding unit 230 encodes control signals from the notification generation unit for CoMP transmission execution 224, the measurement request generation unit for wireless channel quality 226, and the control signal generation unit 228. For example, the encoding unit 230 may add a parity bit to transmission information using turbo code, convolution code, Reed-Muller code, or the like. An encoding rate is represented by the number of pieces of transmission information divided by (the number of pieces of transmission information+the number of parity bits). An encoding rate may be determined only with a method such as turbo encoding, or determined with repetition or puncture executed after encoding. The encoding unit 230 inputs the encoded control signals into the modulation unit 232.

The modulation unit 232 is connected with the encoding unit 230. The modulation unit 232 modulates the encoded control signal from the encoding unit 230. The modulation unit 232 may use a modulation method depending on a wireless channel. Modulation methods that can be used may include, for example, phase modulation such as QPSK, 16QAM, 64QAM, 256QAM, and 8PSK, quadrature amplitude modulation, and the like. The modulation unit 232 inputs the modulated control signals into the CoMP transmission process unit 234.

Also, if using a multiple access method such as OFDM, OFDMA, or the like, the modulation unit 232 may apply serial-parallel conversion, quadrature modulation with respective subcarriers, and IFFT to data, then obtain the sum of IFFT result. Moreover, CP may be added.

The CoMP transmission process unit 234 is connected with the modulation unit 232. When executing CoMP transmission, the CoMP transmission process unit 234 provides setting for the CoMP transmission method following control of the scheduler 212. When executing CoMP transmission, the CoMP transmission process unit 234 applies a CoMP transmission process to the data demodulated by the modulation unit 232 following the setting for the CoMP transmission method. When CoMP transmission is not executed, the CoMP transmission process unit 234 does not apply the CoMP transmission process to the data. Also, similarly to an LTE system, CoMP transmission may be set not to be executed when transmitting a control signal. Also, control signals may be restricted to be sent only from the serving base station.

After modulated by the modulation unit 232, the CoMP transmission process unit 234 applies CoMP transmission process to the data. This is because applying IQ mapping to data is treated as modulation. IQ mapping is to allocate data on an IQ plane following the modulation method.

Also, applying quadrature modulation to an IQ signal can be treated as modulation. For example, a quadrature modulator or the like in a PDC system applies quadrature modulation to an IQ signal, which is considered as modulation. When applying the quadrature modulation to an IQ signal, CoMP transmission is executed before modulation. Namely, the modulation unit 232 and the CoMP transmission process unit 234 are exchanged so that the output signal of the encoding unit 230 is input into the CoMP transmission process unit 234, the output signal of the CoMP transmission process unit 234 is input into the modulation unit 232, and the output signal of the modulation unit 232 is input into the radio signal transmission unit 236.

Data may have the CoMP transmission process applied by the CoMP transmission process unit 234 after modulated by the modulation unit 232, or the data may be modulated by the modulation unit 232 after having the CoMP transmission process applied by the CoMP transmission process unit 234.

Similarly, demodulation may be applied before CoMP transmission. Namely, the demodulation unit 206 and the CoMP reception process unit 204 are exchanged so that the output signal of the radio signal reception unit 202 is input into the demodulation unit 206, the output signal of the demodulation unit 206 is input into the CoMP reception process unit 204, and the output signal of the CoMP reception process unit 204 is input into the decoding unit 208. The CoMP transmission process unit 234 inputs the transmission data having the CoMP transmission process applied into the radio signal transmission unit 236 if necessary.

The data may have a CoMP reception process applied by the CoMP reception process unit 204 after demodulated by the demodulation unit 206, or the data may be demodulated by the demodulation unit 206 after having the CoMP reception process applied by the CoMP reception process unit 204.

The radio signal transmission unit 236 is connected with the CoMP transmission process unit 234. The radio signal transmission unit 236 converts the transmission data from the CoMP transmission process unit 234 into a wireless frequency. The radio signal transmission unit 236 transmits the transmission data converted to the wireless frequency to the user terminal 100 via the antenna. A control signal may be transmitted using a downlink control channel, for example, a PDCCH in an LTE system, or a downlink data channel, for example, a PDSCH in an LTE system. Control signals may include a notification signal of CoMP transmission execution, and a request signal for measuring wireless channel quality.

The notification generation unit for CoMP transmission execution 224 is connected with the scheduler 212, the CoMP communication control unit 214 and the encoding unit 230. The notification generation unit for CoMP transmission execution 224 generates a notification signal of CoMP transmission execution if the CoMP communication control unit 214 notifies that downlink CoMP transmission is to be executed. The notification generation unit for CoMP transmission execution 224 inputs the notification signal of CoMP transmission execution into the encoding unit 230. The notification signal of CoMP transmission execution may be treated as a control signal. The notification signal of CoMP transmission execution is transmitted to the user terminal 100 via the encoding unit 230, the modulation unit 232, the CoMP transmission process unit 234, and the radio signal transmission unit 236.

Also, the notification generation unit for CoMP transmission execution 224 generates a notification signal of CoMP transmission impossible if the CoMP communication unit 214 notifies that downlink CoMP transmission is not to be executed. The notification generation unit for CoMP transmission execution 224 inputs the notification signal of CoMP transmission impossible into the encoding unit 230. The notification signal of CoMP transmission execution impossible is transmitted to the user terminal 100 via the encoding unit 230, the modulation unit 232, the CoMP transmission process unit 234, and the radio signal transmission unit 236.

Also, if the CoMP communication control unit 214 notifies information whether CoMP transmission is feasible, the notification generation unit for CoMP transmission execution 224 may generates a notification signal of CoMP transmission execution that includes the information whether downlink CoMP transmission is feasible. The notification signal of CoMP transmission is transmitted to the user terminal 100.

The CP control unit 248 is connected with the demodulation unit 106 and the modulation unit 232. The CP control unit 248 controls CP length for demodulation at the demodulation unit 106 or for modulation at the modulation unit 232 based on the information about CP length from the scheduler 212.

The non-serving base station is notified with control information including the wireless resources to be used, the CoMP transmission timing, the CoMP transmission method and the setting corresponding to the CoMP transmission, the modulation method, the encoding rate, the like, by the serving base station. Moreover, the information about the CP length may be notified. The information about the CP length may be treated as part of the control information.

The non-serving base station transmits transmission data transmitted from the serving the station to the user terminal 100 following the CoMP transmission timing included in the control information.

Specifically, signal processing after reception depends on the format of transmission data transmitted from the serving base station. The format of transmission data includes transmission data as it is; encoded transmission data; encoded and modulated transmission data; and encoded and modulated transmission data having signal processing for CoMP transmission applied.

Here, as an example, a case will be described in which transmission data not having signal processing applied is transmitted to the non-serving the station. The transmission data is to have the signal processing applied by the non-serving base station. Transmission data other than the transmission data with the format is to have appropriate processing applied by the non-serving base station.

The transmission data transmitted from the serving station through an interface between base stations or the like is stored into the transmission data buffer 218 of the non-serving the station. The CoMP transmission timing, the CoMP transmission method, the setting for CoMP transmission, the modulation method, the encoding rate, or the like from the serving base station is input into the scheduler 212 of the non-serving base station. Moreover, the information about the CP length notified by the serving base station is input into the scheduler 212.

The scheduler 212 of the non-serving base station calculates an amount of transmission data based on the setting for CoMP transmission, the used wireless resources, the encoding rate, the modulation method, and the like, following the CoMP transmission timing. Following the amount of transmission data, the scheduler 212 of the non-serving base station takes the transmission data out of the transmission data buffer 218 to input it into the encoding unit 230. The transmission data is encoded with the encoding rate set by the encoding unit 230. The transmission data is modulated by the modulation method set by the modulation unit 232, and further added with the CP set by the scheduler 212. The transmission data is processed with the CoMP transmission method and the setting for CoMP transmission set by the CoMP transmission process unit 234, then has frequency conversion applied by the radio signal transmission unit 236. The transmission data is transmitted to the user terminal 100 via the antenna at the set transmission timing. Here, for example, similarly to an LTE system, transmission may be executed using a physical downlink shared channel (PDSCH). At this moment, the wireless resources used by the serving base station for transmission are the same as the wireless resources used by the non-serving base station for transmission, and also, the same wireless channel is used.

In the embodiment described above, whether to execute CoMP transmission may be determined based on wireless transmission speed. For example, in a W-CDMA system or an LTE system, a user terminal 100 notifies ACK/NACK to the serving base station that represents whether data has been transmitted without an error during downlink data transmission. Namely, whether the data has been transmitted without an error is determined by the reception side. If the data has been transmitted without an error, ACK is notified, otherwise, namely, if the data has been transmitted with errors or cannot be received, NACK is notified to the source of transmission.

The serving base station can measure actual data transmission speed based on ACK/NACK. The serving base station stores the amount of data that has been transmitted, and ACK/NACK is transmitted back at regular timing, hence the time interval elapsed for transmitting data from the base station and for replying ACK/NACK is fixed. Therefore, the serving base station can calculate the transmission speed. The serving base station may determine whether to execute CoMP transmission by comparing the transmission speed and required transmission speed specified with QoS or the like. Namely, if the transmission speed is less than the required transmission speed, the serving base station may determine to execute CoMP transmission to satisfy the required transmission speed.

Also, in the embodiment described above, the serving base station and the non-serving base station are described assuming that a base station covers a single cell. A base station may cover a plurality of cells or sectors. For example, a base station may cover three cells (or sectors) where each of the cells, for example, may form a fan-shaped area with a central angle of 120 degrees. In this case, COMP transmission may be executed between adjacent cells (or sectors) that are covered by the same base station.

Figure 11:
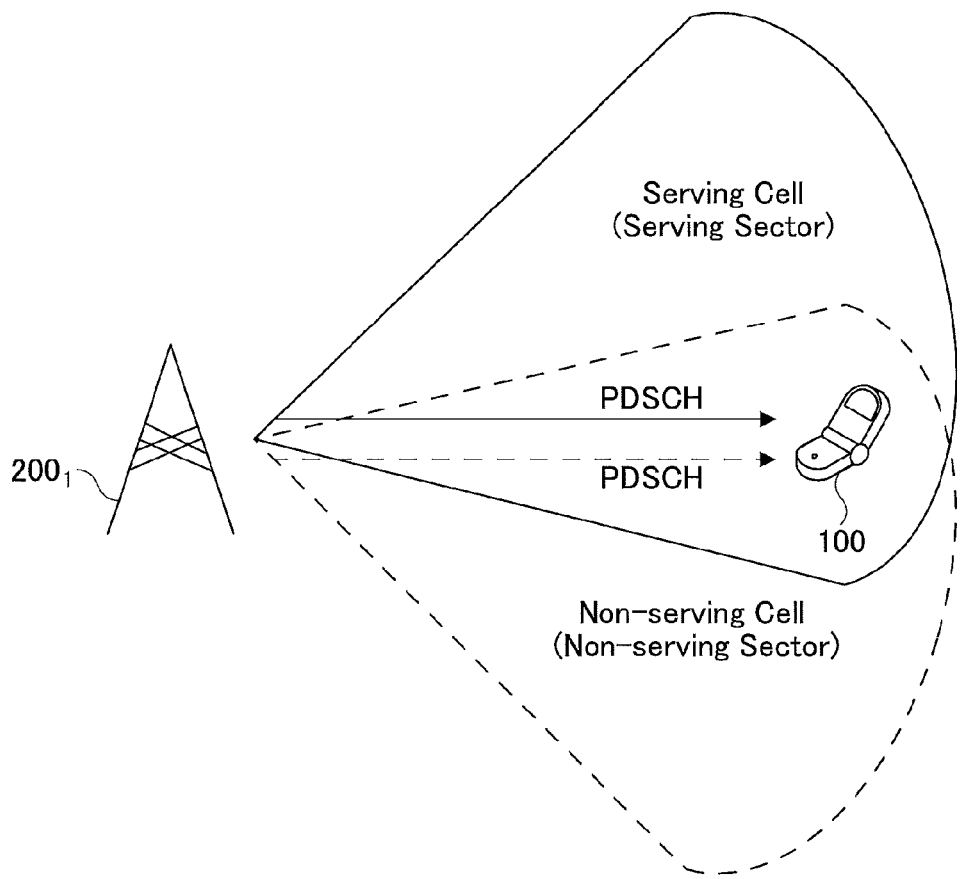
FIG. 11 illustrates an example of CoMP transmission according to an embodiment.

FIG. 11 illustrates CoMP transmission executed between adjacent cells that are covered by the same base station. In FIG. 11, PDCCHs and PUCCHs are omitted. In FIG. 11, a PDSCH from a serving cell and a PDSCH from a non-serving cell are transmitted to a user terminal 100.

Moreover, both of or one of a serving base station and a non-serving base station may be set as a relay node. Here, a relay node is, for example, a repeating device that is under consideration to be introduced with 3GPP LTE-Advanced (LTE Release 10 or after). A relay node relays wireless transmission between a base station and a user terminal. Namely, the relay node receives a transmission wave transmitted by the base station, demodulates and decodes the wave, corrects transmission errors with decoding, encodes it again, modulates it, and transmits it to the user terminal. Also, the relay node receives a transmission wave from the user terminal, corrects transmission errors with decoding, encodes it again, modulates it, and transmits it to the base station. By having the relay node relay between the base station and the user terminal, it is possible to enlarge a range of a service area (cell or sector), or to cover communication-impossible areas that might occur in the range of a service area (cell or sector). A communication-impossible area may be called an "insensitive area" or a "dead spot".

CoMP transmission may be executed between a relay node and a base station or between relay nodes.

Figure 12:
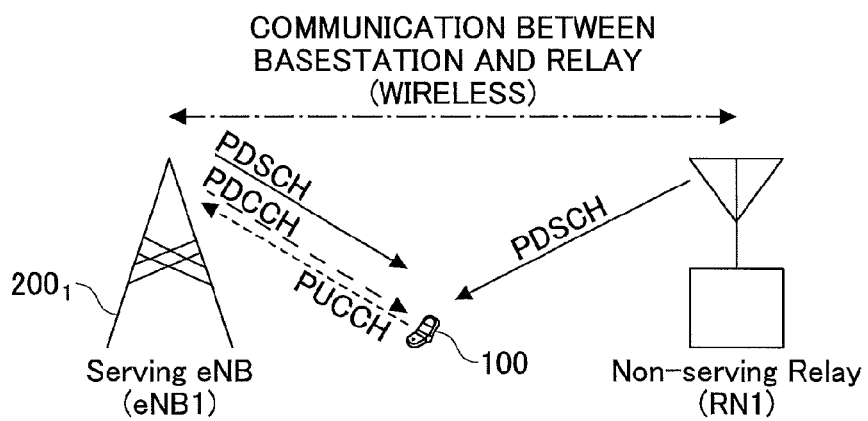
FIG. 12 illustrates an example of CoMP transmission according to an embodiment.

FIG. 12 illustrates a first example of CoMP transmission executed between a relay node RN1 and a base station eNB1.

In the example illustrated in FIG. 12, the relay node RN1 is under control of the serving base station eNB1. The relay node RN1 transmits transmission data from the serving base station eNB1.

Figure 13:
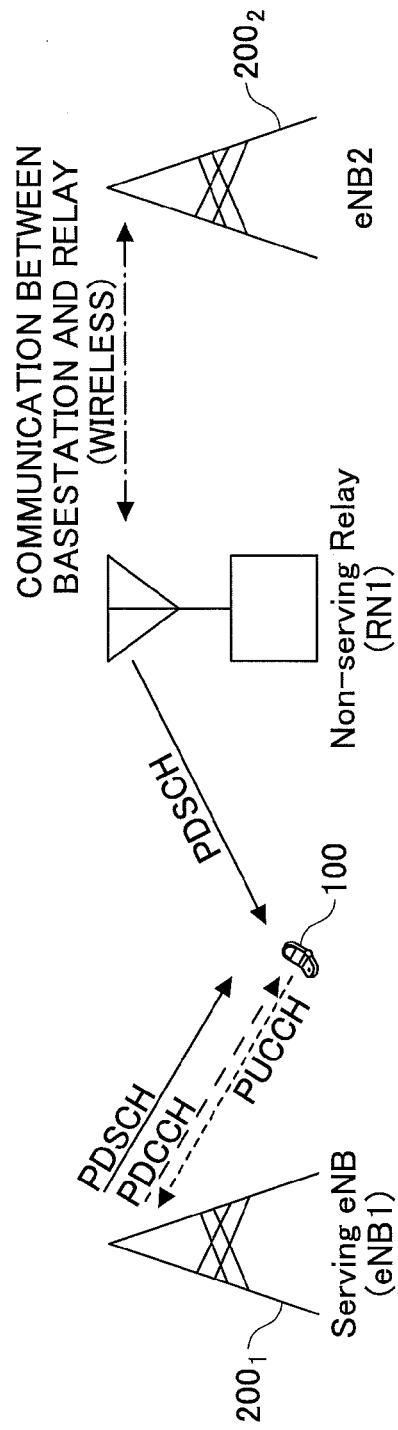
FIG. 13 illustrates an example of CoMP transmission according to an embodiment.

FIG. 13 illustrates a second example of CoMP transmission executed between a relay node RN1 and a base station eNB1.

In the example illustrated in FIG. 13, the relay node RN1 is under control of a base station eNB2, which differs from the serving base station eNB1. The relay node RN1 transmits transmission data from the base station eNB2.

Figure 14:
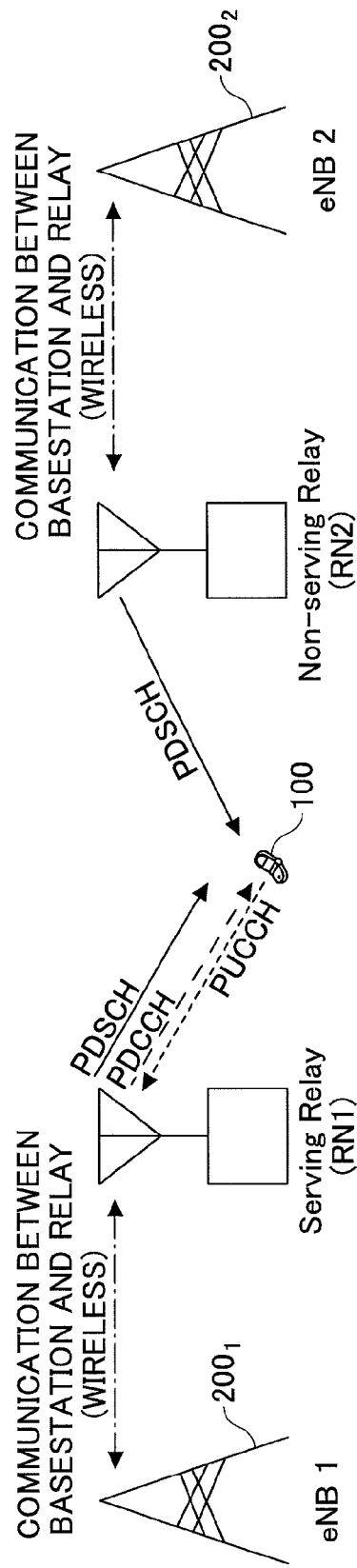
FIG. 14 illustrates an example of CoMP transmission according to an embodiment.

FIG. 14 illustrates a first example of CoMP transmission executed between relay nodes RN1-RN2.

In the example illustrated in FIG. 14, the relay nodes RN1-RN1 are under control of respective base stations eNB1-eNB2. The relay nodes RN1-RN2 transmit transmission data from the respective base stations eNB1-eNB2.

Figure 15:
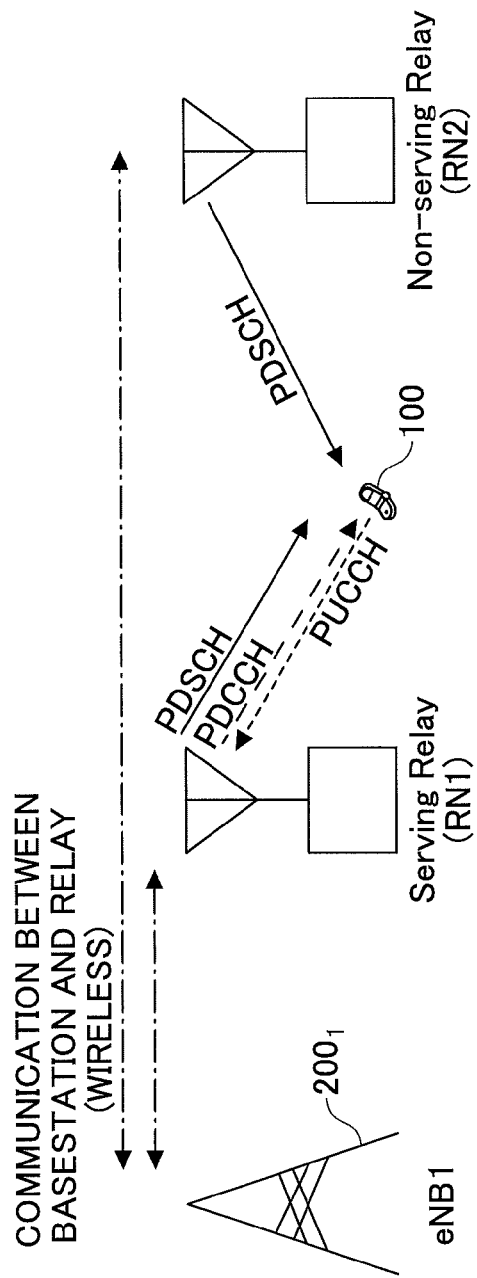
FIG. 15 illustrates an example of CoMP transmission according to an embodiment.

FIG. 15 illustrates a second example of CoMP transmission executed between relay nodes RN1-RN2.

In the example illustrated in FIG. 15, the relay nodes RN1-RN2 are under control of a base station eNB1. The relay nodes RN1-RN2 transmit transmission data from the base station eNB1.

Also, CoMP transmission may be executed using a remote radio header (RRH) instead of one of the base stations, at least. An RRH is a wireless unit and an antenna, or an antenna separated from a base station using wired communication technology such as fiber optics or the like. The wireless unit and antenna, or the antenna of an RRH is installed at a remote place from the main body of its base station.

Figure 16:
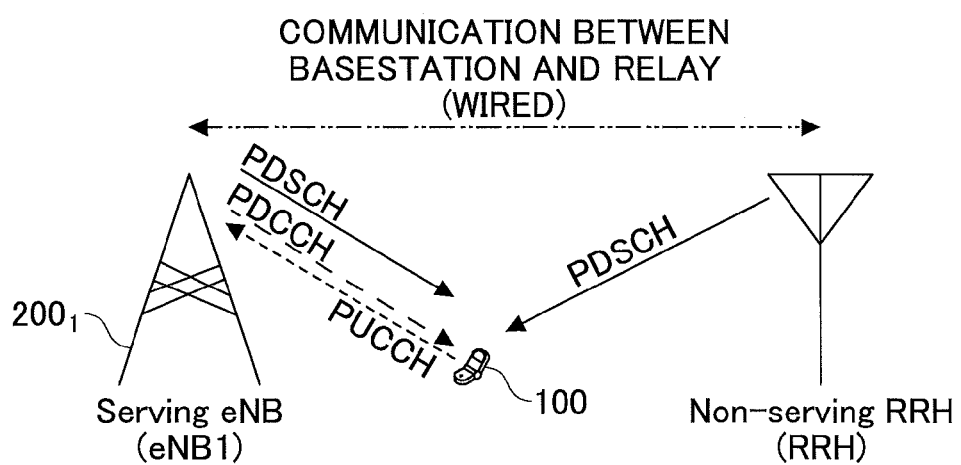
FIG. 16 illustrates CoMP transmission according to an embodiment.

FIG. 16 illustrates a first example of CoMP transmission executed between a base station eNB1 and an RRH.

In the example illustrated in FIG. 16, the RRH is under control of the serving base station eNB1. The RRH transmits transmission data from the serving base station eNB1.

Figure 17:
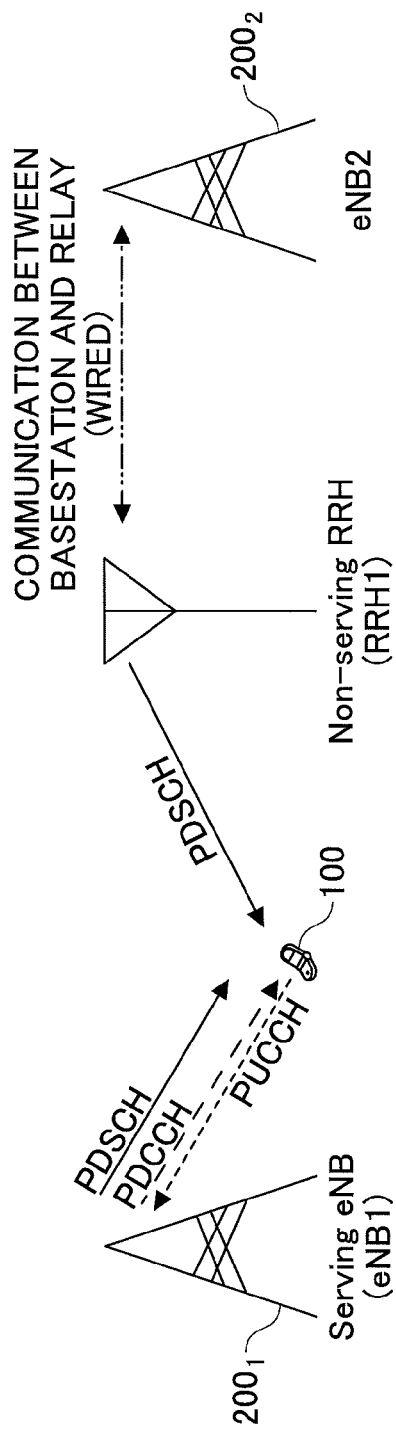
FIG. 17 illustrates an example of CoMP transmission according to an embodiment.

FIG. 17 illustrates a second example of CoMP transmission executed between a base station and an RRH.

In the example illustrated in FIG. 17, the RRH is under control of a base station eNB2, which differs from a serving base station eNB1. The RRH transmits transmission data from the base station eNB2. Namely, the RRH does not execute communication with the serving base station eNB1.

Figure 18:
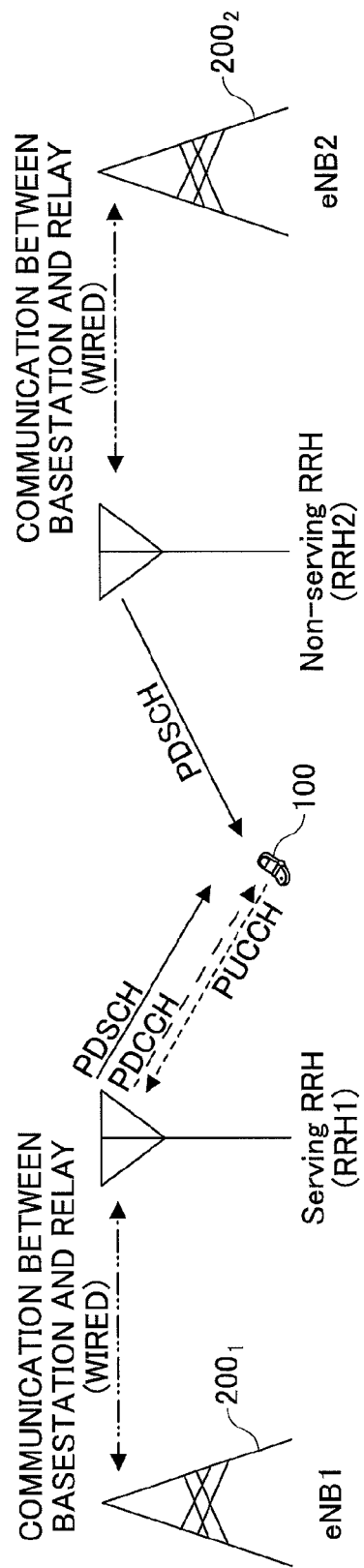
FIG. 18 illustrates an example of CoMP transmission according to an embodiment.

FIG. 18 illustrates a third example of CoMP transmission executed between an RRH1 and an RRH2.

In the example illustrated in FIG. 18, the RRH1 and RRH2 are under control of respective base stations eNB1-eNB2. The RRH1 and RRH2 transmit transmission data from the respective base stations eNB1-eNB2.

Figure 19:
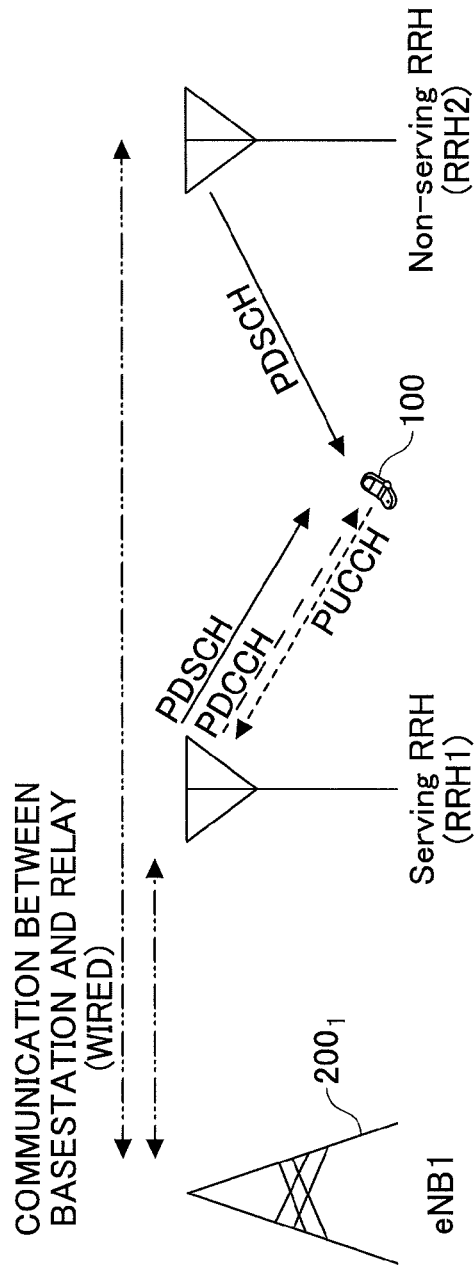
FIG. 19 illustrates an example of CoMP transmission according to an embodiment.

FIG. 19 illustrates a fourth example of CoMP transmission executed between an RRH1 and an RRH2.

In the example illustrated in FIG. 19, the RRH1 and RRH2 are under control of a base station eNB1. The RRH1 and RRH2 transmit transmission data from the base station eNB1.

CoMP transmission may be executed using a combination of base stations, RRHs, and relay nodes.

A protocol used for executing CoMP transmission using relay nodes and RRHs described above is substantially the same as that is used for executing CoMP transmission using a serving base station and a non-serving base station. Differences reside in additional communication between relay nodes if using the relay nodes, and additional communication between a base station and an RRH if using the RRH.

<User Terminal 100>

Figure 20:
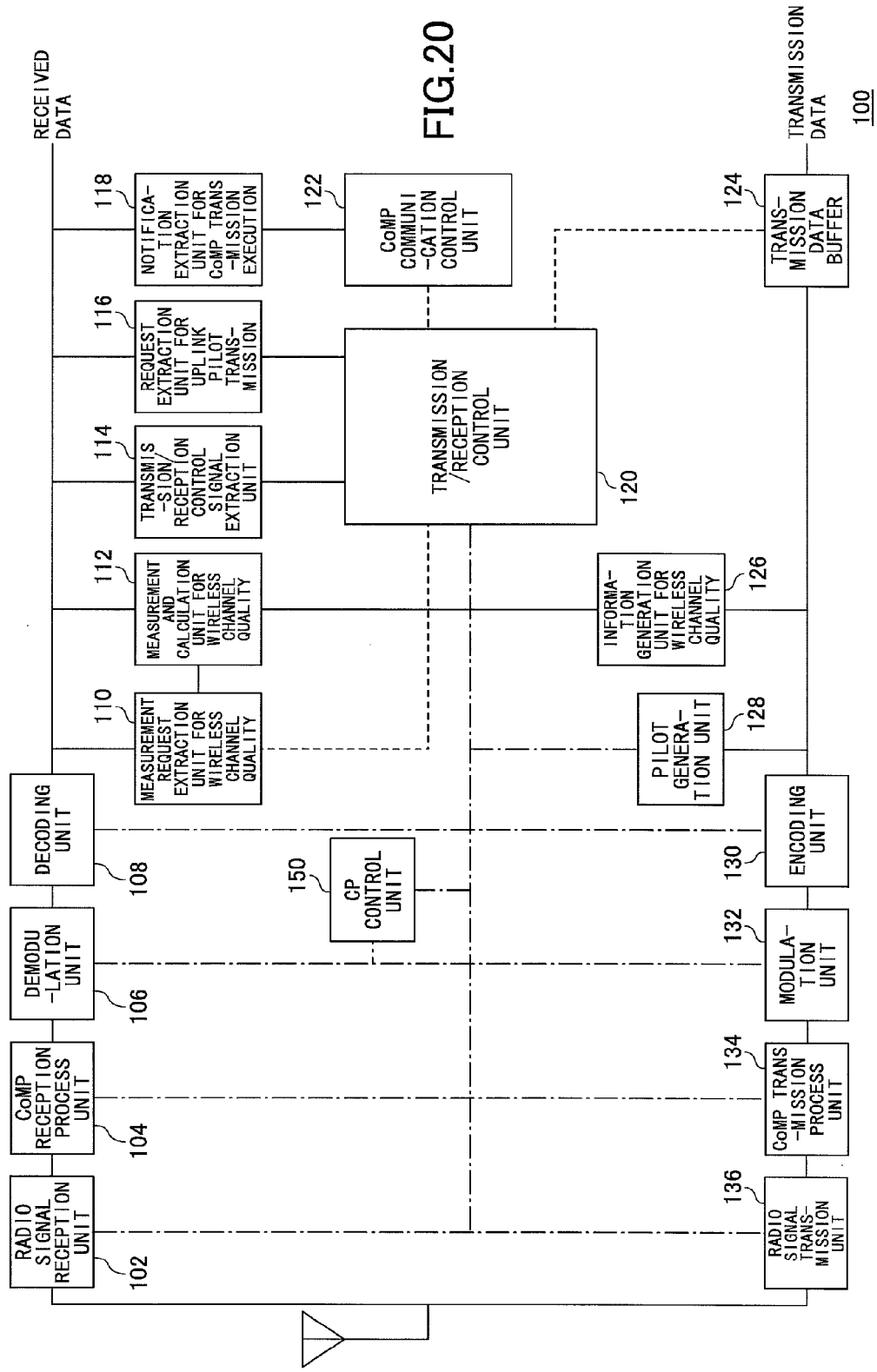
FIG. 20 illustrates an example of a user terminal according to an embodiment.

FIG. 20 illustrates a user terminal 100 according to the first embodiment.

The user terminal 100 includes a radio signal reception unit 102, a CoMP reception process unit 104, a demodulation unit 106, a decoding unit 108, a measurement request extraction unit for wireless channel quality 110, a measurement and calculation unit for wireless channel quality 112, a transmission/reception control signal extraction unit 114, a request extraction unit for uplink pilot transmission 116, an notification extraction unit for CoMP transmission execution 118, a transmission/reception control unit 120, a CoMP communication control unit 122, a transmission data buffer 124, an information generation unit for wireless channel quality 126, a pilot generation unit 128, an encoding unit 130, a modulation unit 132, a CoMP transmission process unit 134, a radio signal transmission unit 136, and a CP control unit 150.

The radio signal reception unit 102 is connected with an antenna. The radio signal reception unit 102 applies frequency conversion to a downlink signal from the serving base station $200_1$ to convert the downlink signal into a baseband signal. The downlink signal includes a measurement report request signal. The wireless reception unit 102 inputs the frequency converted downlink signal into the CoMP reception process unit 104.

The CoMP reception process unit 104 is connected with the radio signal reception unit 102. The CoMP reception process unit 104 sets a CoMP transmission method specified with the downlink transmission control signal following control of the transmission/reception control unit 120, and setting corresponding to the CoMP transmission method. The CoMP reception process unit 104 processes a signal input from the radio signal reception unit 102 with the CoMP transmission method and the setting corresponding to the CoMP transmission method when necessary.

The demodulation unit 106 is connected with the CoMP reception process unit 104. The demodulation unit 106 demodulates a signal input by the CoMP reception process unit 104. The demodulation unit 106 inputs the demodulated signal into the decoding unit 108.

The decoding unit 108 is connected with the demodulation unit 106. The decoding unit 108 regenerates a received signal by decoding the demodulated signal from the demodulation unit 106. The decoding unit 108 inputs the received signal into the measurement request extraction unit for wireless channel quality 110, the measurement and calculation unit for wireless channel quality 112, the transmission/reception control signal extraction unit 114, the request extraction unit for uplink pilot transmission 116, and the notification extraction unit for CoMP transmission execution 118. Also, the decoding unit 108 outputs the received signal.

The measurement request extraction unit for wireless channel quality 110 is connected with the decoding unit 108. The measurement request extraction unit for wireless channel quality 110 extracts a measurement request for wireless channel quality from the received signal input by the decoding unit 108. The measurement request extraction unit for wireless channel quality 110 inputs the measurement request for wireless channel quality into the measurement and calculation unit for wireless channel quality 112.

The measurement and calculation unit for wireless channel quality 112 is connected with the decoding unit 108 and the measurement request extraction unit for wireless channel quality 110. The measurement and calculation unit for wireless channel quality 112 measures wireless channel quality of the connected base station $200_1$ and other base stations $200_2$-$200_m$ following the measurement request for wireless channel quality from the measurement request extraction unit for wireless channel quality 110. The measurement and calculation unit for wireless channel quality 112 notifies a measurement result of wireless channel quality to the information generation unit for wireless channel quality 126. Here, the wireless channel quality includes reception power, reception electric field strength, SNR, CNR, and wireless channel quality indicators such as CQI or the like in a W-CDMA system or an LTE system. Also, the wireless channel quality may include CPICH RSCP, CPICH $E_C/N_0$, RSRP, RSRQ, and the like. These may be called "wireless channel quality" as a whole. When measuring the wireless channel quality, the user terminal 100 may be set so that it can receive pilot signals or the like from base stations, respectively. For example, the user terminal 100 may be set to measure and calculate reception power of the pilot signals or the like.

The information generation unit for wireless channel quality 126 is connected with the measurement and calculation unit for wireless channel quality 112. The information generation unit for wireless channel quality 126 generates wireless channel quality information based on the measurement result of wireless channel quality input from the measurement and calculation unit for wireless channel quality 112. The information generation unit for wireless channel quality 126 inputs the wireless channel quality information into the encoding unit 130.

The encoding unit 130 is connected with the transmission data buffer 124, the information generation unit for wireless channel quality 126, and the pilot generation unit 128. The encoding unit 130 encodes input data from the transmission data buffer 124, the information generation unit for wireless channel quality 126, and the pilot generation unit 128. The encoding unit 130 inputs the encoded data into the modulation unit 132. The input data includes a pilot signal, wireless channel quality information, and transmission data.

The modulation unit 132 is connected with the encoding unit 130. The modulation unit 132 modulates the encoded data from the encoding unit 130. The modulation unit 132 may use a modulation method depending on a wireless channel. The modulation methods may include, for example, phase modulation such as QPSK, 16QAM, 64QAM, 256QAM, 8PSK, quadrature amplitude modulation, and the like. Moreover, the modulation unit 132 may add a CP following control of the CP control unit 150. The modulation unit 132 inputs the modulated signal in which encoded data is modulated, into the CoMP transmission process unit 134.

The CoMP transmission process unit 134 is connected with the modulation unit 132. The CoMP transmission process unit 134 sets a CoMP transmission method and setting corresponding to the CoMP transmission method following control of the transmission/reception control unit 120 if CoMP transmission is to be executed. The CoMP transmission process unit 134 applies CoMP transmission to the modulated signal from the modulation unit 132 following the set CoMP transmission method if CoMP transmission is to be executed.

The radio signal transmission unit 136 is connected with the CoMP transmission process unit 134. The radio signal transmission unit 136 converts the transmission data from the CoMP transmission process unit 134 into a wireless frequency. The radio signal transmission unit 136 transmits the transmission data converted into the wireless frequency as an uplink signal to a base station via the antenna.

The user terminal 100 may report the wireless channel quality information using an uplink control channel. The uplink control channel includes, for example, a PUCCH in an LTE system. Moreover, the user terminal 100 may add information for identifying a base station to the wireless channel quality information.

Also, the user terminal 100 may transmit the wireless channel quality from the base stations $200_2$-$200_m$ to the base station $200_1$. Also, for example, the user terminal 100 may transmit information about the best to third-best wireless channel quality among the base stations $200_2$-$200_m$ and information for identifying the base stations corresponding to the quality to the base station $200_1$. Here, the three is taken as an example, which may be two or more than three. In this way, information reported as the wireless channel quality information can be restricted.

Also, the user terminal 100 may transmit the wireless channel quality information to the base station $200_1$ as a whole, or individually and sequentially.

Also, if a notification signal of CoMP transmission execution is transmitted to the user terminal 100 from the serving base station $200_1$, the notification signal of CoMP transmission execution is processed by the radio signal reception unit 102, the CoMP reception process unit 104, the demodulation unit 106, and the decoding unit 108 to be regenerated.

The notification extraction unit for CoMP transmission execution 118 is connected with the decoding unit 108. The notification extraction unit for CoMP transmission execution 118 extracts the notification signal of CoMP transmission execution from the signal regenerated by the decoding unit 108. The notification extraction unit for CoMP transmission execution 118 inputs the extracted notification signal of CoMP transmission execution into the CoMP communication control unit 122.

The CoMP communication control unit 122 is connected with the notification extraction unit for CoMP transmission execution 118. The CoMP communication control unit 122 notifies that CoMP transmission is to be executed to the transmission/reception control unit 120 based on the notification signal of CoMP transmission execution from the notification extraction unit for CoMP transmission execution 118.

Also, a control signal transmitted from the serving base station $200_1$ is processed by the radio signal reception unit 102, the CoMP reception process unit 104, the demodulation unit 106, and the decoding unit 108 to be regenerated.

The transmission/reception control signal extraction unit 114 is connected with the decoding unit 108. The transmission/reception control signal extraction unit 114 extracts a downlink transmission control signal (reception control signal) from the signal regenerated by the decoding unit 108. The transmission/reception control signal extraction unit 114 inputs the extracted downlink transmission control signal into the transmission/reception control unit 120.

The transmission/reception control unit 120 is connected with the CoMP communication control unit 122, the transmission/reception control signal extraction unit 114, the radio signal reception unit 102, the CoMP reception process unit 104, the demodulation unit 106, the decoding unit 108, the measurement request extraction unit for wireless channel quality 110, the pilot generation unit 128, the encoding unit 130, the modulation unit 132, the CoMP transmission process unit 134, the radio signal transmission unit 136, and the transmission data buffer 124.

The transmission/reception control unit 120 sets an encoding rate into the decoding unit 108, sets a modulation method into the demodulation unit 106, and sets a CoMP transmission method and setting corresponding to the CoMP transmission method into the CoMP reception process unit 104, following the downlink transmission control signal input by the transmission/reception control signal extraction unit 114.

The user terminal 100 receives data transmitted from the serving base station $200_1$ and the non-serving base station $200_n$ following the control information such as CoMP transmission timing notified by the serving base station $200_1$, the CoMP transmission method, the setting corresponding to the CoMP transmission method, the modulation method, the encoding rate, and the like. Specifically, the radio signal reception unit 102 applies frequency conversion to the received signal to convert it into a baseband signal. The CoMP reception process unit 104 executes processing based on the CoMP transmission method and the setting corresponding to the CoMP transmission method. The demodulation unit 106 demodulates the data processed by the CoMP reception process unit 104. The decoding unit 108 regenerates the transmission data. Also, the user terminal 100 receives data transmitted from the serving base station $200_1$ and the non-serving base station $200_n$ following the control information about the CP length or the like. Specifically, the demodulation unit 106 demodulates the data following the CP length controlled by the CP control unit 150.

The CP control unit 150 is connected with the transmission/reception control unit 120, the demodulation unit 106, and the modulation unit 132. The CP control unit 150 controls the CP length when the demodulation unit 106 demodulates data or the modulation unit 132 modulates data following the CP length notified by the transmission/reception control unit 120.

<Operation of Wireless Communication System>

Figure 21:
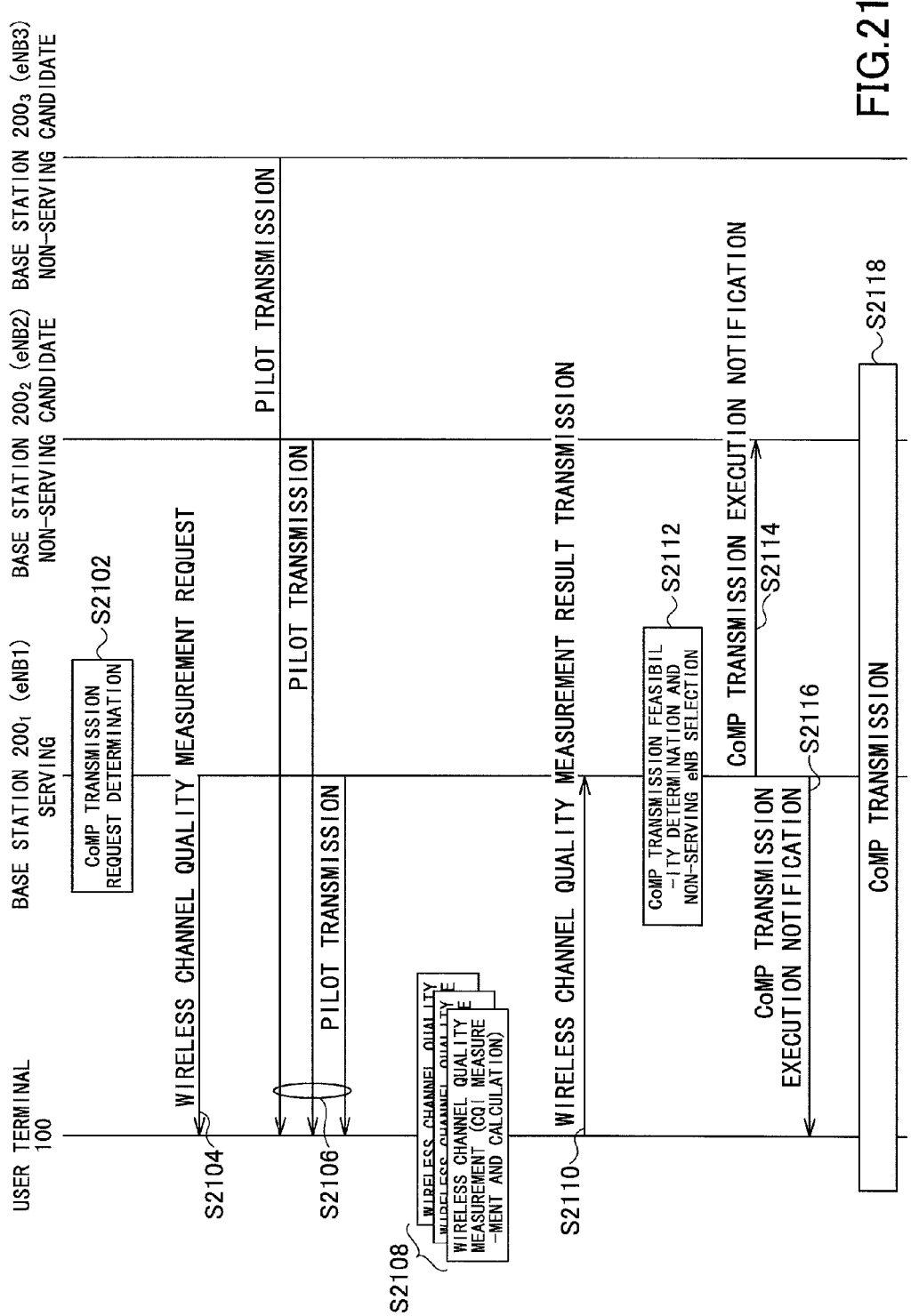
FIG. 21 illustrates an example of operation of a wireless communication system according to an embodiment.

FIG. 21 illustrates operation of the wireless communication system according to the first embodiment. FIG. 21 illustrates an example where two base stations are candidates of a non-serving base station. There may be only one candidate for the non-serving base station or more than two candidates.

A serving base station $200_1$ determines whether to make a request for CoMP transmission (Step S2102). Namely, the CoMP transmission control unit 214 determines whether to execute CoMP transmission. Assume here that it is determined that CoMP transmission is to be requested.

The serving base station $200_1$ transmits requests to measure wireless channel quality to a user terminal 100 (Step S2104). Namely, the measurement request generation unit for wireless channel quality 226 generates a measurement request for wireless channel quality that is to be transmitted to the user terminal 100. Here, it may not be notified as a "signal", but as a command, a message, or a format representing a context. It is the same in the following. The measurement request for wireless channel quality is transmitted to the user terminal 100.

Pilots are transmitted from the serving base station $200_1$ and the base stations $200_2$-$200_3$ (Step S2106). Namely, the downlink pilot generation unit 220 generates a pilot following control of the scheduler 212. The pilot is transmitted to the user terminal 100 via the encoding unit 230, the modulation unit 232, and the radio signal transmission unit 236.

The user terminal 100 measures wireless channel quality of the pilots from the serving base station $200_1$ and the base stations $200_2$-$200_3$ (Step S2108). Namely, the measurement and calculation unit for wireless channel quality 112 measures the wireless channel quality of the pilots from the serving base station $200_1$ and the base stations $200_2$-$200_3$. For example, CQI, RSRP, RSRQ and the like are obtained.

The user terminal 100 transmits the measurement result of the wireless channel quality to serving base station $200_1$ (Step S2110). Namely, the information generation unit for wireless channel quality 126 generates a result notification of wireless channel quality based on the wireless channel quality from the measurement and calculation unit for wireless channel quality 112.

The serving base station $200_1$ determines whether CoMP transmission is feasible. Moreover, if determining CoMP transmission is feasible, the serving base station $200_1$ selects a non-serving base station (Step S2112). Moreover, if determining CoMP transmission is feasible, the serving base station $200_1$ may set the CP length. Namely, the CoMP communication control unit 214 determines whether CoMP transmission is feasible based on the wireless channel quality included in the result notification of wireless channel quality from the user terminal 100. If determining CoMP transmission is feasible, the CoMP communication control unit 214 selects a non-serving base station. Moreover, the CoMP communication control unit 214 sets the CP length. Assume here that it is determined that CoMP transmission is feasible and the base station $200_2$ is selected as a non-serving base station.

The serving base station $200_1$ transmits a notification of CoMP transmission execution to the base station $200_2$ that is selected as a non-serving base station (Step S2114). Namely, the scheduler 212 requests to transmit a notification signal of CoMP transmission execution to the non-serving base station $200_2$ to the notification generation unit for CoMP transmission execution 224. The notification generation unit for CoMP transmission execution 224 generates the notification of CoMP transmission execution following the request from the scheduler 212. The notification of CoMP transmission execution is transmitted to the non-serving base station $200_2$. It may be transmitted to the non-serving base station $200_2$ via the encoding unit 230, the modulation unit 232, and the radio signal transmission unit 236. Moreover, the notification of CoMP transmission execution may include information about the CP length for CoMP transmission. Also, the information about the CP length for CoMP transmission may be transmitted at timing different from the timing of the notification of CoMP transmission execution.

The serving base station $200_1$ transmits the notification of CoMP transmission execution to the user terminal 100 (Step S2116). Namely, the scheduler 212 requests to transmit a notification of CoMP transmission execution to the user terminal 100, to the notification generation unit for CoMP transmission execution 224. The notification generation unit for CoMP transmission execution 224 generates the notification of CoMP transmission execution following the request from the scheduler 212. The notification of CoMP transmission execution is transmitted to the user terminal 100 via the encoding unit 230, the modulation unit 232, and the radio signal transmission unit 236. Moreover, a notification of CoMP transmission execution may include information about the CP length for CoMP transmission. Also, the information about the CP length for CoMP transmission may be transmitted at timing different from the timing of the notification of CoMP transmission execution.

CoMP transmission is now executed among the user terminal 100, the serving base station $200_1$, and the non-serving base station $200_2$ (Step S2118).

<Operation of Serving Base Station>

Figure 22:
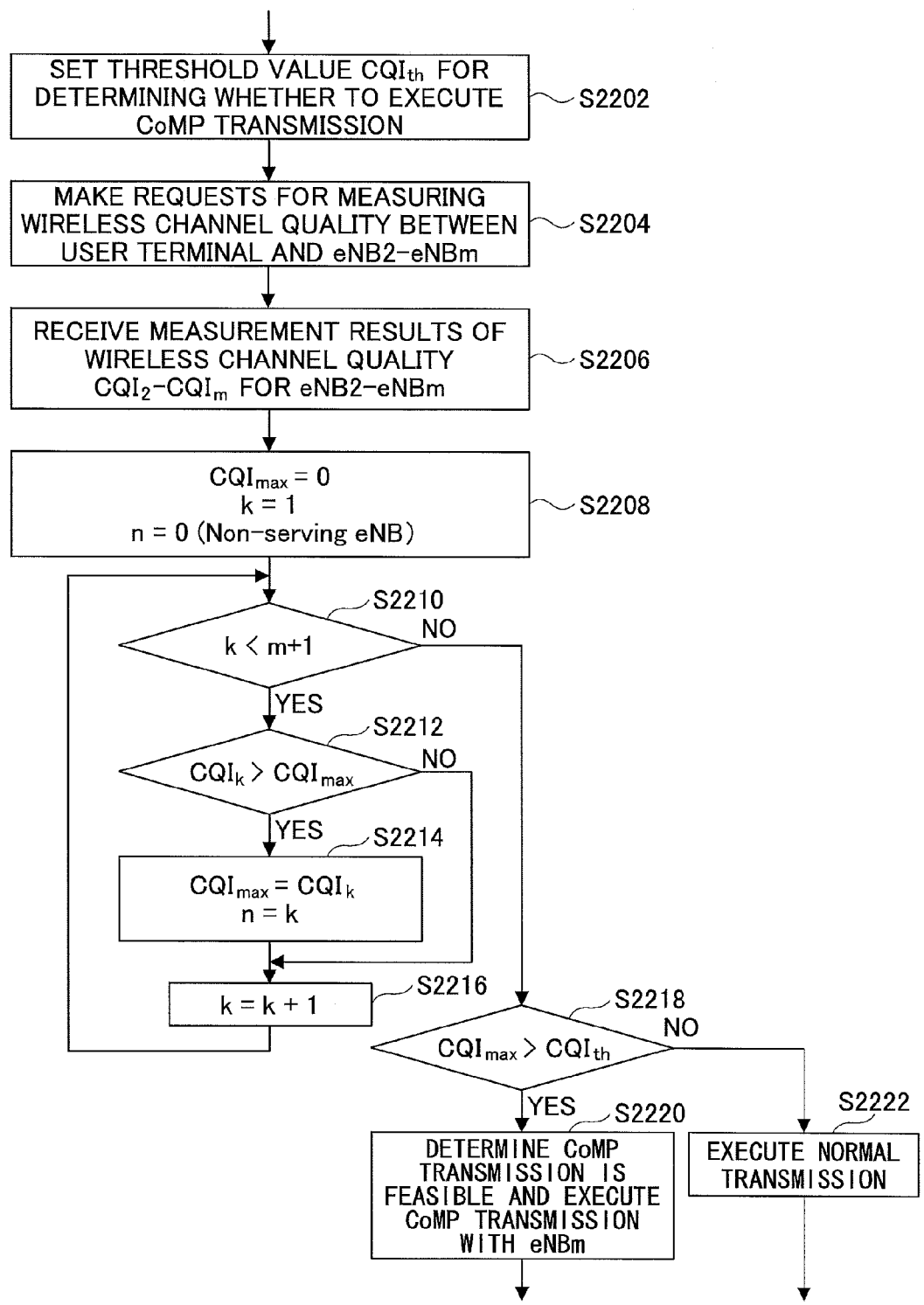
FIG. 22 illustrates an example of operation of a base station according to an embodiment.

FIG. 22 illustrates operations of the serving base station $200_1$. FIG. 22 mainly illustrates operations for determining whether CoMP transmission is feasible.

The serving base station $200_1$ sets a threshold value $CQI_{th}$ for determining whether to execute CoMP transmission (Step S2202). Namely, the CoMP communication control unit 214 is set with the threshold value $CQI_{th}$ for determining whether to execute CoMP transmission.

The serving base station $200_1$ requests to the user terminal 100 to measure wireless channel quality between the user terminal 100 and base stations $200_2$-$200_m$ (Step S2204). Namely, the measurement request generation unit for wireless channel quality 226 generates a measurement request for wireless channel quality and transmits the request to the user terminal 100.

The serving base station $200_1$ receives from the user terminal 100 the measurement results of the wireless channel quality indicator $CQI_2$-$CQI_m$ between the user terminal 100 and the base stations $200_2$-$200_m$ (Step S2206). Namely, the information extraction unit for wireless channel quality 210 extracts the measurement results of the wireless channel quality from the user terminal 100. The measurement results of the wireless channel quality extracted by the information extraction unit for wireless channel quality 210 is input into the CoMP communication control unit 214.

The serving base station $200_1$ sets a maximum value $CQI_{max}$ among CQIs to 0, sets k to 1, and sets n to 0 (Step S2208). Namely, the CoMP communication control unit 214 initializes $CQI_{max}$=0, k=1, and n=0.

The serving base station $200_1$ determines whether k<m+1 (Step S2210). Namely, the CoMP communication control unit 214 determines whether k<m+1.

If k<m+1 (Step S2210 YES), the serving base station $200_1$ determines whether $CQI_k$>$CQI_{max}$ (Step S2212).

If $CQI_k$>$CQI_{max}$ (Step S2212 YES), the serving base station $200_1$ sets $CQI_{max}$=$CQI_k$ and sets n=k (Step S2214). After setting at Step S2214 or if not $CQI_k$>$CQI_{max}$ (Step S2212 NO), set k=k+1, and the procedure goes back to Step S2210.

If it is determined that not k<m+1 at Step S2210 (Step S2210 NO), the serving base station $200_1$ determines whether $CQI_{max}$>$CQI_{th}$ (Step S2218).

If $CQI_{max}$>$CQI_{th}$ (Step S2218 YES), the serving base station $200_1$ determines CoMP transmission is feasible (Step S2220). The serving base station $200_1$ executes CoMP transmission with the non-serving base station $200_2$.

If not $CQI_{max}$>$CQI_{th}$ (Step S2218 NO), the serving base station $200_1$ determines not to execute CoMP transmission (Step S2222). In this case, normal transmission is executed. Currently executing transmission may be continued.

<Case where Uplink CoMP Transmission is Controlled>
<Base Station $200_n$>

In this case, a base station $200_n$ is substantially the same as the one illustrated in FIG. 10.

The scheduler 212 of the base station $200_1$ communicating with the connected user terminal 100 monitors uplink transmission quality based on the wireless channel quality information extracted by the information extraction unit for wireless channel quality 210. If detecting reduction of transmission speed due to reduction of uplink transmission quality, the scheduler 212 notifies that the downlink transmission speed is reduced to the CoMP communication control unit 214.

If the scheduler 212 notifies that the downlink transmission speed is reduced, the CoMP communication control unit 214 determines whether to execute CoMP transmission. If determining to execute CoMP transmission, the CoMP communication control unit 214 transmits measurement requests for uplink wireless channel quality to the base stations $200_2$-$200_m$ close to the base station $200_2$.

The measurement requests for uplink wireless channel quality are notified to the base stations $200_2$-$200_m$ via an interface between sectors in the base station, an interface between base stations, an upper apparatus, or the like.

The scheduler 212 requests measurement of wireless channel quality to the measurement and calculation unit for wireless channel quality 216. The measurement and calculation unit for wireless channel quality 216 is connected with the scheduler 212 and the decoding unit 208. The measurement and calculation unit for wireless channel quality 216 measures wireless channel quality following the request from the scheduler 212. The measurement and calculation unit for wireless channel quality 216 inputs the wireless channel quality into the scheduler 212.

The scheduler 212 requests to the request generation unit for uplink pilot transmission 222 to generate an uplink pilot transmission request signal, which is to be sent to the user terminal 100.

The request generation unit for uplink pilot transmission 222 is connected with the scheduler 212 and the encoding unit 230. The request generation unit for uplink pilot transmission 222 generates the uplink pilot transmission request signal requested by the scheduler 212 to be input into the encoding unit 230. The uplink pilot transmission request signal is encoded by the encoding unit 230, and modulated by the modulation unit 232. The uplink pilot transmission request signal is converted into a wireless frequency by the radio signal transmission unit 236 via the CoMP transmission process unit 234, and transmitted to the user terminal 100 via the antenna. When transmitting the uplink pilot transmission request signal to the user terminal 100, control information required for transmitting the uplink pilot transmission request signal may also be transmitted. The control information includes wireless resources to be used, transmission timing, and the like.

An uplink pilot signal is transmitted by the user terminal 100. The base stations $200_2$-$200_m$ measure wireless channel quality based on the uplink pilot signal. The base stations $200_2$-$200_m$ notifies the measurement results of wireless channel quality to the base station $200_1$.

The measurement results of wireless channel quality from the base stations $200_2$-$200_m$ are extracted by the information extraction unit for wireless channel quality 210 of the base station $200_1$. The information extraction unit for wireless channel quality 210 inputs the measurement results of wireless channel quality from the base stations $200_2$-$200_m$ into the CoMP communication control unit 214. The CoMP communication control unit 214 determines whether uplink CoMP transmission is feasible based on the wireless channel quality information. If determining CoMP transmission is feasible, the CoMP communication control unit 214 selects a non-serving base station. When selecting a non-serving base station, the CoMP communication control unit 214 may calculate difference between the wireless channel quality of the serving base station $200_1$ and the wireless channel quality of the base stations other than the serving base station $200_1$ to determine whether there are base stations whose difference of wireless channel quality is less than a threshold value for difference of wireless channel quality. If determining that there is a base station that has the difference of wireless channel quality less than the threshold value for difference of wireless channel quality, the CoMP communication control unit 214 determines that uplink CoMP transmission is feasible. If determining that there are no base stations that have the difference of wireless channel quality less than the threshold value for difference of wireless channel quality, the CoMP communication control unit 214 determines not to execute uplink CoMP transmission.

If determining uplink CoMP transmission is feasible, the CoMP transmission control unit 214 selects a base station with the least difference of wireless channel quality as a non-serving base station. Assume here that the base station $200_n$ is selected as a non-serving base station.

Moreover, the CoMP communication control unit 214 selects an uplink CoMP transmission method to be used among JR, CS, and the like.

If determining uplink CoMP transmission is feasible, the CoMP communication control unit 214 notifies information that uplink CoMP transmission is to be executed and the uplink CoMP transmission method to the scheduler 212.

If the CoMP communication control unit 214 determines that uplink CoMP transmission is feasible, the scheduler 212 notifies that uplink CoMP transmission is to be executed to the notification generation unit for CoMP transmission execution 224.

The notification generation unit for CoMP transmission execution 224 is connected with the scheduler 212 and the encoding unit 230. If the scheduler 212 notifies that uplink CoMP transmission is to be executed, the notification generation unit for CoMP transmission execution 224 generates a notification signal of CoMP transmission execution. The notification signal of CoMP transmission execution is transmitted to the user terminal 100.

The CoMP communication control unit 214 sets a CP length to be used for uplink CoMP transmission. The CoMP communication control unit 214 inputs information about the CP length into the scheduler 212.

The scheduler 212 sets wireless resources and transmission timing to be used for uplink CoMP transmission. Also, the scheduler 212 sets a modulation method and an encoding rate to be used for uplink CoMP transmission, and sets control information corresponding to the set uplink CoMP transmission method. For example, if JR is set as the CoMP transmission method, a weighted coefficient and a precoding matrix are set as the control information.

The scheduler 212 inputs the control information corresponding to the set uplink CoMP transmission method into the control signal generation unit 228. The scheduler 212 may input the information about the CP length into the control signal generation unit 228. The control signal generation unit 228 generates an uplink control signal to input into the encoding unit 230. The control signal may include the information about the CP length. The uplink control signal is transmitted to the user terminal 100.

The serving base station $200_1$ notifies the information that CoMP transmission is to be executed to the non-serving base station $200_n$ via an interface between sectors (not illustrated) in the base station, an interface between base stations (not illustrated), an upper apparatus (not illustrated), or the like. The interface between base stations may be the one corresponding to X2 in an LTE system. The information that CoMP transmission is to be executed may include information that CoMP transmission is going to be executed and information about timing of CoMP transmission.

The serving base station $200_1$ notifies the uplink control signal to the non-serving base station $200_n$ via a base station interface or the like. The scheduler 212 of the non-serving base station controls the radio signal reception unit 202, the CoMP reception process unit 204, the demodulation unit 206, the encoding unit 208, and the like of the non-serving base station $200_n$ following the uplink control signal.

The scheduler 212 of the serving base station $200_1$ controls the radio signal reception unit 202, the CoMP reception process unit 204, the demodulation unit 206, the decoding unit 208, and the like of the serving base station $200_1$.

The non-serving base station $200_n$ receives transmission data from the user terminal 100. Specifically, the radio signal reception unit 202 of the non-serving base station $200_n$ converts the received signal into a baseband signal. A CoMP reception process is executed by the CoMP reception process unit 204 of the non-serving base station $200_n$ based on the CoMP transmission method following the control signal notified from the serving base station $200_1$. The demodulation unit 206 of the non-serving base station $200_n$ demodulates the signal following the control signal notified by the serving base station $200_1$. The control signal includes, for example, the modulation method. The decoding unit 208 of the non-serving base station $200_n$ decodes the signal following the control signal notified by the serving base station $200_1$. The control signal includes, for example, the encoding rate. The above procedure regenerates the received data.

The decoded data is transmitted to the serving base station $200_1$ via, for example, an interface between base stations. The demodulated, decoded data may be transmitted to the serving base station $200_1$. Also, for example, the demodulated, decoded data may have frequency conversion applied to be converted into a baseband signal, and be transmitted to the serving base station $200_1$. The serving base station $200_1$ applies a reception process for a signal transmitted with CoMP transmission to the received signal from the non-serving base station $200_n$ and a received signal at the serving base station $200_1$. After that, the serving base station $200_1$ may execute all of the reception process. Also, the non-serving base station $200_n$ may transmit the received signal to the serving base station $200_1$ by executing the reception procedure for a signal transmitted with CoMP transmission.

Similarly to the non-serving base station $200_n$, the serving base station $200_1$ receives data transmitted from the user terminal 100. Here, if data converted to a baseband signal is transmitted from the non-serving base station $200_n$, the serving base station $200_1$ converts the received signal to a baseband signal, and executes signal processing together with the baseband signal.

Transmission data from the user terminal 100 collected at the serving base station $200_1$ is combined into an upper-level packet to be transmitted to an upper apparatus (not illustrated). In a wireless communication system such as an LTE system, a W-CDMA system, or the like, the unit of data transmitted through a wireless channel is a packet at MAC (Medium Access Control) layer. A MAC layer packet is called a "MAC PDU (Protocol Data Unit)". Also, a PDU at RLC (Radio Link Control) layer, which is an upper-layer of MAC, is constituted with MAC PDUs. A PDU at PDCP (Packet Data Convergence Protocol) layer, which is an upper-layer of RLC, is constituted with RLC PDUs. For example, similarly to an LTE system, data may be combined into a PDCP PDU at the serving base station $200_1$ to be transmitted to a serving gateway (S-GW), which is an upper apparatus. The PDCP PDU transmitted to the serving gateway may be transmitted to the other side of communication, or a user terminal, via a core network.

<User Terminal 100>

The user terminal 100 in this case is the same as the one illustrated in FIG. 20.

In response to receiving an uplink control signal, the user terminal 100 converts the uplink control signal to a baseband signal with the radio signal reception unit 102. The uplink control signal converted to the baseband signal is demodulated by the demodulation unit 106, and decoded by the decoding unit 108 to be regenerated.

The transmission/reception control signal extraction unit 114 extracts the uplink control signal from the regenerated signal. The transmission/reception control signal extraction unit 114 inputs the uplink control signal into the transmission/reception control unit 120.

Following the uplink control signal, the transmission/reception control unit 120 controls the encoding unit 130, the modulation unit 132, the CoMP transmission process unit 134, the radio signal transmission unit 136, and the like for uplink transmission. The uplink control signal includes uplink transmission timing, wireless resources to be used, and the like.

Also, in response to receiving an uplink pilot transmission request signal, the user terminal 100 converts the uplink pilot transmission request signal to a baseband signal with the radio signal reception unit 102. The received signal is demodulated by the demodulation unit 106. The signal demodulated by the decoding unit 108 is decoded to regenerates the received signal.

The request extraction unit for uplink pilot transmission 116 extracts the uplink pilot transmission request signal from the signal regenerated by the decoding unit 108. The request extraction unit for uplink pilot transmission 116 inputs the uplink pilot transmission request signal into the transmission/reception control unit 120.

In response to receiving the uplink pilot transmission request signal as input from the request extraction unit for uplink pilot transmission 116, the transmission/reception control unit 120 controls transmission of the pilot signal following a control signal included in the uplink pilot transmission request signal. For example, the control signal included in the uplink pilot transmission request signal includes information about transmission timing, wireless resources used for pilot transmission, and the like. The transmission/reception control unit 120 requests to generate a pilot signal to the pilot generation unit 128.

The pilot generation unit 128 generates a pilot signal following control of the transmission/reception control unit 120. The pilot signal generated by the pilot generation unit 128 is transmitted to the base stations $200_1$-$200_m$ via the modulation unit 132, the radio signal transmission unit 136, and the antenna. The pilot signal may be encoded by the encoding unit 130.

The pilot signal may be transmitted, for example, using a physical uplink control channel (PUCCH) or a physical uplink shared channel (PUSCH) similarly to an LTE system. The pilot signal may be called a "reference signal (RS)" similarly to an LTE system.

Also, in an LTE system, a sounding reference signal (SRS) is transmitted in a resource block specified by a base station within a system band for selecting a wireless resource to be used for uplink data transmission. Sounding implies measurement of a propagation environment. A wireless resource to be used for uplink data transmission may be selected by having a base station receive a sounding reference signal, then measure and calculate wireless channel quality. Similarly to an LTE system, wireless resources may be managed with the units of resource blocks that are specified with the number of subcarriers and the number of symbols in time direction.

A PUCCH is a control channel specific to a user terminal. Also, a PUSCH is a shared channel used among user terminals. In a shared channel, a wireless resource is used by sharing it among a plurality of user terminals. On the other hand, a common channel is used by a plurality of user terminals to transmit the same information with the same wireless resource. Therefore, a shared channel differs from a common channel.

The base stations $200_1$-$200_m$ receive a pilot signal transmitted by the user terminal 100. The measurement and calculation unit for wireless channel quality 216 measures and calculates wireless channel quality such as reception power and the like based on the pilot signal. The measurement and calculation unit for wireless channel quality 216 of the base station $200_1$ inputs the measured and calculated result into the scheduler 212 and the CoMP communication control unit 214. The measurement and calculation unit for wireless channel quality 216 of each of the base stations $200_2$-$200_m$ transfers the measured and calculated result to the base station $200_1$ via an interface between sectors (not illustrated) in the base station, an interface between base stations (not illustrated), an upper apparatus (not illustrated), or the like, following control of the scheduler 212. The measured and calculated result is input into the CoMP communication control unit 214 of the base station $200_1$.

The user terminal 100 transmits an uplink signal. Specifically, the transmission/reception control unit 120 calculates an amount of transmission data that can be transmitted from the used wireless resource, the modulation method and the encoding rate. The transmission/reception control unit 120 reads transmission data from the transmission data buffer 124. The read data is input into the encoding unit 130. The encoding unit 130 encodes the data following the encoding method specified by the control signal. Following the modulation method specified by the control signal, the modulation unit 132 modulates the data encoded by the encoding unit 130. Moreover, the modulation unit 132 appends a CP following control of the CP control unit 150. The CoMP transmission process unit 134 applies signal processing to the data that is required for the specified CoMP transmission method and CoMP transmission. The radio signal transmission unit 136 converts the processed data to a wireless frequency. The data converted to the wireless frequency is transmitted to the base station $200_1$ and the base station $200_n$ via the antenna.

<Operation of Wireless Communication System>

In the example illustrated in FIG. 22, operation of a wireless communication system is substantially the same as the one illustrated in FIG. 21.

<Operation of Serving Base Station>

In this case, operation of a serving base station is substantially the same as the one illustrated in FIG. 22.

Second Embodiment

<Case where a User Terminal Determines Whether to Execute CoMP Transmission>
<Case where Downlink CoMP Transmission is Controlled>
<Base Station $200_n$>

Figure 23:
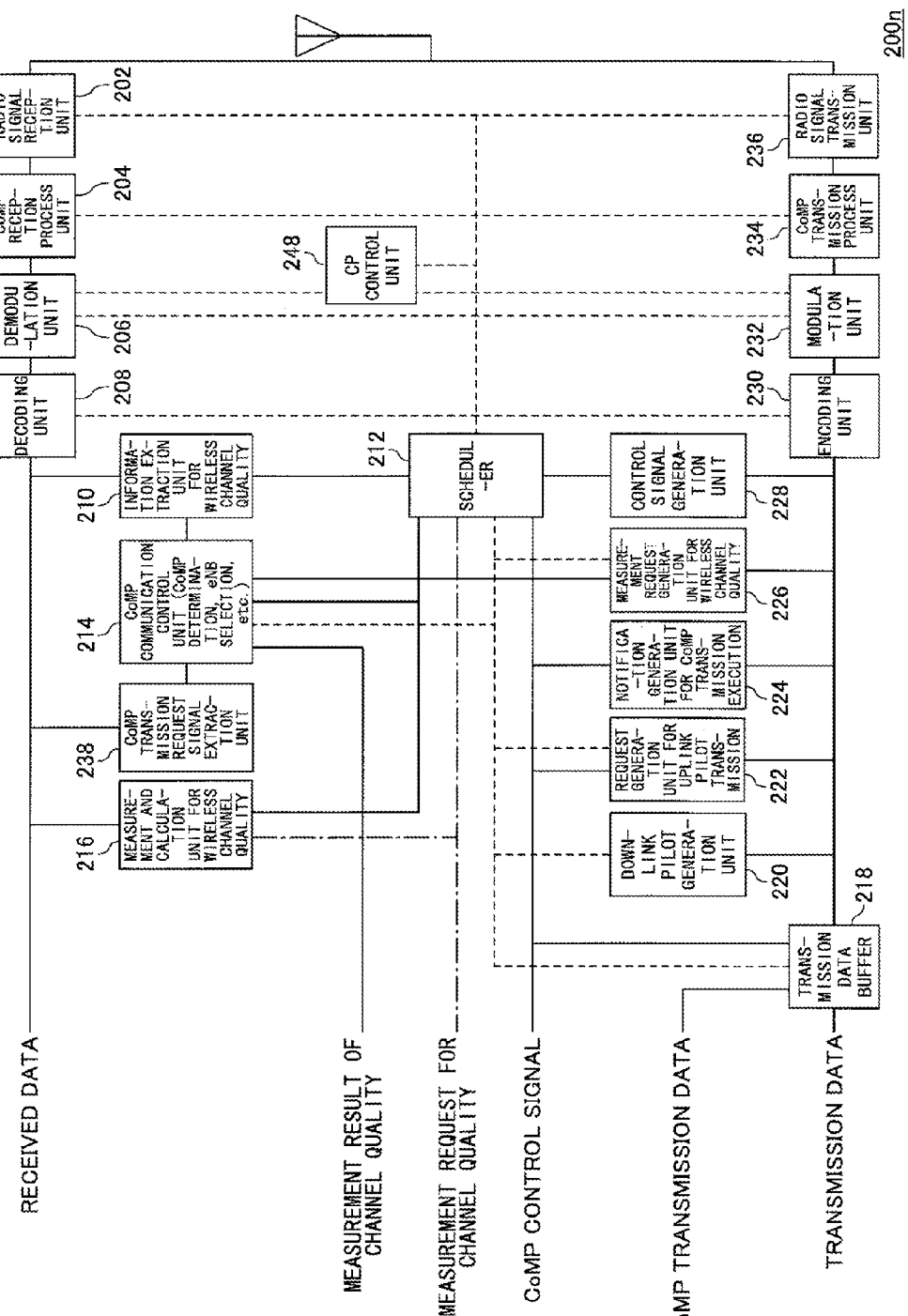
FIG. 23 illustrates an example of a base station according to an embodiment.

FIG. 23 illustrates a base station according to the second embodiment.

The base station $200_n$ includes a radio signal reception unit 202, a CoMP reception process unit 204, a demodulation unit 206, a decoding unit 208, an information extraction unit for wireless channel quality 210, a scheduler 212, a CoMP communication control unit 214, a measurement and calculation unit for wireless channel quality 216, a transmission data buffer 218, a downlink pilot generation unit 220, a request generation unit for uplink pilot transmission 222, a notification generation unit for CoMP transmission execution 224, a measurement request generation unit for wireless channel quality 226, a control signal generation unit 228, an encoding unit 230, a modulation unit 232, a CoMP transmission process unit 234, a radio signal transmission unit 236, a CoMP transmission request signal extraction unit 238, and a CP control unit 248.

The base station $200_n$ differs from the one described with reference to FIG. 10 in that the CoMP transmission request signal extraction unit 238 is added. The CoMP transmission request signal extraction unit 238 is connected with the decoding unit 208 and the CoMP communication control unit 214.

The base station $200_1$ receives a CoMP transmission request signal from a user terminal 100.

The radio signal reception unit 202 applies frequency conversion to the CoMP transmission request signal to convert it to a baseband signal. The demodulation unit 206 demodulates the CoMP transmission request signal converted to the baseband signal. The decoding unit 208 decodes the demodulated CoMP transmission request signal.

The CoMP transmission request signal extraction unit 238 extracts the decoded CoMP transmission request signal. The CoMP transmission request signal extraction unit 238 inputs the CoMP transmission request signal into the CoMP communication control unit 214.

The CoMP communication control unit 214 receives the CoMP transmission request signal as input from the CoMP transmission request signal extraction unit 238. The CoMP communication control unit 214 instructs the measurement request generation unit for wireless channel quality 226 to generate a request signal for measuring wireless channel quality.

The measurement request generation unit for wireless channel quality 226 generates the request signal for measuring wireless channel quality as a control signal following the instruction by the CoMP communication control unit 214. The measurement request generation unit for wireless channel quality 226 inputs the request signal for measuring wireless channel quality into the encoding unit 230.

The request signal for measuring wireless channel quality is encoded by the encoding unit 230, modulated by the modulation unit 232, converted to a wireless frequency by the radio signal transmission unit 236, then transmitted to the user terminal 100 via the antenna.

Operations other than the CoMP transmission request signal extraction unit 238 are substantially the same as the base station described above.

<User Terminal 100>

Figure 24:
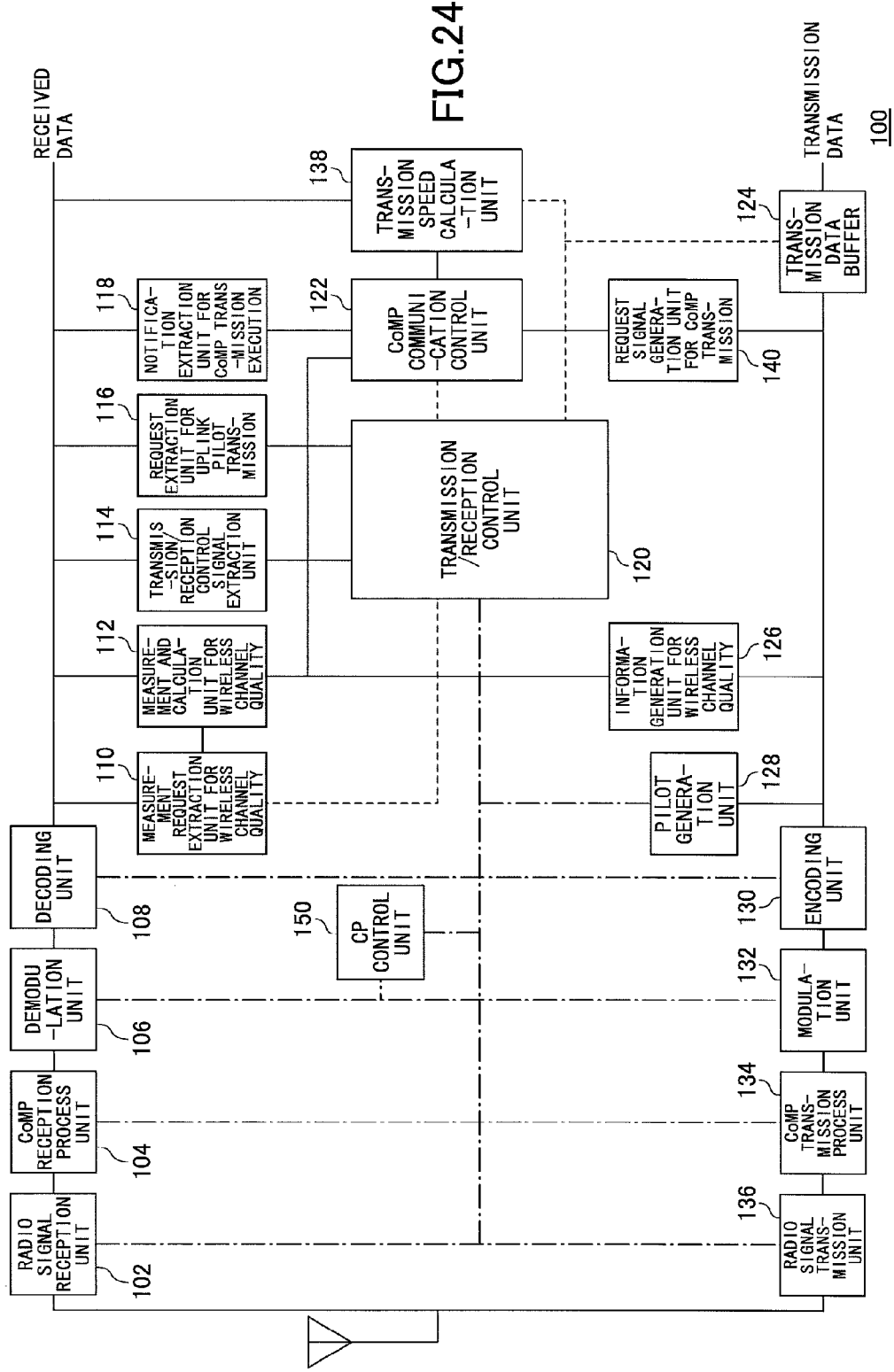
FIG. 24 illustrates an example of a user terminal according to an embodiment.

FIG. 24 illustrates a user terminal according to the second embodiment.

The user terminal 100 includes a radio signal reception unit 102, a CoMP reception process unit 104, a demodulation unit 106, a decoding unit 108, a measurement request extraction unit for wireless channel quality 110, a measurement and calculation unit for wireless channel quality 112, a transmission/reception control signal extraction unit 114, a request extraction unit for uplink pilot transmission 116, a notification extraction unit for CoMP transmission execution 118, a transmission/reception control unit 120, a CoMP communication control unit 122, a transmission data buffer 124, an information generation unit for wireless channel quality 126, a pilot generation unit 128, an encoding unit 130, a modulation unit 132, a CoMP transmission process unit 134, a radio signal transmission unit 136, a transmission speed calculation unit 138, a request signal generation unit for CoMP transmission 140, and a CP control unit 150.

The user terminal 100 differs from the one described with reference to FIG. 20 in that the transmission speed calculation unit 138 and the request signal generation unit for CoMP transmission 140 are added. The transmission speed calculation unit 138 is connected with the decoding unit 108, the transmission/reception control unit 120, the CoMP communication control unit 122, and the transmission data buffer 124. The request signal generation unit for CoMP transmission 140 is connected with the CoMP communication control unit 122 and the encoding unit 130.

The measurement and calculation unit for wireless channel quality 112 measures and calculates wireless channel quality based on a downlink signal from the base station 200 communicating with the user terminal 100. The measurement and calculation unit for wireless channel quality 112 inputs the measurement result of wireless channel quality into the CoMP communication control unit 140.

Also, the transmission speed calculation unit 138 calculates downlink transmission speed based on a downlink signal from the base station 200 communicating with the user terminal 100. The transmission speed calculation unit 138 inputs the downlink transmission speed into the CoMP communication control unit 122. Here, the downlink transmission speed may be calculated from an amount of data that has been received without an error for certain duration.

The CoMP communication control unit 122 determines whether CoMP transmission is required based on the measurement result of the wireless channel quality input from the measurement and calculation unit for wireless channel quality 112 and the downlink transmission speed input from the transmission speed calculation unit 138.

If determining that CoMP transmission is required, the CoMP communication control unit 122 requests to generate a CoMP transmission request signal to the request signal generation unit for CoMP transmission 140.

If requested to generate a CoMP transmission request signal by the CoMP communication control unit 122, the request signal generation unit for CoMP transmission 140 generates the CoMP transmission request signal. The request signal generation unit for CoMP transmission 140 inputs the CoMP transmission request signal into the encoding unit 130. The CoMP transmission request signal is encoded by the encoding unit 130, modulated by the modulation unit 132, converted to a wireless frequency by the radio signal transmission unit 136, then transmitted to the base station $200_1$ via the antenna.

<Operation of Wireless Communication System>

Figure 25:
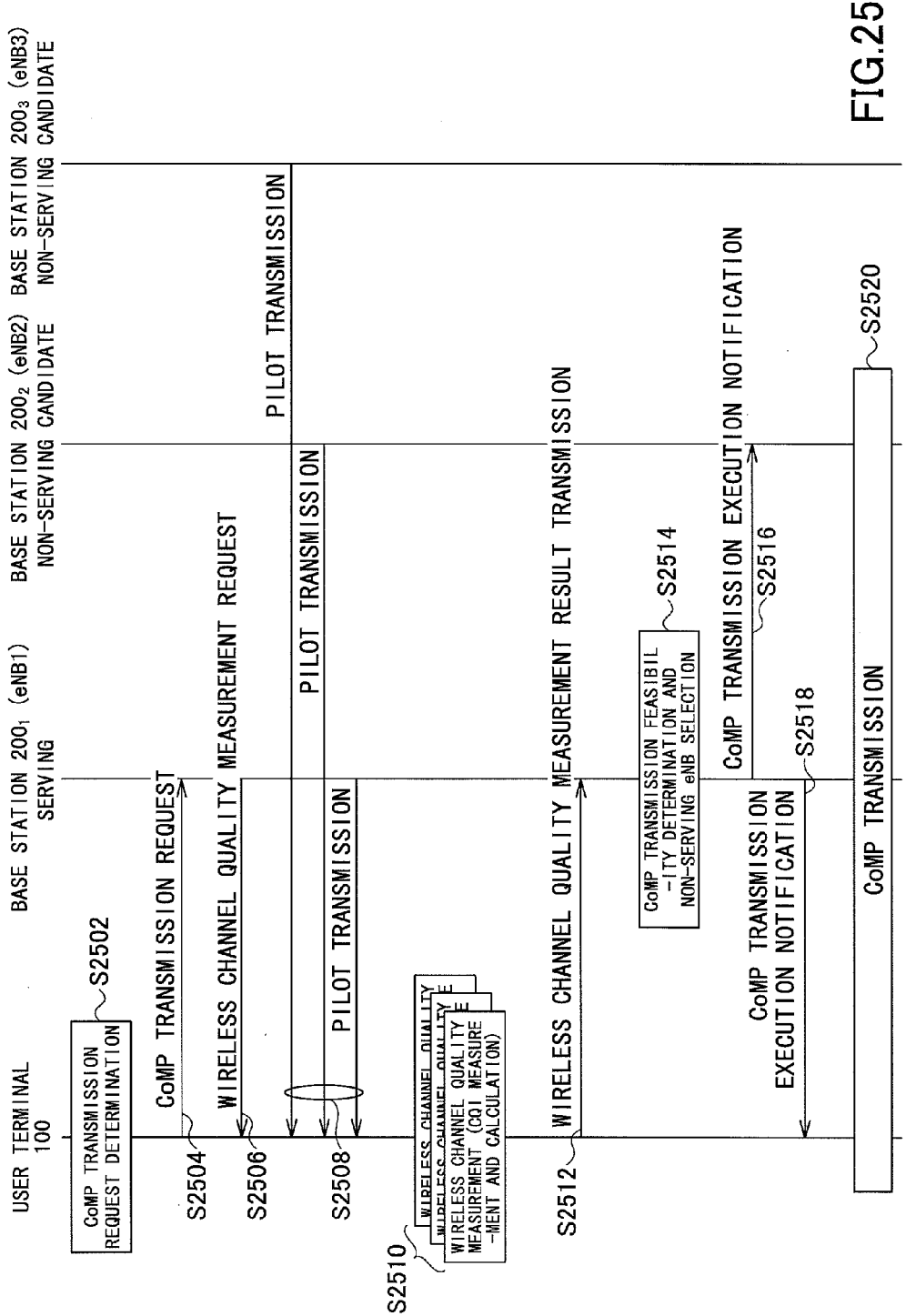
FIG. 25 illustrates an example of operation of a wireless communication system according to an embodiment.

FIG. 25 is a sequence chart illustrating operation of the wireless communication system according to the second embodiment. FIG. 25 illustrates an example where two base stations are candidates of the serving base station. There may be only one candidate serving base station or more than two candidates.

The user terminal 100 determines whether to make a request for CoMP transmission (Step S2502). Namely, the CoMP transmission control unit 122 determines whether to execute CoMP transmission. Assume here that it is determined that CoMP transmission is to be requested.

The user terminal 100 transmits the CoMP transmission request to the serving base station $200_1$ (Step S2504). Namely, the CoMP transmission request generated by the request signal generation unit for CoMP transmission 140 is transmitted to the serving base station $200_1$.

The serving base station $200_1$ transmits a measurement request for measuring wireless channel quality (Step S2506). Namely, the measurement request generation unit for wireless channel quality 226 generates the measurement request for measuring wireless channel quality that is to be transmitted to the user terminal 100. The measurement request for measuring wireless channel quality is transmitted to the user terminal 100.

Pilots are transmitted from the serving base station $200_1$ and the base stations $200_2$-$200_3$ (Step S2508). Namely, the downlink pilot generation unit 220 generates a pilot following control of the scheduler 212. The pilot is transmitted to the user terminal 100 via the encoding unit 230, the modulation unit 232, and the radio signal transmission unit 236.

The user terminal 100 measures wireless channel quality of the pilots from the serving base station $200_1$ and the base stations $200_2$-$200_3$ (Step S2510). Namely, the measurement and calculation unit for wireless channel quality 112 measures the wireless channel quality of the pilots from the serving base station $200_1$ and the base stations $200_2$-$200_3$. For example, CQI, RSRP, RSRQ and the like are obtained.

The user terminal 100 transmits the measurement result of the wireless channel quality to the serving base station $200_1$ (Step S2512). Namely, the information generation unit for wireless channel quality 126 generates a result notification of wireless channel quality based on the wireless channel quality from the measurement and calculation unit for wireless channel quality 112.

The serving base station $200_1$ determines whether CoMP transmission is feasible. Moreover, if determining CoMP transmission is feasible, the serving base station $200_1$ selects a non-serving base station (Step S2514). Moreover, if determining CoMP transmission is feasible, the serving base station $200_1$ may set the CP length. Namely, the CoMP communication control unit 214 determines whether CoMP transmission is feasible based on the wireless channel quality included in the result notification of wireless channel quality from the user terminal 100. If determining CoMP transmission is feasible, the CoMP communication control unit 214 selects a non-serving base station. Moreover, the CoMP communication control unit 214 sets the CP length. Assume here that it is determined that CoMP transmission is feasible and the base station $200_2$ is selected as a non-serving base station.

The serving base station $200_1$ transmits a notification of CoMP transmission execution to the base station $200_2$ that is selected as a non-serving base station (Step S2516). Namely, the scheduler 212 requests to the notification generation unit for CoMP transmission execution 224 for transmitting a notification signal of CoMP transmission execution to the non-serving base station $200_2$. The notification generation unit for CoMP transmission execution 224 generates the notification of CoMP transmission execution following the request from the scheduler 212. The notification of CoMP transmission execution is transmitted to the non-serving base station $200_2$. It may be transmitted to the non-serving base station $200_2$ via the encoding unit 230, the modulation unit 232, and the radio signal transmission unit 236. Moreover, the notification of CoMP transmission execution may include information about the CP length for CoMP transmission.

The serving base station $200_1$ transmits the notification of CoMP transmission execution to the user terminal 100 (Step S2518). Namely, the scheduler 212 requests to transmit a notification of CoMP transmission execution to the user terminal 100 to the notification generation unit for CoMP transmission execution 224. The notification generation unit for CoMP transmission execution 224 generates the notification of CoMP transmission execution following the request from the scheduler 212. The notification of CoMP transmission execution is transmitted to the user terminal 100 via the encoding unit 230, the modulation unit 232, and the radio signal transmission unit 236. Moreover, the notification of CoMP transmission execution may include information about the CP length for CoMP transmission. Also, the information about the CP length for CoMP transmission may be transmitted at timing different from the timing of the notification of CoMP transmission execution.

CoMP transmission is now executed among the user terminal 100, the serving base station $200_1$, and the non-serving base station $200_2$ (Step S2520).

<Case where Uplink CoMP Transmission is Controlled>
<Base Station $200_n$>

The base station $200_n$ in the example is substantially the same as the one illustrated in FIG. 23.

The base station $200_1$ receives a CoMP transmission request signal from the user terminal 100.

The radio signal reception unit 202 applies frequency conversion to the CoMP transmission request signal to convert it to a baseband signal. The demodulation unit 206 demodulates the CoMP transmission request signal converted to the baseband signal. The decoding unit 208 decodes the demodulated CoMP transmission request signal.

The CoMP transmission request signal extraction unit 238 extracts the CoMP transmission request signal. The CoMP transmission request signal extraction unit 238 inputs the CoMP transmission request signal into the CoMP communication control unit 214.

Receiving the CoMP transmission request signal as input from the CoMP transmission request signal extraction unit 238, the CoMP communication control unit 214 instructs the measurement request generation unit for wireless channel quality 226 to generate a request signal for measuring wireless channel quality.

The measurement request generation unit for wireless channel quality 226 generates the request signal for measuring wireless channel quality as a control signal following the instruction by the CoMP communication control unit 214. The request signal for measuring wireless channel quality is encoded by the encoding unit 230, modulated by the modulation unit 232, converted to a wireless frequency by the radio signal transmission unit 236, then transmitted to the user terminal 100 via the antenna.

The rest of the operation is substantially the same as the case where the base station determines whether CoMP transmission is feasible.

<User Terminal 100>

The user terminal 100 in this case is substantially the same as the one illustrated in FIG. 24.

The user terminal 100 communicating with the base station $200_1$ receives ACK or NACK from the base station $200_1$.

The transmission speed calculation unit 138 calculates uplink transmission speed based on ACK or NACK from the base station $200_1$. The transmission speed calculation unit 138 inputs the uplink transmission speed into the CoMP communication control unit 122.

The CoMP communication control unit 122 determines whether CoMP transmission is required based on the measurement result of the wireless channel quality input from the measurement and calculation unit for wireless channel quality 112 and the uplink transmission speed input from the transmission speed calculation unit 138. If determining that CoMP transmission is required, the CoMP communication control unit 122 requests to generate a CoMP transmission request signal to the request signal generation unit for CoMP transmission 140.

In response to the request for generating a CoMP transmission request signal by the CoMP communication control unit 122, the request signal generation unit for CoMP transmission 140 generates the CoMP transmission request signal. The CoMP transmission request signal is encoded by the encoding unit 130, modulated by the modulation unit 132, converted to a wireless frequency by the radio signal transmission unit 136, then transmitted to the base station $200_1$ via the antenna.

<Operation of Wireless Communication System>

Operation of the wireless communication system is substantially the same as the one illustrated in FIG. 25.

First Modified Example

In the wireless communication system described above, whether CoMP transmission is feasible may be determined based on a reception time difference $T_{diff}$.

If determining whether CoMP transmission is feasible based on a reception time difference $T_{diff}$, it may be determined with taking wireless channel quality into account.

<Base Station $200_n$>

Figure 26:
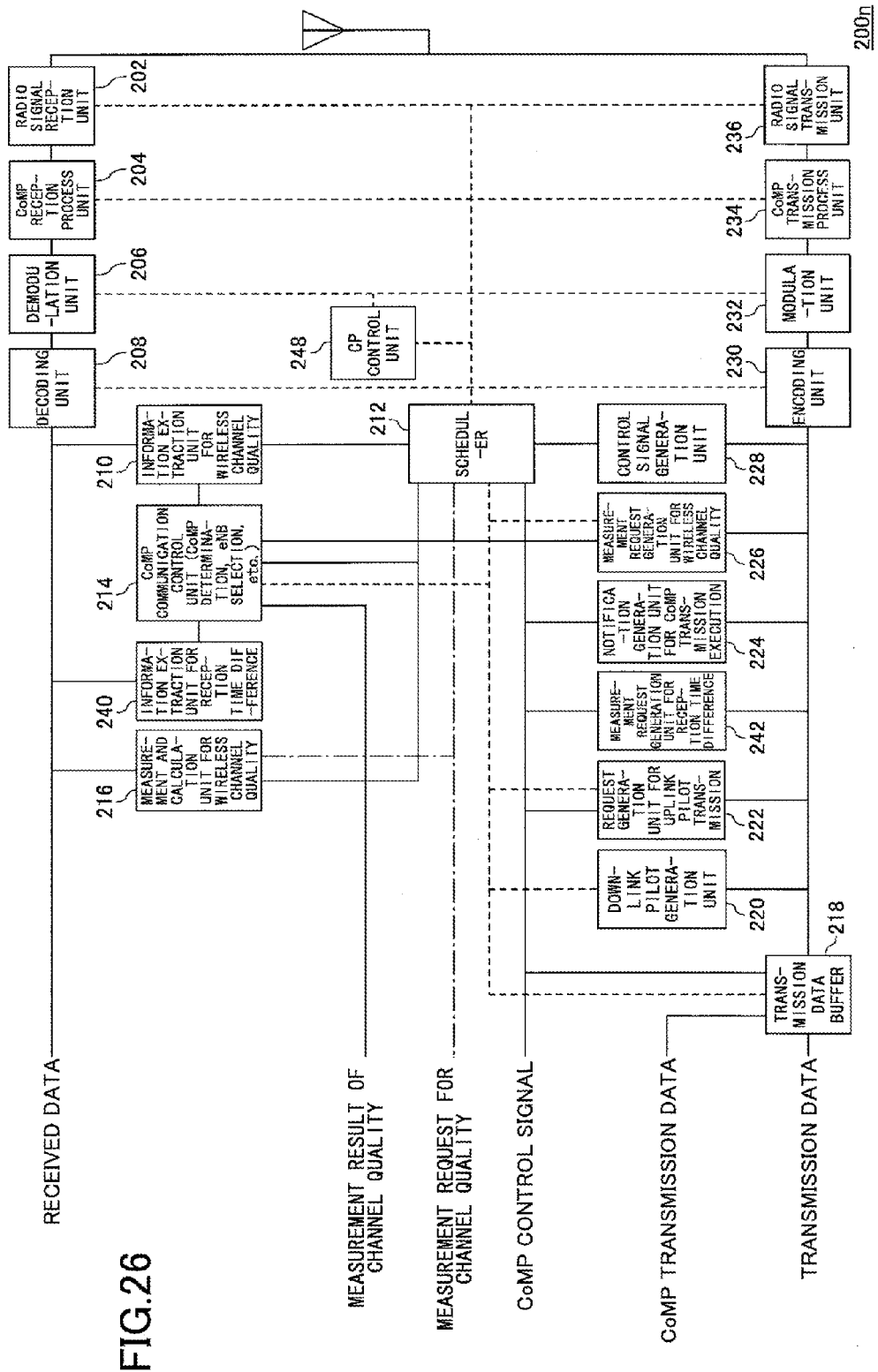
FIG. 26 illustrates an example of a base station according to an embodiment.

FIG. 26 illustrates a base station $200_n$ according to the first modified example.

The base station $200_n$ differs from the one described with reference to FIG. 10 in that an information extraction unit for reception time difference 240 and a measurement request generation unit for reception time difference 242 are added. The information extraction unit for reception time difference 240 is connected with the decoding unit 208 and the CoMP communication control unit 214. The measurement request generation unit for reception time difference 242 is connected with the scheduler 212 and the encoding unit 230.

A case will be described where a base station $200_1$ is communicating with the connected user terminal 100.

If the scheduler 212 determines that downlink transmission quality or downlink transmission speed is reduced, the scheduler 212 notifies that the downlink transmission quality or the downlink transmission speed is reduced to the CoMP communication control unit 214.

If the scheduler 212 notifies that the downlink transmission quality or speed is reduced, the CoMP communication control unit 214 determines whether to execute CoMP transmission. If determining to execute CoMP transmission, the CoMP communication control unit 214 requests to generate a request signal for measuring wireless channel quality with the user terminal 100 to the measurement request generation unit for wireless channel quality 226.

In response to the request from the CoMP communication control unit 214, the measurement request generation unit for wireless channel quality 226 generates the request signal for measuring wireless channel quality as a control signal. The request signal for measuring wireless channel quality is encoded by the encoding unit 230, modulated by the modulation unit 232, converted to a wireless frequency by the radio signal transmission unit 236, then transmitted to the user terminal 100 via the antenna. Here, the wireless channel quality includes wireless channel quality of signals between the base station $200_1$ and its neighboring base stations $200_2$-$200_m$ that are currently communicating with the base station $200_1$.

If determining that CoMP transmission is required, the CoMP communication control unit 214 requests to the user terminal 100 to measure and calculate a reception time difference $T_{diff}$ based on reception timing of a transmission wave from the base station $200_1$ and reception timings of transmission waves from the other base stations $200_2$-$200_m$. Specifically, the CoMP communication control unit 214 requests to the measurement request generation unit for reception time difference 242 to generate a request signal for measuring reception time difference. The measurement request generation unit for reception time difference 242 generates the request signal for measuring reception time difference. The request signal for measuring reception time difference generated by the measurement request generation unit for reception time difference 242 is encoded by the encoding unit 230, modulated by the modulation unit 232, converted to a wireless frequency by the radio signal transmission unit 236, then transmitted to the user terminal 100 via the antenna.

The base station $200_1$ receives the reception time difference information from the user terminal 100.

The information extraction unit for reception time difference 240 extracts the reception time difference information. The information extraction unit for reception time difference 240 inputs the reception time difference information into the CoMP communication control unit 214.

The CoMP communication control unit 214 determines whether CoMP transmission is feasible based on the wireless channel quality information and reception time difference information. If determining CoMP transmission is feasible, the CoMP communication control unit 214 selects a non-serving base station. Also, the CoMP communication control unit 214 may set a CP length based on the reception time difference information. Specifically, a CP length to be used is selected from predetermined CP lengths stored in advance. The predetermined CP lengths stored in advance may include the CP length of the normal CP and the CP length of the extended CP. Moreover, the predetermined CP lengths stored in advance may include CP lengths other than the CP length of the normal CP and the CP length of the extended CP.

The CoMP communication control unit 214 may set the CP length based on a threshold value for reception time difference $T_{th}$. It is preferable to set the threshold value for reception time difference $T_{th}$ less than the length of extended CP (16.67 μs). If the reception time difference is greater than the threshold value for reception time difference $T_{th}$, the CP length may be set to the CP length of the extended CP. The threshold value for reception time difference $T_{th}$ may be changed appropriately. Specifically, based on the CP length of the extended CP, the CP length may be set to half of the CP length of the extended CP, or 8.89 μs. The threshold value for reception time difference $T_{th}$ may be set based on the CP length of the normal CP.

<User Terminal 100>

Figure 27:
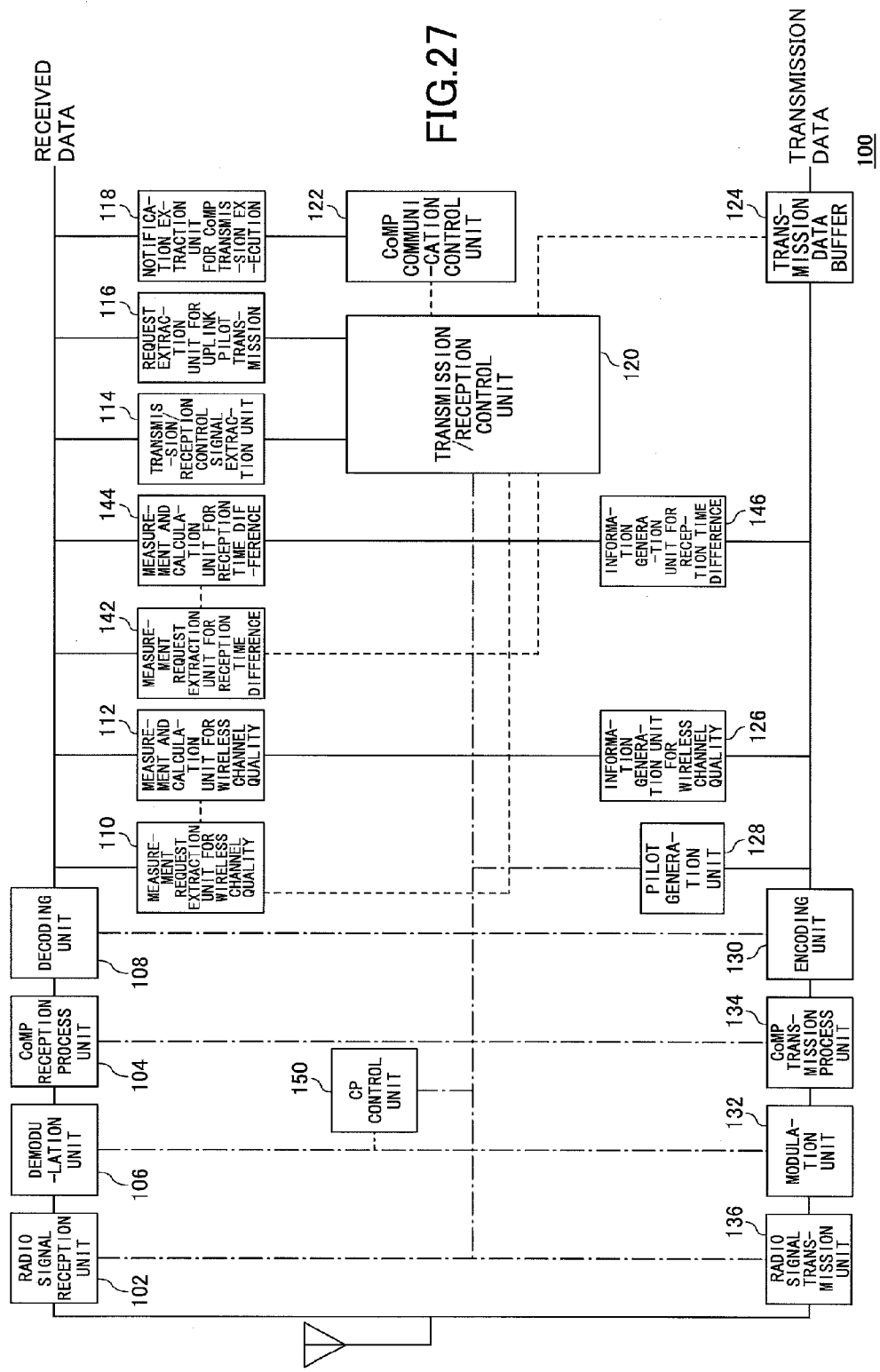
FIG. 27 illustrates an example of a user terminal according to an embodiment.

FIG. 27 illustrates a user terminal 100 according to the first modified example.

The user terminal 100 in this example differs from the one described with reference to FIG. 20 in that a measurement request extraction unit for reception time difference 142, a measurement and calculation unit for reception time difference 144, and an information generation unit for reception time difference 146 are added.

The measurement request extraction unit for reception time difference 142 is connected with the decoding unit 108 and the transmission/reception control unit 120. The measurement and calculation unit for reception time difference 144 is connected with the decoding unit 108 and the measurement request extraction unit for reception time difference 142. The information generation unit for reception time difference 146 is connected with the measurement and calculation unit for reception time difference 144 and the encoding unit 130.

The user terminal 100 receives a request signal for measuring wireless channel quality.

The measurement and calculation unit for wireless channel quality 112 measures wireless channel quality.

The user terminal 100 receives a request signal for measuring reception time difference.

The measurement request extraction unit for reception time difference 142 extracts the request signal for measuring reception time difference. The measurement request extraction unit for reception time difference 142 requests to measure and calculate a reception time difference $T_{diff}$ to the measurement and calculation unit for reception time difference 144.

Following the request signal for measuring reception time difference from the measurement request extraction unit for reception time difference 142, the measurement and calculation unit for reception time difference 144 measures and calculates the reception time difference $T_{diff}$. For example, the measurement and calculation unit for reception time difference 144 measures a reception timing $T_{enb1}$ of a signal used for measuring wireless channel quality from the base station $200_1$. Also, the measurement and calculation unit for reception time difference 144 measures a reception timing $T_{enb2}$ of a signal used for measuring wireless channel quality from the base station $200_2$. The measurement and calculation unit for reception time difference 144 calculates a reception time difference $T_{diff\_enb1-enb2}$ that corresponds to a residual obtained with dividing a difference between the reception timing $T_{enb1}$ and the reception timing $T_{enb2}$ by a time for one slot.

Reception quality is measured, for example, by units of slots for each base station. Therefore, a real time difference includes a measured timing difference. Therefore, it is divided by the time for one slot. With CoMP transmission using JT, transmission waves from a plurality of base stations are received at the same time. Namely, reception timings do not vary as in the case where measurement of reception quality is required. For example, if the reception time difference $T_{diff}$ is (one slot+α), α is the reception time difference $T_{diff}$.

The measurement and calculation unit for reception time difference 144 measures and calculates reception time differences $T_{diff\_enb1-enb3}$ to $T_{diff\_enb1-enbm}$ between the base station $200_1$ and the base stations $200_3$-$200_m$. The measurement and calculation unit for reception time difference 144 inputs the calculation result of the reception time differences into the information generation unit for reception time difference 146.

The information generation unit for reception time difference 146 generates reception time difference information based on the reception time difference input by the measurement and calculation unit for reception time difference 144. The reception time difference information is modulated by the modulation unit 132, converted to a wireless frequency by the radio signal transmission unit 136, and transmitted to the base station $200_1$. The time difference information may transmit the wireless channel quality information to the base station $200_1$ as a whole, or individually and sequentially.

Also, similarly to the reporting of wireless channel quality described in the first embodiment, all of the reception times may be reported (transmitted) to the base station $200_1$, or, for example, the least three reception time differences $T_{diff}$ may be reported (transmitted) to the base station $200_1$. Here, the number three is taken as an example, which may be two or more than three.

According the present modified example, quality degradation of CoMP transmission can be avoided that may occur when determining whether CoMP transmission is feasible based on wireless channel quality. The quality degradation includes degradation that occurs without using the reception time difference $T_{diff}$. Especially, it is useful when determining whether CoMP transmission is feasible with JT, which is sensitive to the reception time difference $T_{diff}$. In addition, transmission quality and transmission speed can be improved.

<Operation of Wireless Communication System>

Figure 28:
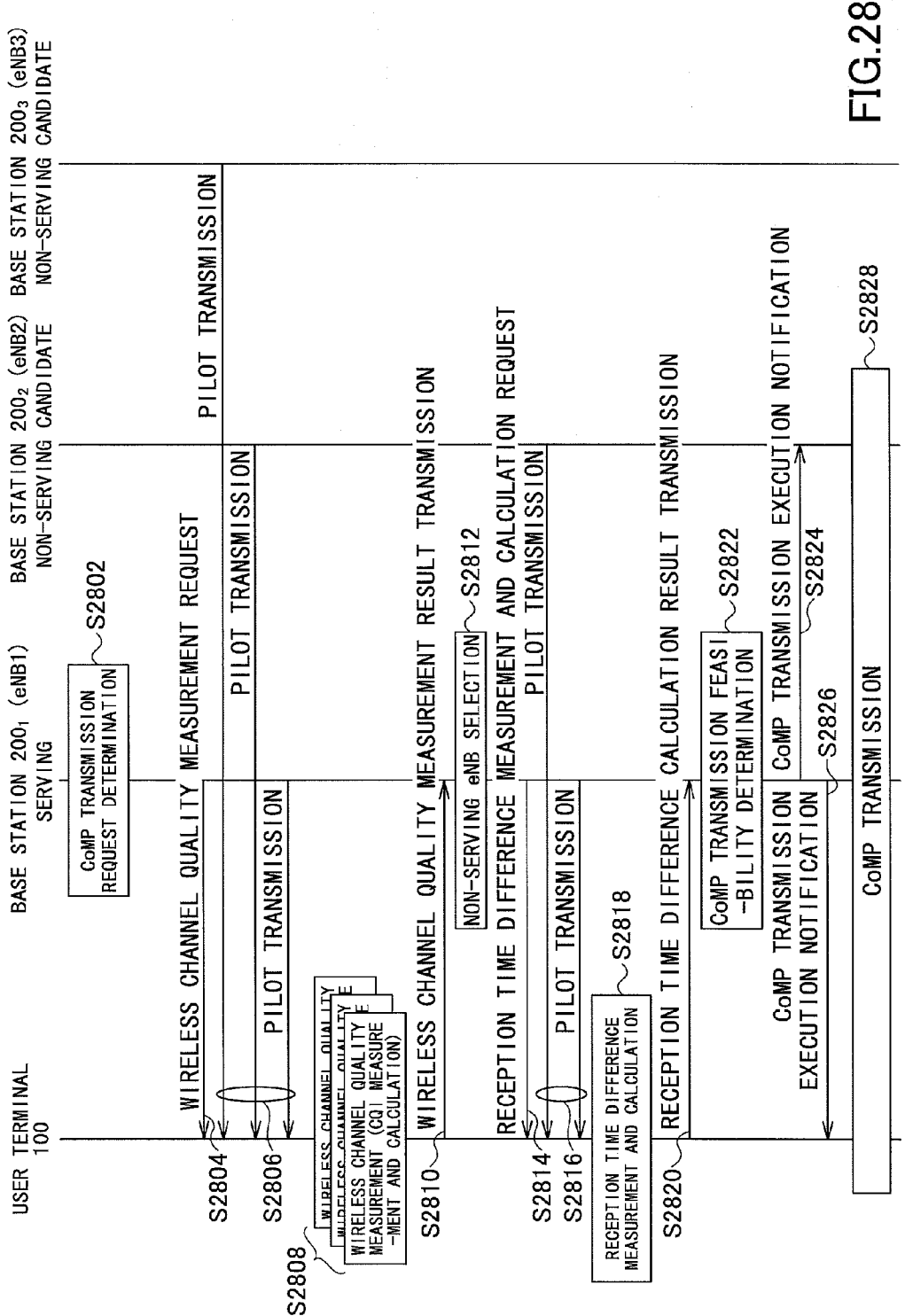
FIG. 28 illustrates an example of operation of a wireless communication system according to an embodiment.

FIG. 28 is a first sequence chart illustrating operation of the wireless communication system according to the first modified example. FIG. 28 illustrates an example where two base stations are candidates of the non-serving base station. There may be only one candidate non-serving base station or more than two candidates.

The serving base station $200_1$ determines whether to make a request for CoMP transmission (Step S2802). Namely, the CoMP transmission control unit 214 determines whether to execute CoMP transmission. Assume here that it is determined that CoMP transmission is to be requested.

The serving base station $200_1$ transmits requests to the user terminal 100 to measure wireless channel quality (Step S2804). Namely, the measurement request generation unit for wireless channel quality 226 generates a measurement request for measuring wireless channel quality that is to be transmitted to the user terminal 100. The measurement request for measuring wireless channel quality is transmitted to the user terminal 100.

Pilots are transmitted from the serving base station $200_1$ and the base stations $200_2$-$200_3$ (Step S2806). Namely, the downlink pilot generation unit 220 generates a pilot following control of the scheduler 212. The pilot is transmitted to the user terminal 100 via the encoding unit 230, the modulation unit 232, and the radio signal transmission unit 236.

The user terminal 100 measures wireless channel quality of the pilots from the serving base station $200_1$ and the base stations $200_2$-$200_3$ (Step S2808). Namely, the measurement and calculation unit for wireless channel quality 112 measures the wireless channel quality of the pilots from the serving base station $200_1$ and the base stations $200_2$-$200_3$. For example, CQI, RSRP, RSRQ and the like are obtained.

The user terminal 100 transmits the measurement results of the wireless channel quality to the serving base station $200_1$ (Step S2810). Namely, the information generation unit for wireless channel quality 126 generates a result notification of wireless channel quality.

The serving base station $200_1$ temporarily selects a non-serving base station (Step S2812). Namely, the CoMP communication control unit 214 selects a non-serving base station based on the measurement result of wireless channel quality. Assume here that the base station $200_2$ is temporarily selected as a non-serving base station.

The serving base station $200_1$ transmits a request for measuring and calculating reception time difference to the user terminal 100 (Step S2814). Namely, the measurement request generation unit for reception time difference 242 generates the request for measuring and calculating reception time difference that is to be transmitted to the user terminal 100.

Pilots are transmitted from the serving base station $200_1$ and the base stations $200_2$ (Step S2816). Namely, the downlink pilot generation unit 220 generates a pilot following control of the scheduler 212. The pilot is transmitted to the user terminal 100 via the encoding unit 230, the modulation unit 232, and the radio signal transmission unit 236.

The user terminal 100 measures and calculates reception time differences (Step S2818). Namely, the measurement and calculation unit for reception time difference 144 measures and calculates the reception time differences.

The user terminal 100 transmits a result notification of reception time difference calculation to the serving base station $200_1$ (Step S2820). Namely, the information generation unit for reception time difference 146 generates the result notification of reception time difference calculation to be transmitted to the serving base station $200_1$.

The serving base station $200_1$ determines whether CoMP transmission is feasible (Step S2822). Namely, the CoMP communication control unit 214 determines whether CoMP transmission is feasible based on the result notification of reception time difference calculation from the user terminal 100. If determining CoMP transmission is feasible, the CoMP communication control unit 214 finally selects a non-serving base station and sets the CP length based on the result notification of reception time difference calculation. Assume here that the base station $200_2$ is finally selected as a non-serving base station.

The serving base station $200_1$ transmits a notification of CoMP transmission execution to the base station $200_2$ that is selected as a non-serving base station (Step S2824). Namely, the scheduler 212 requests to transmit a notification signal of CoMP transmission execution to the non-serving base station $200_2$ to the notification generation unit for CoMP transmission execution 224. The notification generation unit for CoMP transmission execution 224 generates the notification of CoMP transmission execution following the request from the scheduler 212. The notification of CoMP transmission execution is transmitted to the non-serving base station $200_2$. It may be transmitted to the non-serving base station $200_2$ via the encoding unit 230, the modulation unit 232, and the radio signal transmission unit 236. Moreover, the notification of CoMP transmission execution may include information about the CP length for CoMP transmission. Also, the information about the CP length for CoMP transmission may be transmitted at timing different from the timing of the notification of CoMP transmission execution.

The serving base station $200_1$ transmits the notification of CoMP transmission execution to the user terminal 100 (Step S2826). Namely, the scheduler 212 requests to transmit a notification of CoMP transmission execution for the user terminal 100 to the notification generation unit for CoMP transmission execution 224. The notification generation unit for CoMP transmission execution 224 generates the notification of CoMP transmission execution following the request from the scheduler 212. The notification of CoMP transmission execution is transmitted to the user terminal 100 via the encoding unit 230, the modulation unit 232, and the radio signal transmission unit 236. Moreover, a notification of CoMP transmission execution may include information about the CP length for CoMP transmission. Also, the information about the CP length for CoMP transmission may be transmitted at timing different from the timing of the notification of CoMP transmission execution.

CoMP transmission is now executed among the user terminal 100, the serving base station 200₁, and the non-serving base station 200₂ (Step S2828).

Figure 29:
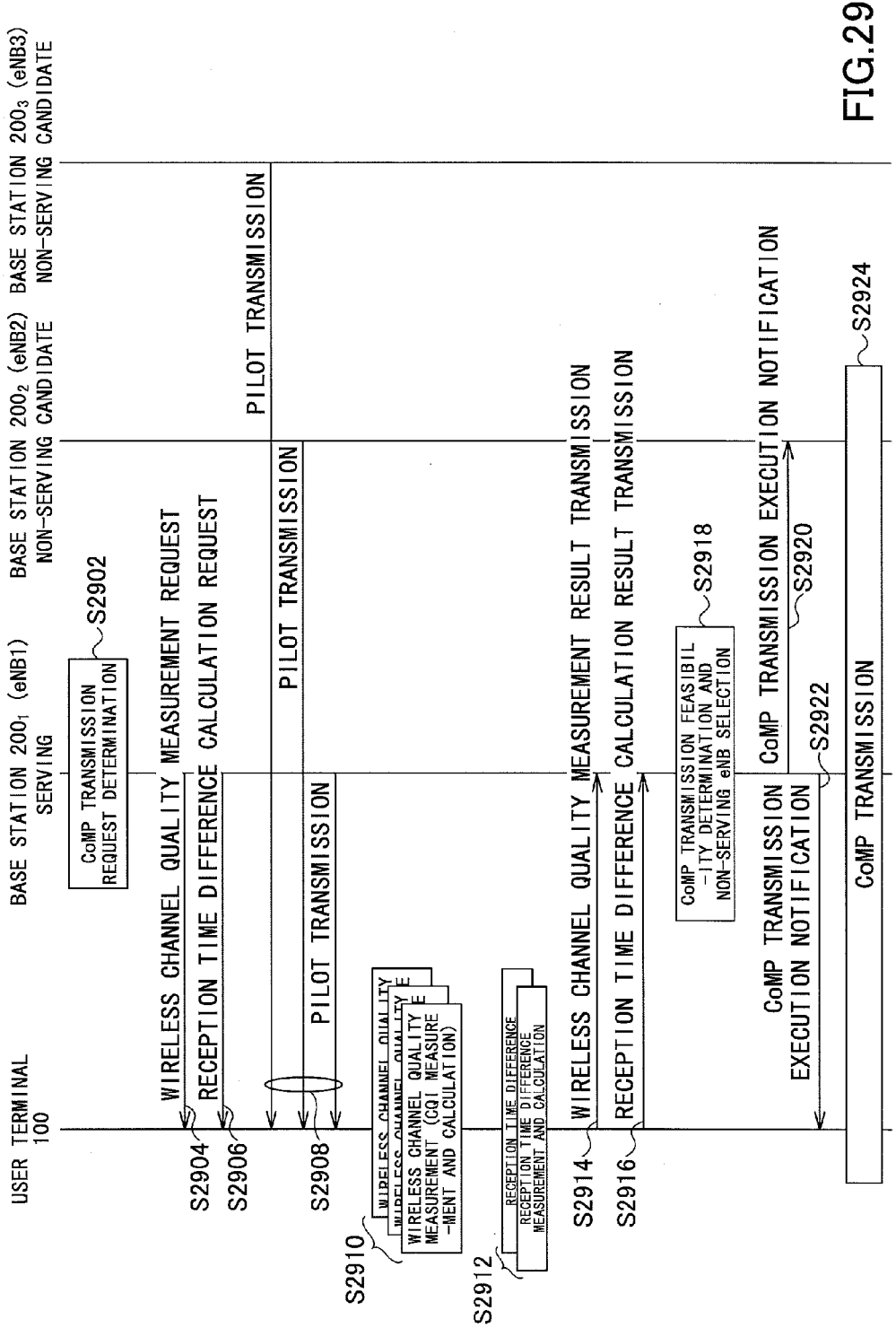
FIG. 29 illustrates an example of operation of a wireless communication system according to an embodiment.

FIG. 29 is a second sequence chart illustrating operation of a wireless communication system according to the first modified example. FIG. 29 illustrates an example where two base stations are candidates of the non-serving base station. There may be only one candidate non-serving base station or more than two candidates.

A serving base station 200₁ determines whether to make a request for CoMP transmission (Step S2902). Namely, the CoMP transmission control unit 214 determines whether to execute CoMP transmission. Assume here that it is determined that CoMP transmission is to be requested.

The serving base station 200₁ transmits requests to the user terminal 100 to measure wireless channel quality (Step S2904). Namely, the measurement request generation unit for wireless channel quality 226 generates a measurement request for measuring wireless channel quality that is to be transmitted to the user terminal 100. The measurement request for measuring wireless channel quality is transmitted to the user terminal 100.

The serving base station 200₁ transmits a request for measuring and calculating reception time difference to the user terminal 100 (Step S2906). Namely, the measurement request generation unit for reception time difference 242 generates a request for measuring and calculating reception time difference that is to be transmitted to the user terminal 100.

Pilots are transmitted from the serving base station 200₁ and the base stations 200₂-200₃ (Step S2908). Namely, the downlink pilot generation unit 220 generates a pilot following control of the scheduler 212. The pilot is transmitted to the user terminal 100 via the encoding unit 230, the modulation unit 232, and the radio signal transmission unit 236.

The user terminal 100 measures wireless channel quality of the pilots from the serving base station 200₁ and the base stations 200₂-200₃ (Step S2910). Namely, the measurement and calculation unit for wireless channel quality 112 measures the wireless channel quality of the pilots from the serving base station 200₁ and the base stations 200₂-200₃. For example, CQI, RSRP, RSRQ and the like are obtained.

The user terminal 100 measures and calculates reception time differences (Step S2912). Namely, the measurement and calculation unit for reception time difference 144 measures and calculates the reception time differences.

The user terminal 100 transmits the measurement results of the wireless channel quality to the serving base station 200₁ (Step S2914). Namely, the information generation unit for wireless channel quality 126 generates a result notification of wireless channel quality.

The user terminal 100 transmits a result notification of reception time difference calculation to the serving base station 200₁ (Step S2916). Namely, the information generation unit for reception time difference 146 generates a result notification of reception time difference calculation to be transmitted to the serving base station 200₁.

The serving base station 200₁ determines whether CoMP transmission is feasible. Moreover, if determining CoMP transmission is feasible, the CoMP communication control unit 214 selects a non-serving base station (Step S2918). Namely, the CoMP communication control unit 214 determines whether CoMP transmission is feasible based on the result notification of reception time difference calculation from the user terminal 100. If determining CoMP transmission is feasible, the CoMP communication control unit 214 selects a non-serving base station based on the measurement result of wireless channel quality. Assume here that the base station 200₂ is selected as a non-serving base station. Moreover, the CoMP communication control unit 214 sets the CP length based on the result notification of reception time difference calculation.

The serving base station 200₁ transmits a notification of CoMP transmission execution to the base station 200₂ that is selected as a non-serving base station (Step S2920). Namely, the scheduler 212 requests to transmit a notification signal of CoMP transmission execution for the non-serving base station 200₂ to the notification generation unit for CoMP transmission execution 224. The notification generation unit for CoMP transmission execution 224 generates the notification of CoMP transmission execution following the request from the scheduler 212. The notification of CoMP transmission execution is transmitted to the non-serving base station 200₂. It may be transmitted to the non-serving base station 200₂ via the encoding unit 230, the modulation unit 232, and the radio signal transmission unit 236. Moreover, the notification of CoMP transmission execution may include information about the CP length for CoMP transmission. Also, the information about the CP length for CoMP transmission may be transmitted at timing different from the timing of the notification of CoMP transmission execution.

The serving base station 200₁ transmits the notification of CoMP transmission execution to the user terminal 100 (Step S2922). Namely, the scheduler 212 requests to transmit a notification of CoMP transmission execution for the user terminal 100 to the notification generation unit for CoMP transmission execution 224. The notification generation unit for CoMP transmission execution 224 generates the notification of CoMP transmission execution following the request from the scheduler 212. The notification of CoMP transmission execution is transmitted to the user terminal 100 via the encoding unit 230, the modulation unit 232, and the radio signal transmission unit 236. Moreover, a notification of CoMP transmission execution may include information about the CP length for CoMP transmission. Also, the information about the CP length for CoMP transmission may be transmitted at timing different from the timing of the notification of CoMP transmission execution.

CoMP transmission is now executed among the user terminal 100, the serving base station 200₁, and the non-serving base station 200₂ (Step S2924).

<Case where an Uplink Reception Time Difference $T_{diff}$ is Used for Determining Whether CoMP Transmission is Feasible>

Figure 30:
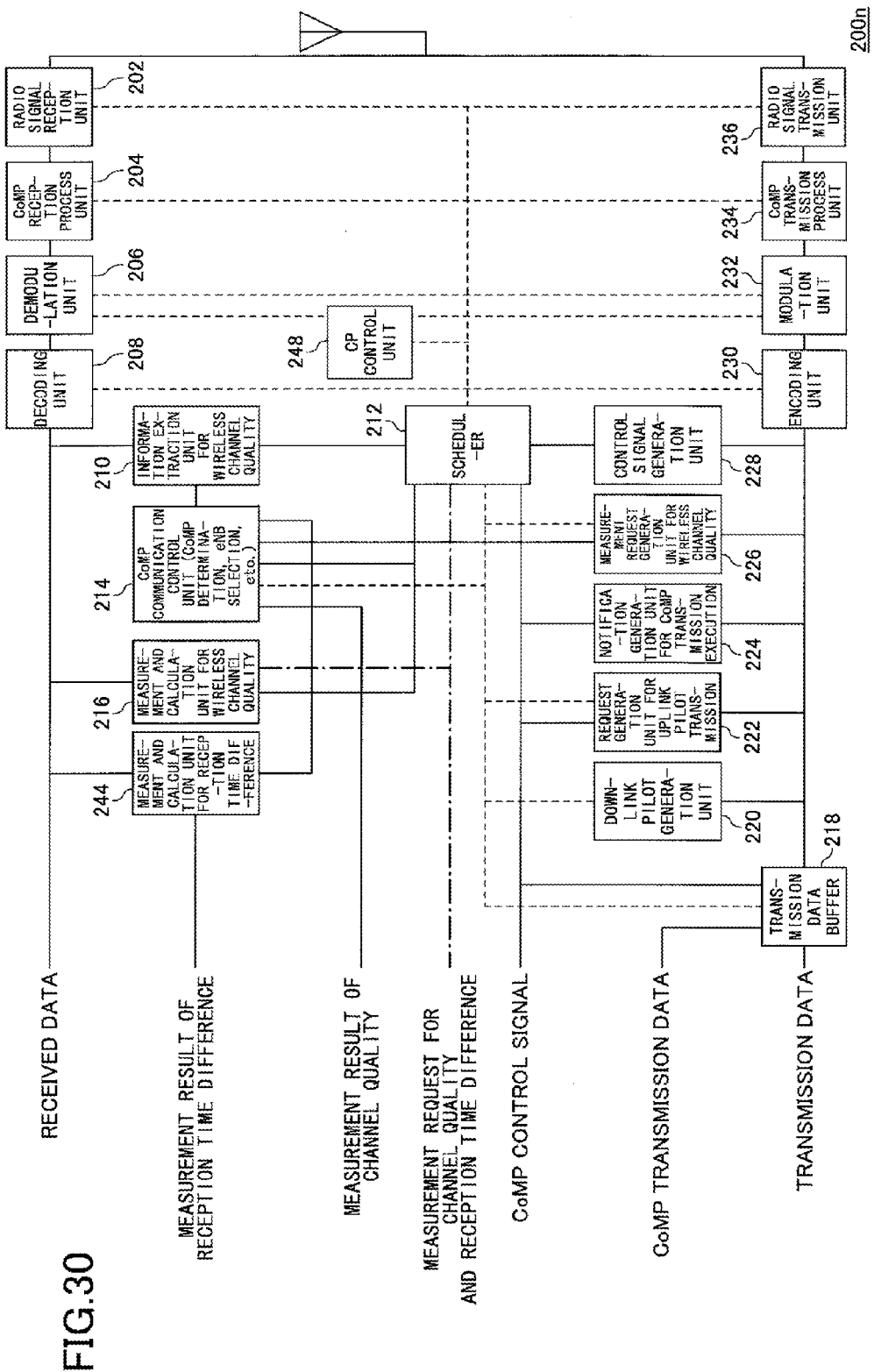
FIG. 30 illustrates a base station according to an embodiment.

FIG. 30 illustrates a base station according to an embodiment.

The base station 200ₙ in the example differs from the one described with reference to FIG. 10 in that a measurement and calculation unit for reception time difference 244 is added. The measurement and calculation unit for reception time difference 244 is connected with the decoding unit 208 and the CoMP communication control unit 214.

The measurement and calculation unit for reception time difference 244 of the serving base station 200₁ measures and calculates reception timing with respect to uplink transmission timing from the user terminal 100. Moreover, reception timings with respect to uplink transmission timing from the user terminal 100 that are measured and calculated by the base stations 200₂-200ₘ are transferred to the measurement and calculation unit for reception time difference 244 via a base station interface, or the like.

The measurement and calculation unit for reception time difference 244 of the base station $200_1$ calculates a reception time difference $T_{diff}$ based on the input information. The measurement and calculation unit for reception time difference 244 notifies the calculation result of the reception time difference $T_{diff}$ to the CoMP communication control unit 214.

The CoMP communication control unit 214 determines whether CoMP transmission is feasible based on the reception time difference $T_{diff}$. If determining CoMP transmission is feasible, the CoMP communication control unit 214 selects a non-serving base station. Moreover, the CoMP communication control unit 214 sets a CP length based on the reception time difference $T_{diff}$.

The user terminal 100 may determine whether downlink CoMP transmission is required.

Figure 31:
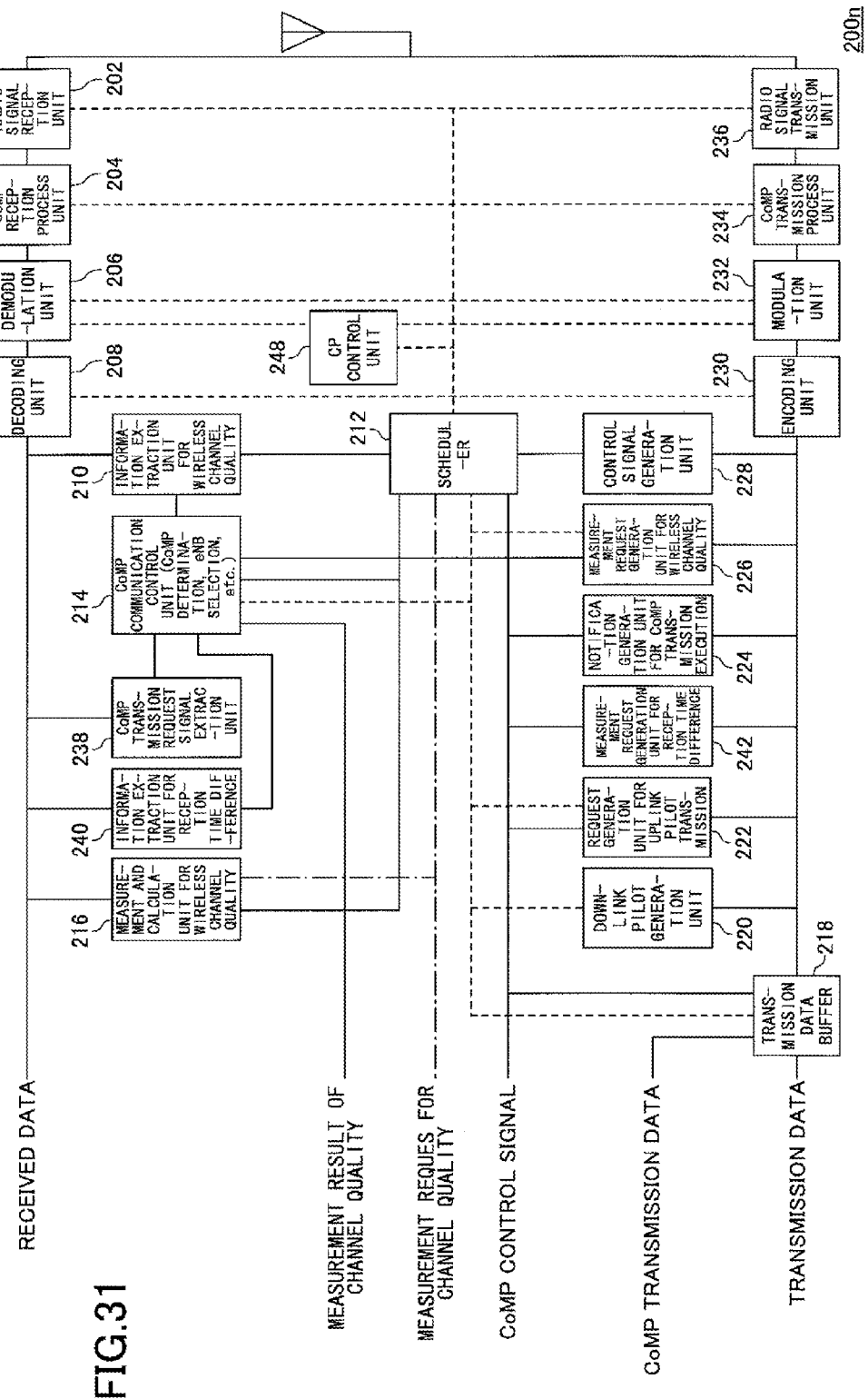
FIG. 31 illustrates an example of a base station according to an embodiment.

FIG. 31 illustrates a base station $200_n$ according to an embodiment.

The base station $200_n$ in the example differs from the one described with reference to FIG. 26 in that a CoMP transmission request signal extraction unit 238 is added. The CoMP transmission request signal extraction unit 238 is connected with the decoding unit 208 and the CoMP communication control unit 214.

The CoMP transmission request signal extraction unit 238 extracts the CoMP transmission request signal from the uplink signal transmitted by the user terminal 100. The CoMP transmission request signal extraction unit 238 inputs the CoMP transmission request signal into the CoMP communication control unit 214.

Figure 32:
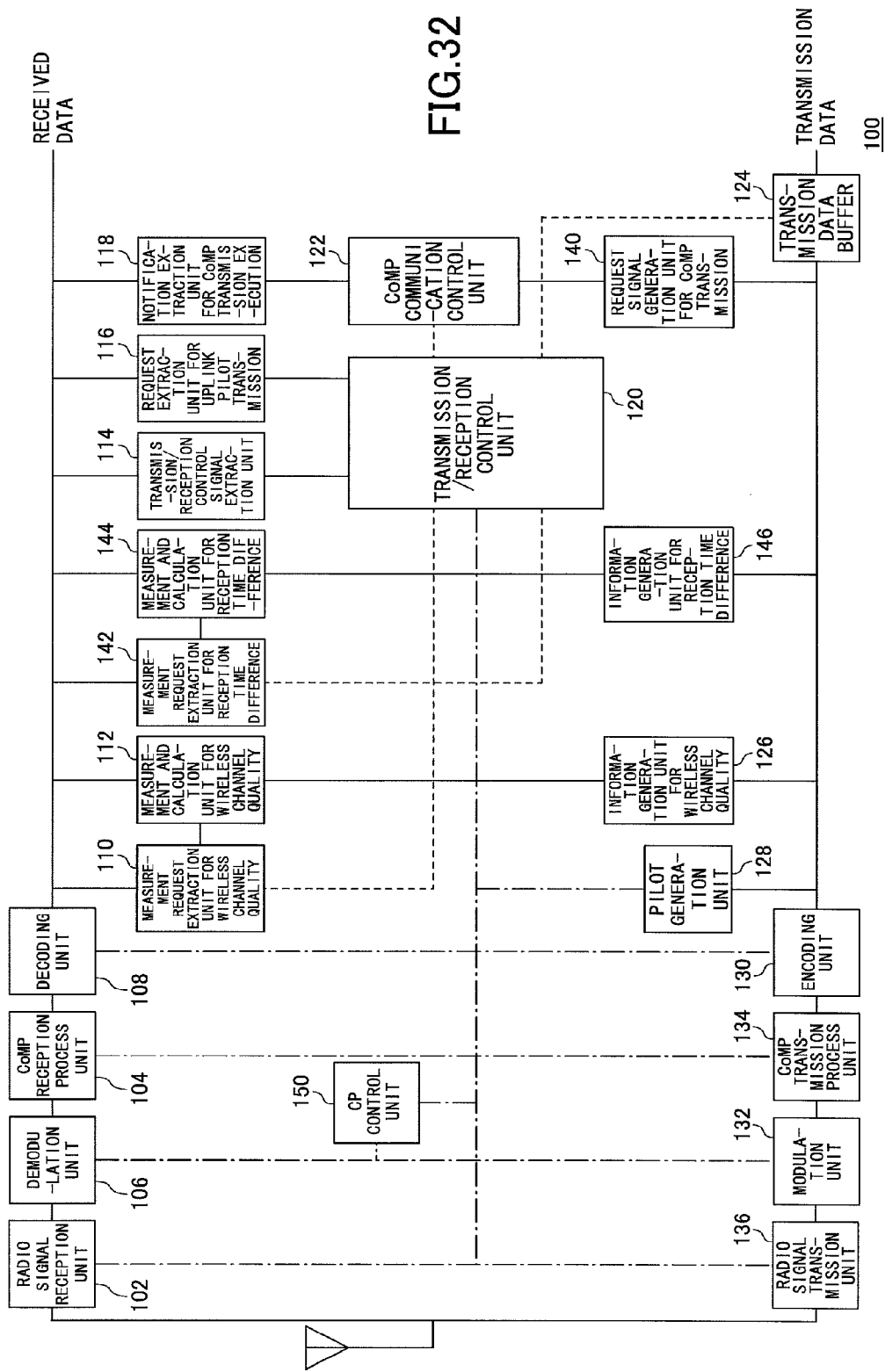
FIG. 32 illustrates a user terminal according to an embodiment.

FIG. 32 illustrates a user terminal 100 according to an embodiment.

The user terminal 100 differs from the one described with reference to FIG. 20 in that a request signal generation unit for CoMP transmission 140 is added. The request signal generation unit for CoMP transmission 140 is connected with the CoMP communication control unit 122 and the encoding unit 130.

If requested to generate a CoMP transmission request signal by the CoMP communication control unit 122, the request signal generation unit for CoMP transmission 140 generates the CoMP transmission request signal to input it into the encoding unit 130.

Also, the user terminal may determine whether uplink CoMP transmission is required.

Figure 33:
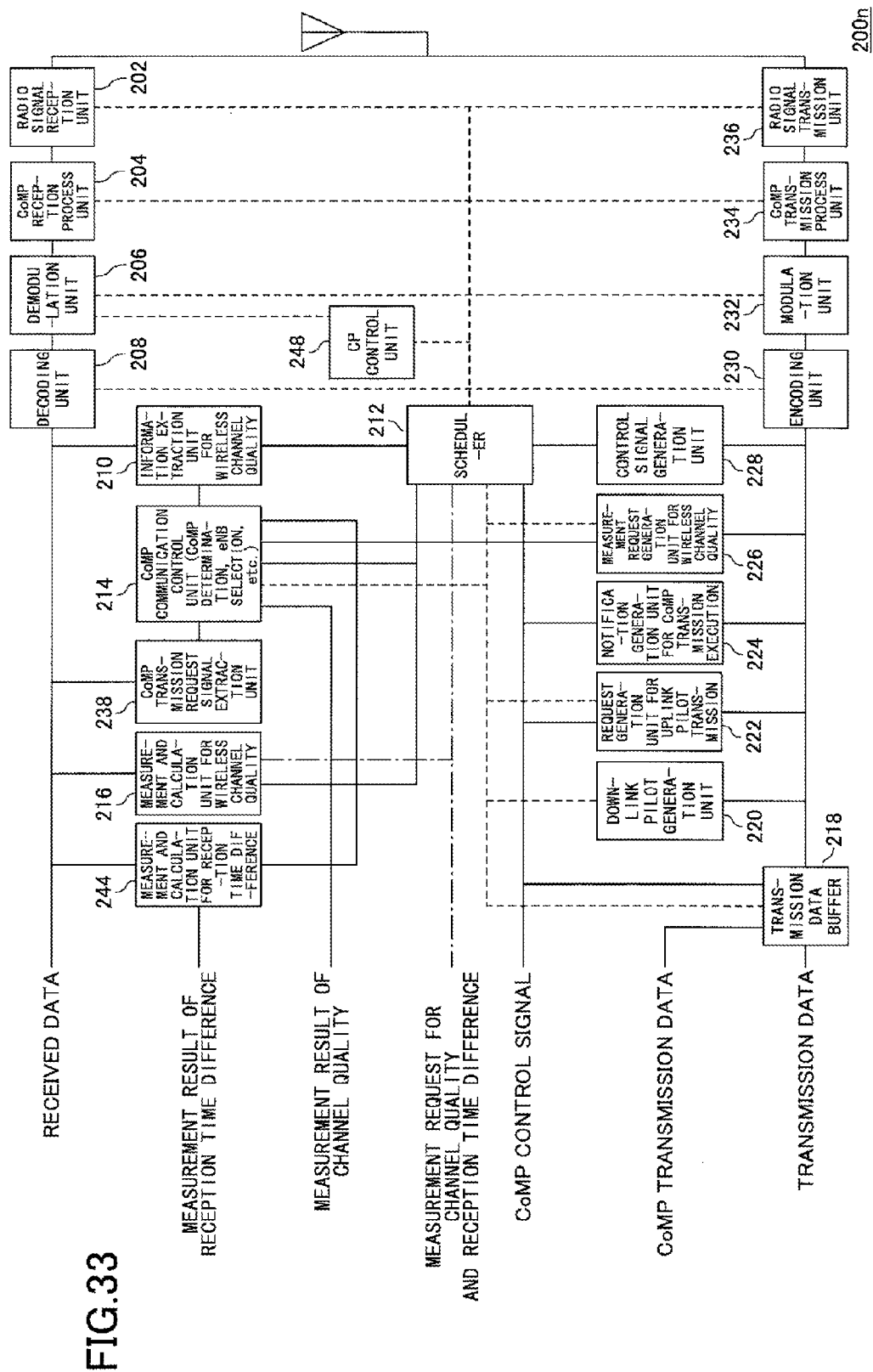
FIG. 33 illustrates a example of base station according to an embodiment.

FIG. 33 illustrates a base station $200_n$ according to an embodiment.

The base station $200_n$ differs from the one described with reference to FIG. 30 in that a CoMP transmission request signal extraction unit 238 is added. The CoMP transmission request signal extraction unit 238 is connected with the decoding unit 108 and the CoMP communication control unit 214.

The CoMP transmission request signal extraction unit 238 extracts the CoMP transmission request signal from the uplink signal transmitted by the user terminal 100. The CoMP transmission request signal extraction unit 238 inputs the CoMP transmission request signal into the CoMP communication control unit 214.

<Operation of Wireless Communication System>

Figure 34:
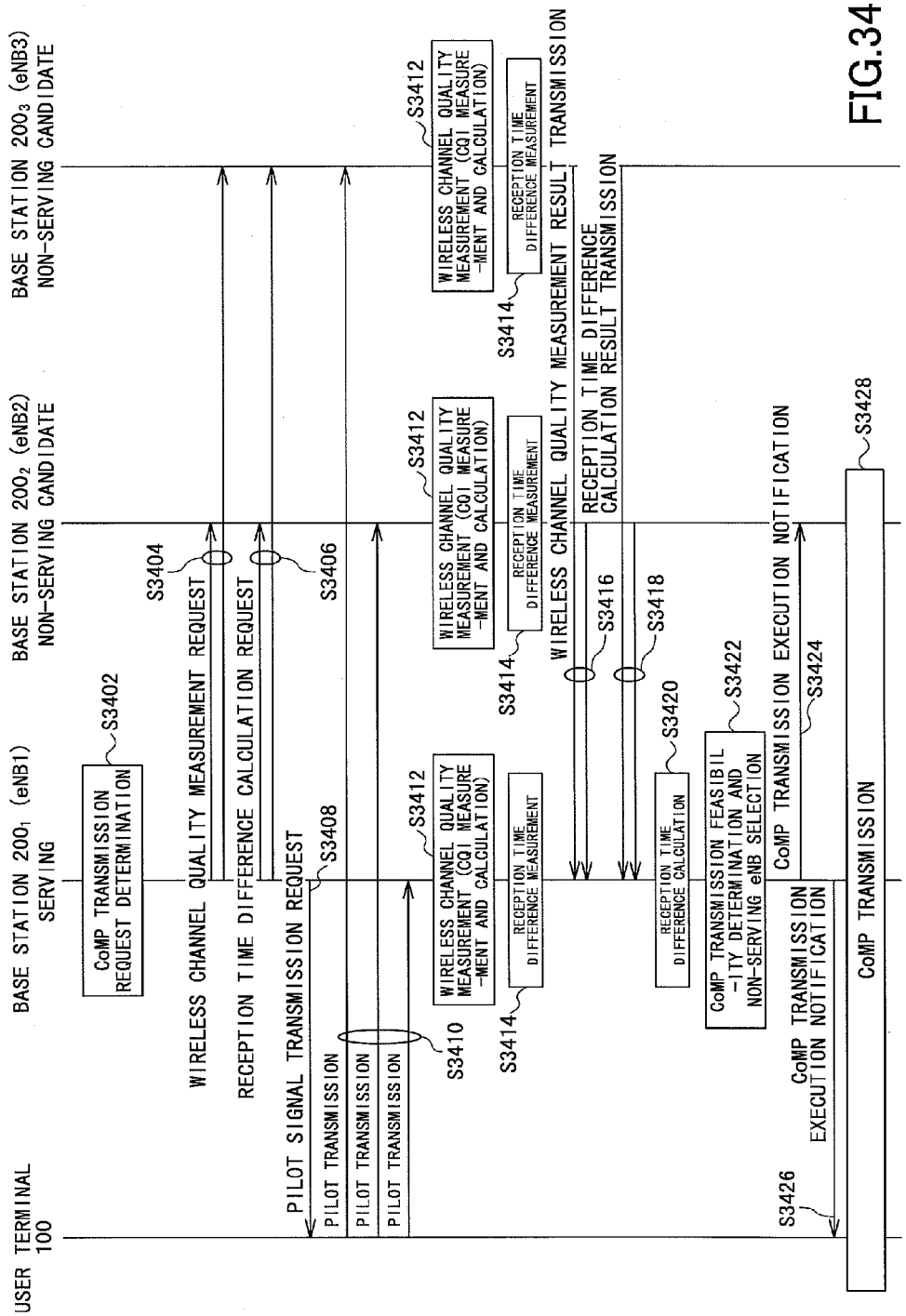
FIG. 34 illustrates an example of operation of a wireless communication system according to an embodiment.

FIG. 34 illustrates operation of a wireless communication system according to an embodiment.

FIG. 34 illustrates an example where two base stations are candidates of a non-serving base station. There may be only one candidate non-serving base station or more than two candidates.

The serving base station $200_1$ determines whether to make a request for CoMP transmission (Step S3402). Namely, the CoMP transmission control unit 214 determines whether to execute CoMP transmission. Assume here that it is determined that CoMP transmission is to be requested.

The serving base station $200_1$ transmits a request for measuring wireless channel quality to the base stations $200_2$-$200_3$ (Step S3404). Namely, a measurement request for wireless channel quality is transmitted from the scheduler 212 to the base stations $200_2$-$200_3$.

The serving base station $200_1$ transmits a request for measuring and calculating reception time difference to the base stations $200_2$-$200_3$ (Step S3406). Namely, the request for measuring and calculating reception time difference is transmitted from the scheduler 212 to the base stations $200_2$-$200_3$.

The serving base station $200_1$ transmits a request for transmitting pilot signals to the user terminal 100 (Step S3408). Namely, a transmission request for pilot signals generated by the request generation unit for uplink pilot transmission 222 is transmitted to the user terminal 100.

The user terminal 100 transmits the pilot to the base stations $200_1$-$200_3$ (Step S3410). Namely, the pilot generated by the pilot generation unit 128 is transmitted to the base stations $200_1$-$200_3$. Pilot signals including respective sequences of codes may be transmitted to the base stations $200_1$-$200_3$.

The serving base station $200_1$ and the base stations $200_2$-$200_3$ each measure wireless channel quality based on the pilot signals from the user terminal 100 (Step S3412). Namely, the measurement and calculation unit for wireless channel quality 216 measures the wireless channel quality based on the pilot signal from the user terminal 100.

The serving base station $200_1$ and the base stations $200_2$-$200_3$ measure reception time differences based on the pilot from the user terminal 100 (Step S3414). Namely, the measurement and calculation unit for reception time difference 244 measures the reception time based on the pilot signals from the user terminal 100.

The base stations $200_2$-$200_3$ transmit result notifications of wireless channel quality to the serving base station $200_1$. The measurement and calculation unit for wireless channel quality 216 of each of the base stations $200_2$-$200_3$ measures wireless channel quality based on the pilot from the user terminal 100. The measurement and calculation unit for wireless channel quality 216 transmits the result notification of wireless channel quality to the serving base station $200_1$.

The base stations $200_2$-$200_3$ transmit result notifications of reception time difference calculation to the serving base station $200_1$, respectively. The measurement and calculation unit for reception time difference 244 of the base stations $200_2$-$200_3$ each measures a reception time based on the pilot signal from the user terminal 100. The measurement and calculation unit for reception time difference 244 transmits the result notification of wireless channel quality to the serving base station $200_1$.

The serving base station $200_1$ calculates the reception time difference based on the reception time measured by the serving base station $200_1$ and the reception time from the base stations $200_2$-$200_3$ (Step S3420). Namely, the measurement and calculation unit for reception time difference 244 calculates the reception time differences between the serving base station $200_1$ and the base stations $200_2$-$200_3$ based on the reception time measured by the serving base station $200_1$ and the reception times from the base stations $200_2$-$200_3$.

The serving base station $200_1$ determines whether CoMP transmission is feasible. Moreover, if determining CoMP transmission is feasible, the serving base station $200_1$ selects a non-serving base station (Step S3422). Namely, the CoMP communication control unit 214 determines whether CoMP transmission is feasible based on the reception time difference from the measurement and calculation unit for reception time difference 244 and the wireless channel quality from the measurement and calculation unit for wireless channel quality 216. Assume here that it is determined that CoMP transmission is feasible. The CoMP communication control unit 214 selects the base station $200_2$ as a non-serving base station. Moreover, the CoMP communication control unit 214 sets a CP length for CoMP transmission based on the reception time difference.

The serving base station $200_1$ transmits the notification of CoMP transmission execution to the base station $200_2$ selected as a non-serving base station (Step S3424). Namely, the scheduler 212 transmits the notification of CoMP transmission execution to the non-serving base station $200_2$. Moreover, information about the CP length for CoMP transmission may be notified.

The serving base station $200_1$ transmits the notification of CoMP transmission execution to the user terminal 100 (Step S3426). Namely, the notification generation unit for CoMP transmission execution 224 generates the notification of CoMP transmission execution. The notification of CoMP transmission execution is transmitted to the user terminal 100. Moreover, the notification of CoMP transmission execution may include information about the CP length for CoMP transmission.

CoMP transmission is now executed among the user terminal 100, the serving base station $200_1$, and the non-serving base station $200_2$ (Step S3428).

Figure 35:
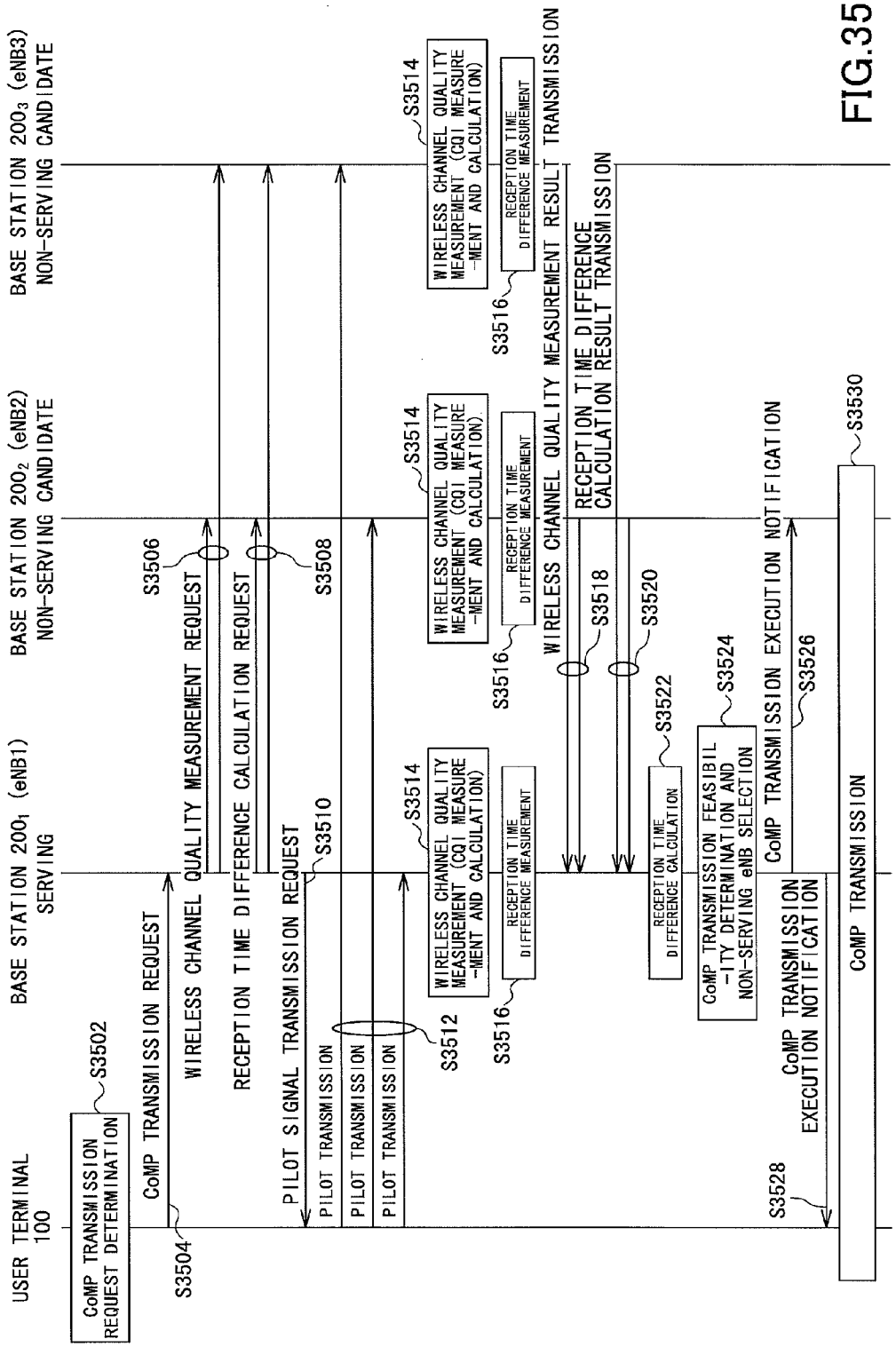
FIG. 35 illustrates an example of operation of a wireless communication system according to an embodiment.

FIG. 35 illustrates operation of a wireless communication system according to an embodiment.

The user terminal 100 determines whether to make a request for CoMP transmission (Step S3502). Namely, the CoMP transmission control unit 122 determines whether to execute CoMP transmission. Assume here that it is determined that CoMP transmission is to be requested.

The user terminal 100 transmits a CoMP transmission request to the serving base station $200_1$ (Step S3504). The CoMP transmission request generated by the request signal generation unit for CoMP transmission 140 is transmitted to serving base station $200_1$.

Steps S3506-S3530 are substantially the same as Steps S3404-S3428 in FIG. 34.

Also, the user terminal 100 may determine whether CoMP transmission is required, select a non-serving base station, then measure a reception time difference.

Figure 36:
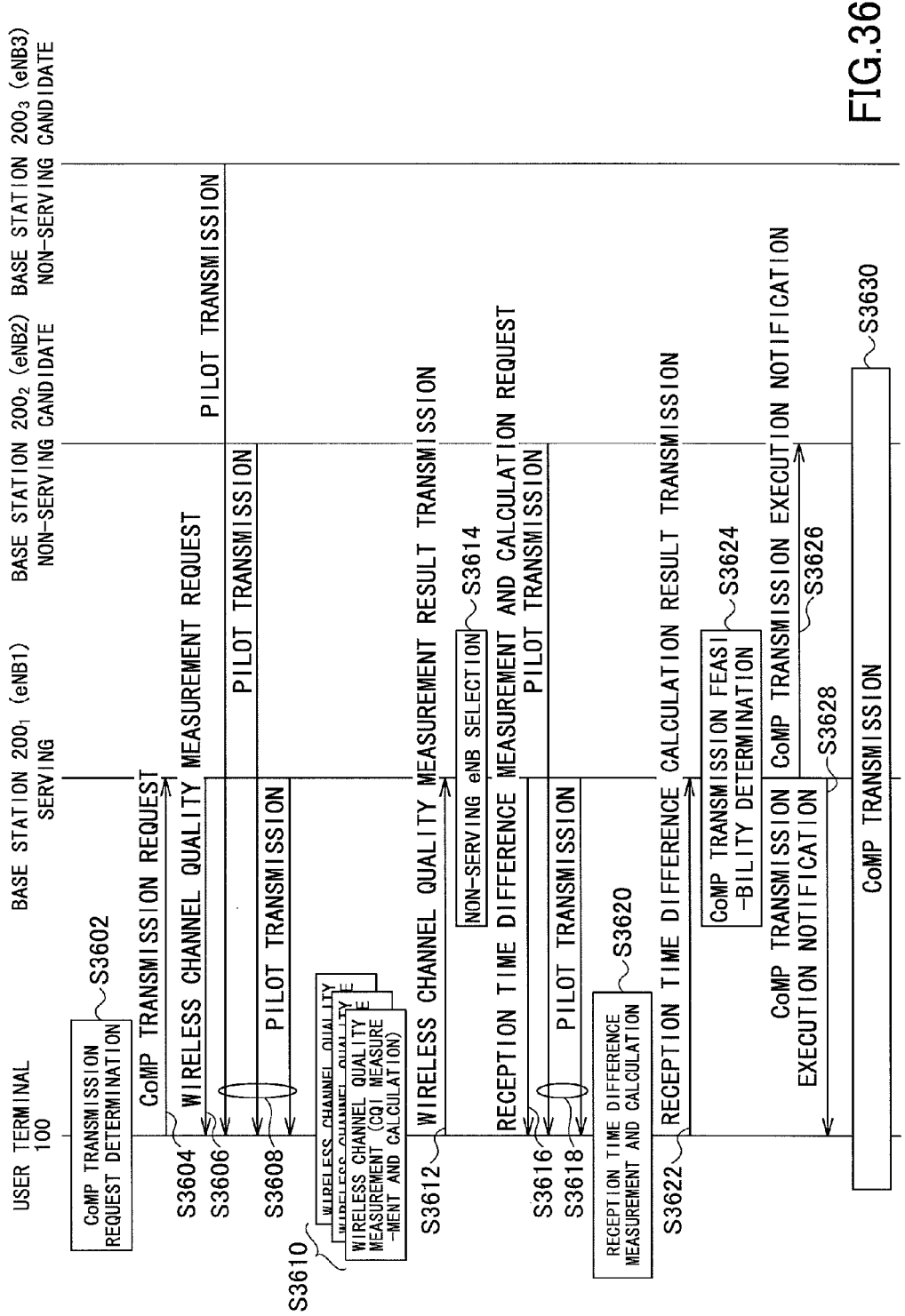
FIG. 36 illustrates an example of operation of a wireless communication system according to an embodiment.

FIG. 36 illustrates operation of a wireless communication system according to an embodiment.

The user terminal 100 determines whether to make a request for CoMP transmission (Step S3602). Assume here that it is determined that CoMP transmission is to be requested.

The user terminal 100 transmits a CoMP transmission request to the serving base station $200_1$ (Step S3604).

Steps S3606-S3630 are substantially the same as Steps S2804-S2828 in FIG. 28.

Also, the user terminal 100 may determine whether CoMP transmission is required, and determine whether CoMP transmission is feasible after measuring wireless channel quality and a reception time difference.

Figure 37:
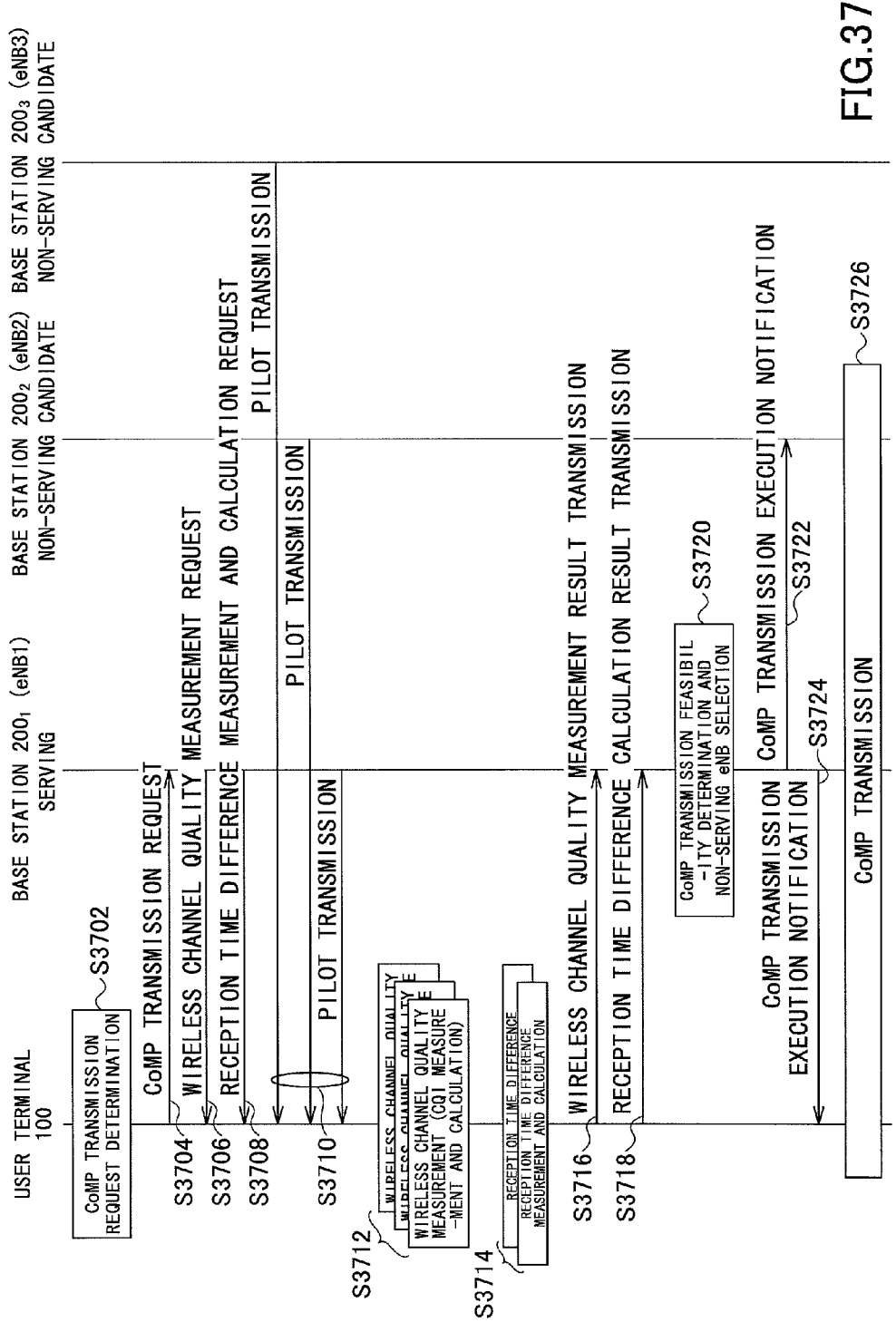
FIG. 37 illustrates an example of operation of a wireless communication system according to an embodiment.

FIG. 37 illustrates operation of a wireless communication system according to an embodiment.

The user terminal 100 determines whether to make a request for CoMP transmission (Step S3702). Assume here that it is determined that CoMP transmission is to be requested.

The user terminal 100 transmits a CoMP transmission request to the serving base station $200_2$ (Step S3704).

Steps S3706-S3726 are substantially the same as Steps S2904-S2924 in FIG. 29.

Second Modified Example

A user terminal 100 selects a non-serving base station if downlink CoMP transmission is to be executed.

Figure 38:
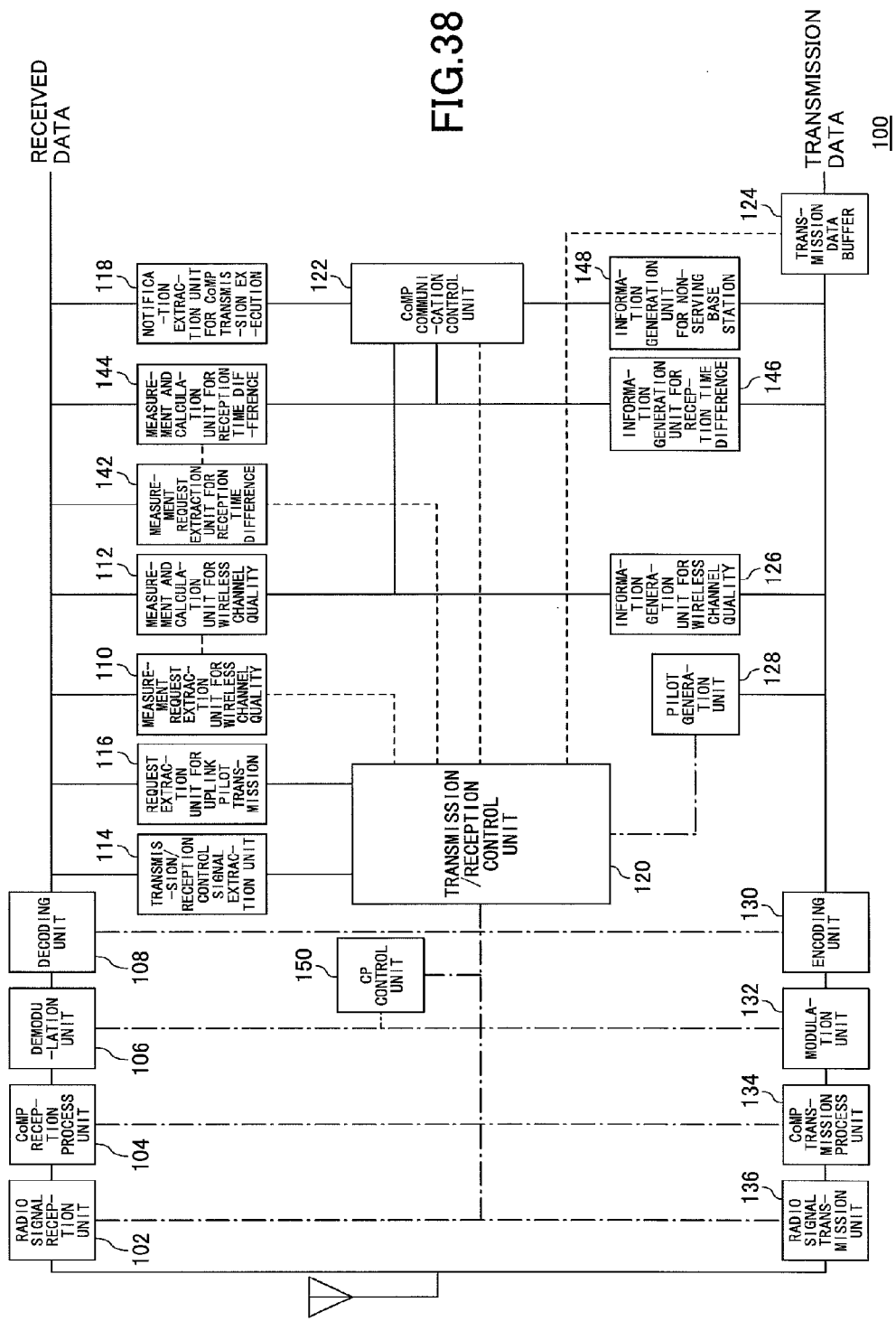
FIG. 38 illustrates an example of a user terminal according to an embodiment.

FIG. 38 illustrates a user terminal 100 according to the second modified example.

The user terminal 100 in the example differs from the one described with reference to FIG. 27 in that an information generation unit for non-serving base station 148 is added. The information generation unit for non-serving base station 148 is connected with the CoMP communication control unit 122 and the encoding unit 130.

The measurement and calculation unit for wireless channel quality 112 measures wireless channel quality from the base stations $200_2$-$200_m$. The measurement and calculation unit for wireless channel quality 112 inputs the measurement result of wireless channel quality into the CoMP communication control unit 122.

The CoMP communication control unit 122 obtains wireless channel quality that has the least difference with the wireless channel quality from the connected base station $200_2$ based on the measurement result of wireless channel quality. The CoMP communication control unit 122 selects a base station as a non-serving base station that has the least difference with the wireless channel quality from the connected base station $200_2$. The CoMP communication control unit 122 notifies information about the base station selected as a non-serving base station to the information generation unit for non-serving base station 148.

The information generation unit for non-serving base station 148 generates non-serving base station information based on the information about the base station selected as a non-serving base station from the CoMP communication control unit 122. The non-serving base station information is encoded by the encoding unit 130, modulated by the modulation unit 132, converted to a wireless frequency by the radio signal transmission unit 136, then transmitted to the base station $200_1$ via the antenna.

Also, the user terminal 100 may transmit to base station $200_1$ the wireless channel quality information that is used for selecting the non-serving base station.

Figure 39:
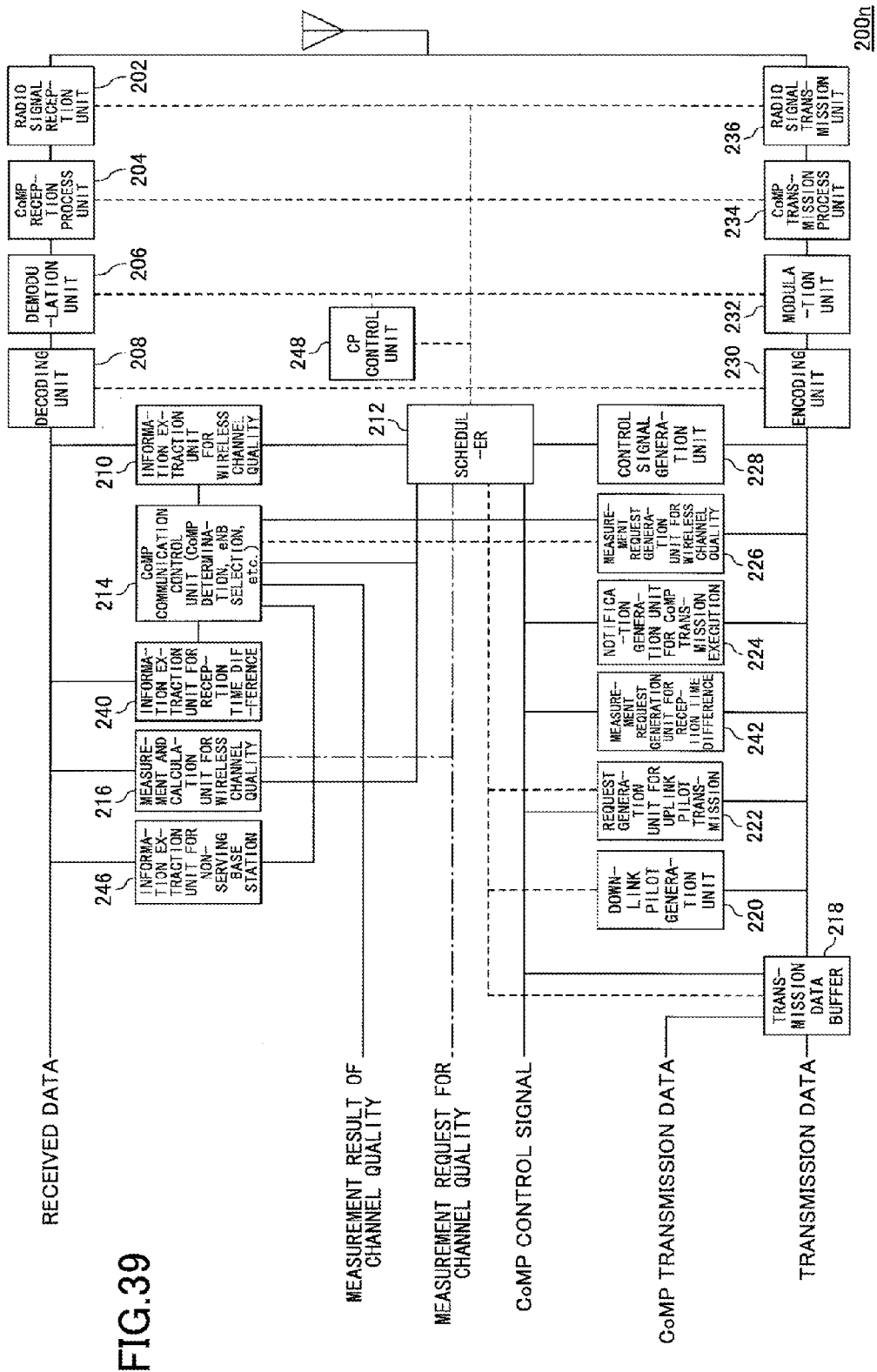
FIG. 39 illustrates an example of a base station according to an embodiment.

FIG. 39 illustrates a base station $200_n$ according to the second modified example.

The base station $200_n$ differs from the one described with reference to FIG. 26 in that an information extraction unit for non-serving base station 246 is added. The information extraction unit for non-serving base station 246 is connected with the decoding unit 208 and the CoMP communication control unit 214.

The information extraction unit for non-serving base station 246 extracts the non-serving base station information notified by the user terminal 100. The information extraction unit for non-serving base station 246 inputs the non-serving base station information into the CoMP communication control unit 214.

The information extraction unit for wireless channel quality 210 extracts the wireless channel quality information notified by the user terminal 100. The information extraction unit for wireless channel quality 210 inputs the wireless channel quality information into the CoMP communication control unit 214.

The CoMP communication control unit 214 determines whether CoMP transmission is feasible based on the non-serving base station information from the information extraction unit for non-serving base station 246 and the wireless channel quality information from the information extraction unit for wireless channel quality 210. If determining that CoMP transmission is feasible, the CoMP communication control unit 214 may select a base station specified in the non-serving base station information as a non-serving base station. Also, if determining that CoMP transmission is feasible, the CoMP communication control unit 214 may select a non-serving base station regardless of the non-serving base station information. If selecting a non-serving base station regardless of the non-serving base station information, a base station included in the non-serving base station information may be set as a candidate of a non-serving base station.

As described above, whether CoMP transmission is required may be determined by the base station $200_1$ or determined by the user terminal 100.

Figure 40:
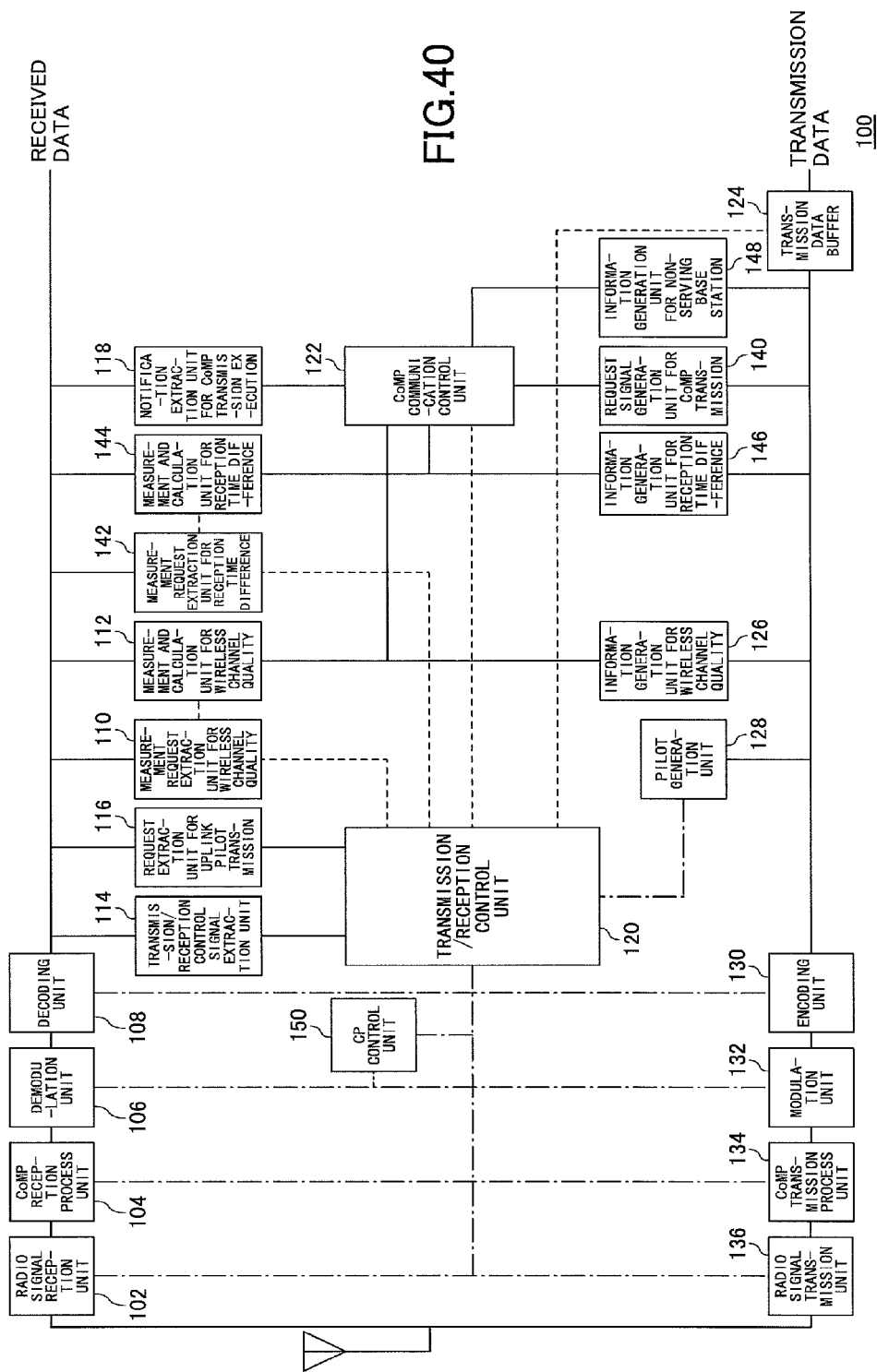
FIG. 40 illustrates an example of a user terminal according to an embodiment.

FIG. 40 illustrates a user terminal 100 according to an embodiment.

The user terminal 100 illustrated in FIG. 40 differs from the one described with reference to FIG. 38 in that a request signal generation unit for CoMP transmission 140 is added. The request signal generation unit for CoMP transmission 140 is connected with the CoMP communication control unit 122 and the encoding unit 130.

Figure 41:
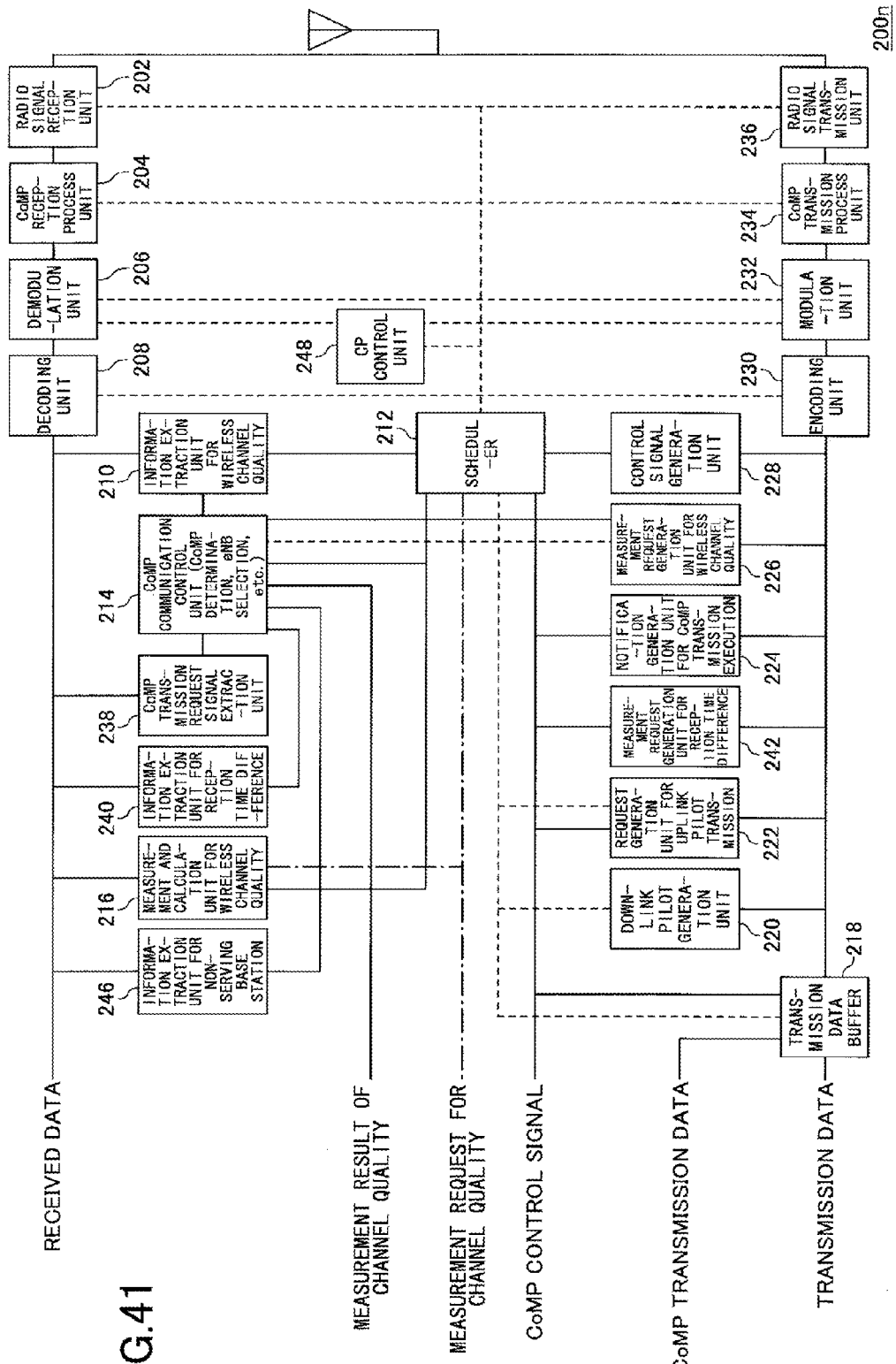
FIG. 41 illustrates an example of a base station according to an embodiment.

FIG. 41 illustrates a base station $200_n$ according to an embodiment.

The base station $200_n$ illustrated in FIG. 41 differs from the one described with reference to FIG. 39 in that a CoMP transmission request signal extraction unit 238 is added. The CoMP transmission request signal extraction unit 238 is connected with the decoding unit 208 and the CoMP communication control unit 214.

In a wireless communication system that includes the user terminal 100 illustrated in FIG. 40 and the base station $200_n$ illustrated in FIG. 41, the user terminal 100 determines whether CoMP transmission is required.

Figure 42:
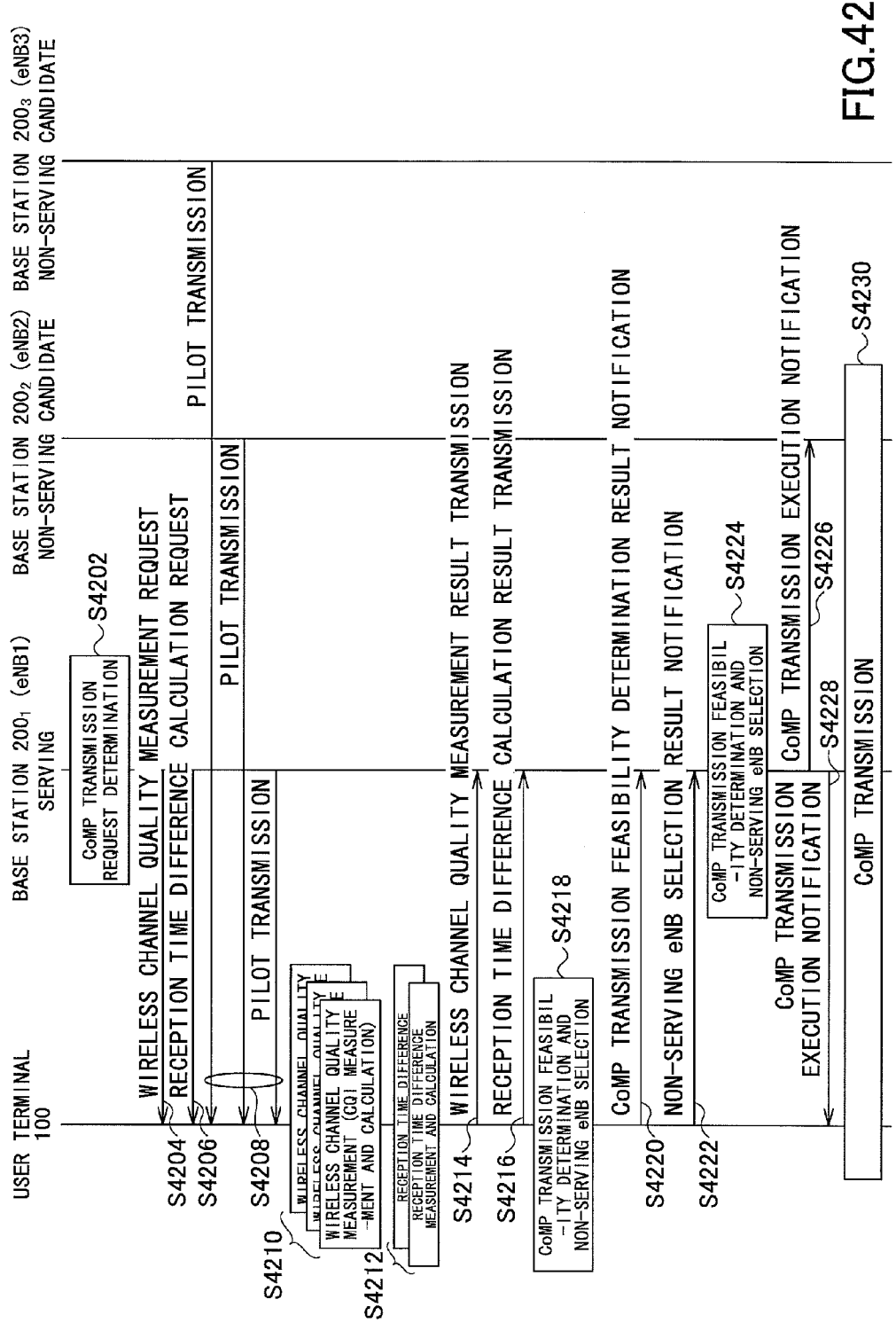
FIG. 42 illustrates an example of operation of a wireless communication system according to an embodiment.

FIG. 42 illustrates operation of a wireless communication system according to an embodiment.

Steps S4202-S4216 are substantially the same as Steps S2902-S2916 in FIG. 29. In the example illustrated in FIG. 42, the user terminal 100 determines whether CoMP transmission is feasible. Moreover, if determining that CoMP transmission is feasible, the user terminal 100 selects a non-serving base station.

The user terminal 100 determines whether CoMP transmission is feasible. Moreover, if determining CoMP transmission is feasible, the user terminal 100 selects a non-serving base station (Step S4218). Namely, the CoMP communication control unit 214 determines whether CoMP transmission is feasible.

The user terminal 100 notifies an notification of determination result whether to execute CoMP transmission that represents the determination result about whether CoMP transmission is feasible, to the serving base station $200_1$ (Step S4220). Namely, the notification of determination result whether to execute CoMP transmission generated by the request signal generation unit for CoMP transmission 140 is transmitted to the serving base station $200_1$.

The user terminal 100 notifies the notification of selection result of non-serving base station that includes the information about the base station selected as a non-serving base station to the serving base station $200_1$ (Step S4222). Namely, the notification of selection result of non-serving base station generated by the information generation unit for non-serving base station 148 is transmitted to the serving base station $200_1$.

The serving base station $200_1$ determines whether CoMP transmission is feasible based on the result notification of wireless channel quality notified by the user terminal 100. Namely, the CoMP communication control unit 214 determines whether CoMP transmission is feasible based on the result notification of wireless channel quality notified by the user terminal 100. If determining CoMP transmission is feasible, the CoMP communication control unit 214 selects a non-serving base station based on the notification of selection result of non-serving base station.

Steps S4226-S4230 are substantially the same as Steps S2920-S2924 in FIG. 29.

Figure 43:
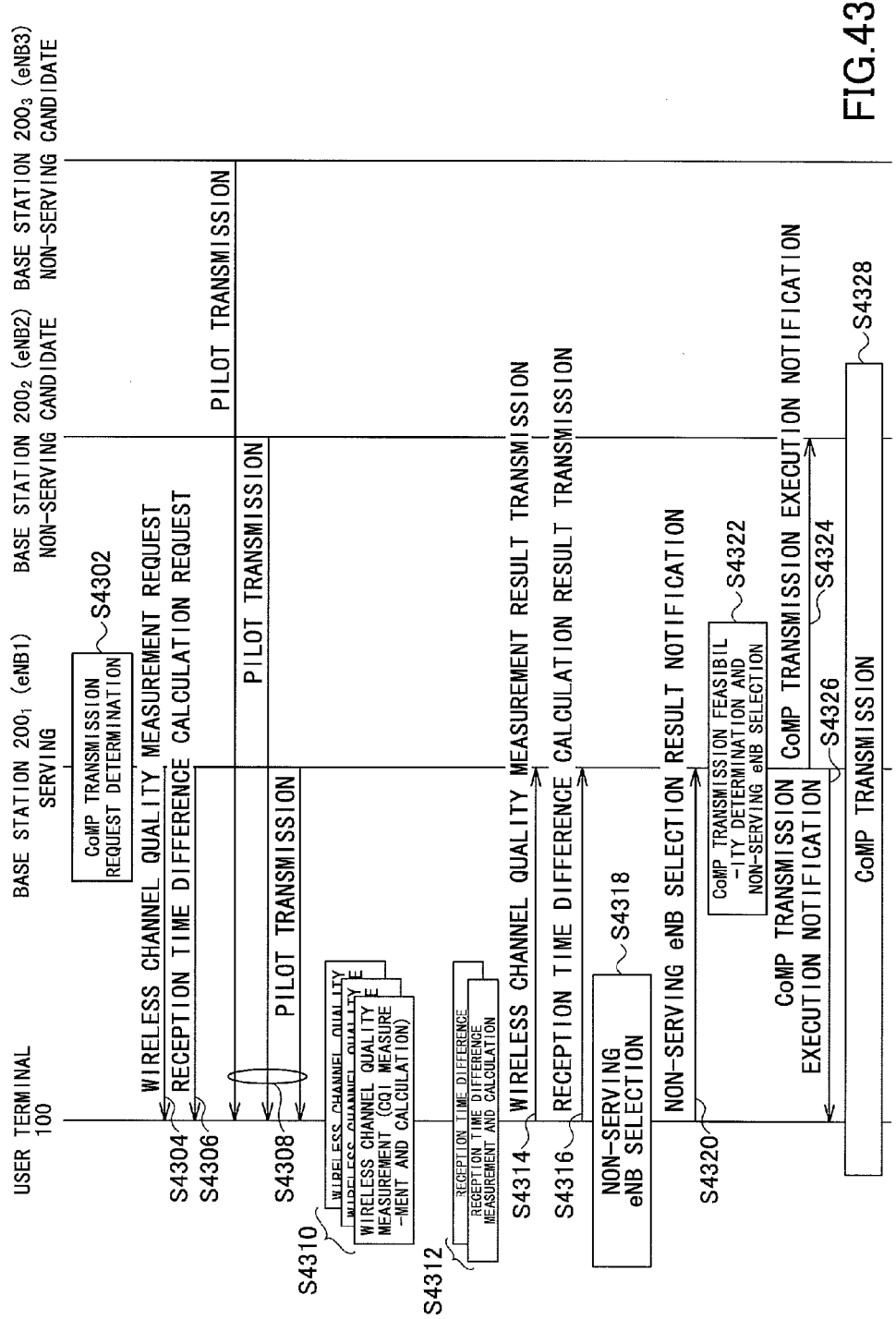
FIG. 43 illustrates an example of operation of a wireless communication system according to an embodiment.

FIG. 43 illustrates operation of a wireless communication system according to an embodiment.

Steps S4302-S4316 are substantially the same as Steps S2902-S2916 in FIG. 29. In the example illustrated in FIG. 43, the user terminal 100 selects a non-serving base station.

The user terminal 100 selects a non-serving base station (Step S4318).

The user terminal 100 notifies the notification of selection result of non-serving base station that includes the information about the base station selected as a non-serving base station to the serving base station $200_1$ (Step S4320). Namely, the notification of selection result of non-serving base station generated by the information generation unit for non-serving base station 148 is transmitted to the serving base station $200_1$.

The serving base station $200_1$ determines whether CoMP transmission is feasible based on the result notification of wireless channel quality notified by the user terminal 100. Namely, the CoMP communication control unit 214 determines whether CoMP transmission is feasible based on the result notification of wireless channel quality notified by the user terminal 100. If determining CoMP transmission is feasible, the CoMP communication control unit 214 selects a non-serving base station based on the notification of selection result of non-serving base station (Step S4322).

Steps S4324-S4328 are substantially the same as Step S2920-S2924 in FIG. 29.

Figure 44:
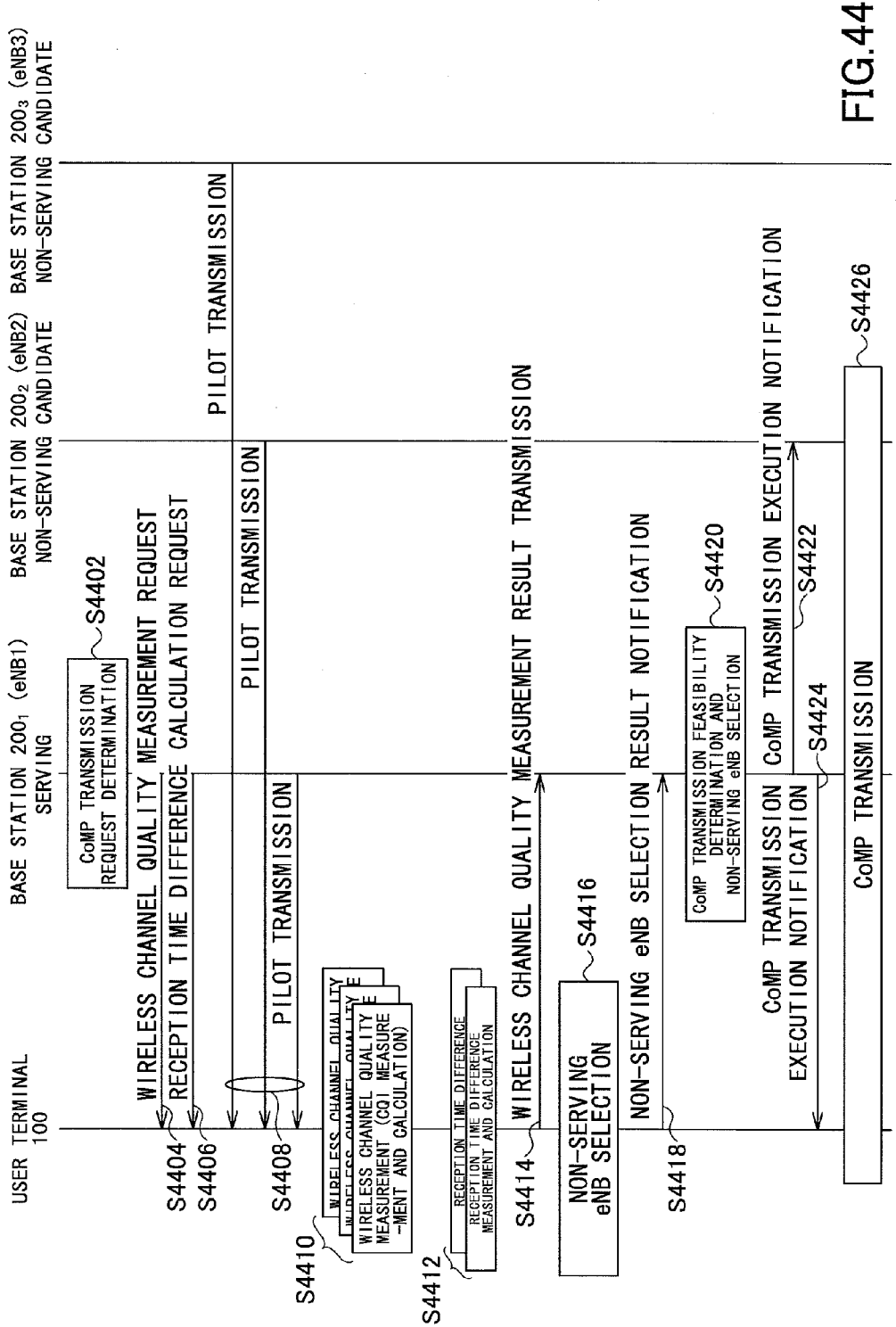
FIG. 44 illustrates an example of operation of a wireless communication system according to an embodiment.

FIG. 44 illustrates operation of a wireless communication system according to an embodiment.

In the example illustrated in FIG. 44, the user terminal 100 selects a non-serving base station. The serving base station $200_1$ selects a base station as a non-serving base station that is selected by the user terminal 100 as a non-serving base station.

Steps S4402-S4414 are substantially the same as Steps S2902-S2914 in FIG. 29.

The user terminal 100 selects a non-serving base station (Step S4416). Namely, the CoMP communication control unit 122 selects a non-serving base station.

The user terminal 100 notifies the notification of selection result of non-serving base station that includes the information about the base station selected as a non-serving base station to the serving base station $200_1$ (Step S4418). Namely, the notification of selection result of non-serving base station generated by the information generation unit for non-serving base station 148 is transmitted to the serving base station $200_1$.

The serving base station $200_1$ determines whether CoMP transmission is feasible based on the result notification of wireless channel quality notified by the user terminal 100 (Step S4420). Namely, the CoMP communication control unit 214 determines whether CoMP transmission is feasible based on the result notification of wireless channel quality notified by the user terminal 100. If determining CoMP transmission is feasible, the CoMP communication control unit 214 selects a non-serving base station based on the notification of selection result of non-serving base station.

Steps S4422-S4426 are substantially the same as Steps S2920-S2924 in FIG. 29.

Third Modified Example

In the modified examples described above, the reception time difference $T_{diff}$ and the threshold value for reception time difference $T_{th}$ may be compared when determining whether CoMP transmission is feasible.

Specifically, the CoMP communication control unit 214 compares the reception time difference $T_{diff}$ and the threshold value for reception time difference $T_{th}$ when determining whether CoMP transmission is feasible. The CoMP communication control unit 214 may determine that CoMP transmission is feasible if the reception time difference $T_{diff}$ is less than the threshold value for reception time difference $T_{th}$. Moreover, if determining CoMP transmission is feasible, the CoMP communication control unit 214 may select a base station as a non-serving base station that has a small difference of wireless channel quality and the reception time difference $T_{diff}$ is less than the threshold value for reception time difference $T_{th}$.

Conversely, the CoMP communication control unit 214 may determine that CoMP transmission is not to be executed if the reception time difference $T_{diff}$ is greater than the threshold value for reception time difference $T_{th}$.

Figure 45:
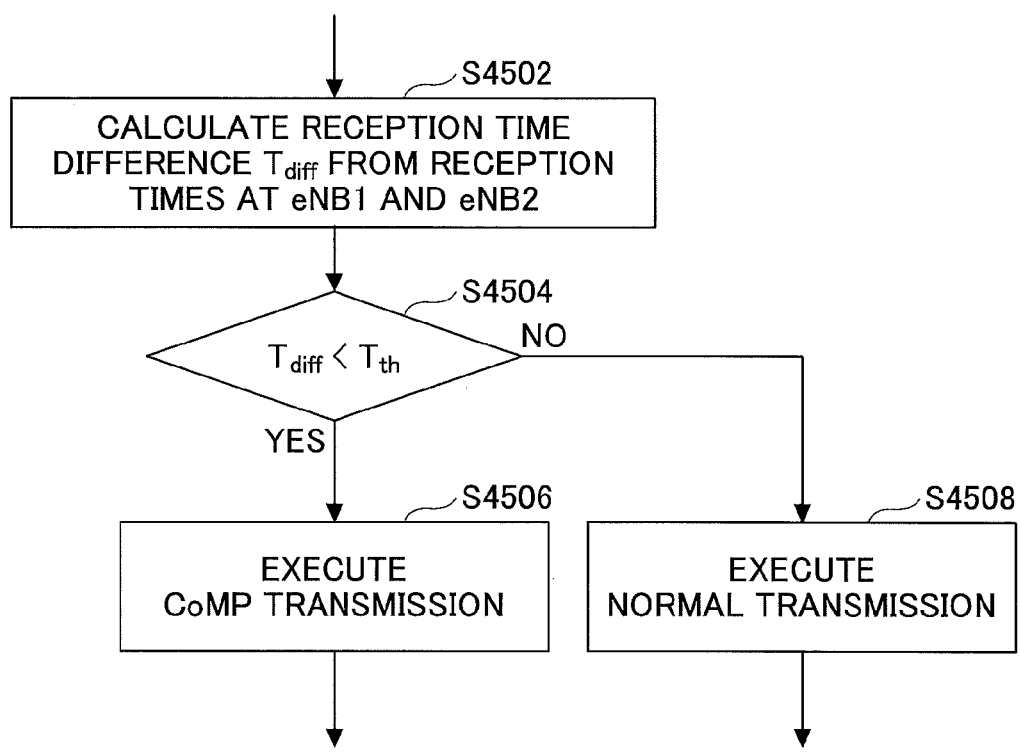
FIG. 45 illustrates an example of operation of a wireless communication system according to an embodiment.

FIG. 45 illustrates a procedure for determining whether CoMP transmission is feasible. FIG. 45 mainly illustrates process steps executed by the CoMP communication control unit 214.

The serving base station $200_1$ calculates a reception time difference $T_{diff}$ between a reception time from the base station $200_1$ (eNB1) and a reception time from the base station $200_2$ (eNB2) (Step S4502).

The serving base station $200_1$ determines whether the reception time difference $T_{diff}$ is less than the threshold value for reception time difference $T_{th}$ (Step S4504).

If the reception time difference $T_{diff}$ is less than the threshold value for reception time difference $T_{th}$ (Step S4504 YES), the serving base station $200_1$ determines that CoMP transmission is feasible (Step S4506). In this case, CoMP transmission is executed.

If the reception time difference $T_{diff}$ is not less than the threshold value for reception time difference $T_{th}$ (Step S4504 NO), the serving base station $200_1$ determines that CoMP transmission is not executed (Step S4508). In this case, currently executing communication is continued.

In the flow illustrated in FIG. 45, although the reception time difference $T_{diff}$ between the reception time from the base station $200_1$ and the reception time from the base station $200_2$ is calculated, a reception time difference between the reception time from the base station $200_1$ and a reception time from a base station other than the base station $200_2$ may be calculated.

Fourth Modified Example

The threshold value for reception time difference may be set depending on a CoMP transmission method.

For example, JT, which is one of CoMP transmission methods, is also called "Network MIMO". JT uses a plurality of base stations to execute downlink MIMO transmission.

When executing MIMO transmission, channel estimation and stream separation are executed at a reception side.

A MIMO stream will be described with an example of downlink 2×2 MIMO using precoding.

In this case, data is partitioned into two sequences of data elements at a transmission side. A signal obtained from a sequence of data elements that have encoding, modulation, and precoding applied is called a stream. In case of 2×2 MIMO, there are two streams. Here, a stream has a meaning that differs from the meaning implied with, for example, a data stream in an application, such as what-is-called streaming. It is noted that the number of antennas does not correspond to streams. For example, transmission diversity is one stream, not two, even if the same data is transmitted from two antennas. To separate a stream, precoding is applied again. Based on a channel estimation result, compensation may be applied.

When executing downlink MIMO transmission, if there is a great reception time difference $T_{diff}$ between base stations at a user terminal, separation accuracy of a stream degrades. Degradation of separation accuracy of a stream degrades transmission quality. Namely, downlink transmission speed is reduced. In a worst case, there is a risk that separation cannot be executed and data transmission cannot be executed. Therefore, if using JT, the threshold value for reception time difference $T_{jt}$ is set to a value that does not induce transmission quality degradation.

Figure 46:
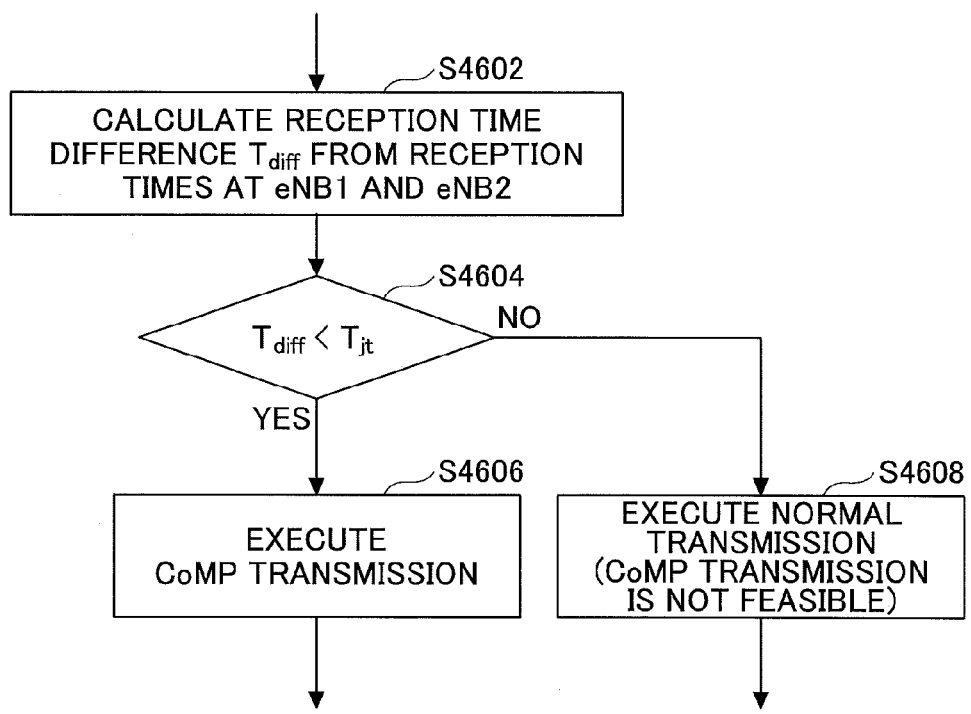
FIG. 46 illustrates an example of operation of a wireless communication system according to an embodiment.

FIG. 46 illustrates a procedure for determining whether JT is feasible as a CoMP transmission method. FIG. 46 mainly illustrates process steps executed by the CoMP communication control unit 214 of a serving base station.

The serving base station $200_1$ calculates a reception time difference $T_{diff}$ between a reception time from the base station $200_1$ (eNB1) notified by a user terminal and a reception time from the base station $200_2$ (eNB2) notified by the user terminal similarly (Step S4602).

The serving base station $200_1$ determines whether the reception time difference $T_{diff}$ is less than a threshold value for reception time difference $T_{jt}$ for JT (Step S4604).

If the reception time difference $T_{diff}$ is less than the threshold value for reception time difference $T_{jt}$ (Step S4604 YES), the serving base station $200_1$ determines that JT is feasible as a CoMP transmission method (Step S4606). In this case, JT is executed.

If the reception time difference $T_{diff}$ is not less than the threshold value for reception time difference $T_{jt}$ (Step S4604 NO), the serving base station $200_1$ determines not to execute CoMP transmission (Step S4608). In this case, currently executing communication is continued.

In the flow illustrated in FIG. 46, although the reception time difference $T_{diff}$ between the reception time from the base station $200_1$ and the reception time from the base station $200_2$ at the user terminal is calculated, a reception time difference between the reception time from the base station $200_1$ and a reception time from a base station other than the base station $200_2$ may be calculated.

Also, using CS/CB as a CoMP transmission method, transmission to a user terminal is coordinated between a first base station and a second base station where the first base station covers a first cell, and the second base station covers a cell adjacent to or overlapping with the cell covered by the first base station, and the terminal is positioned around an edge of one or more of the cells.

Interference can be reduced with coordinated scheduling or with coordinated beam forming.

Coordinated scheduling is called "CS" and coordinated beam forming is called "CB".

Using CS/CB, data transmission to the user terminal 100 is executed by one of a serving base station or a non-serving base station that executes downlink CoMP transmission. Therefore, the threshold value for reception time difference $T_{cscb}$ is less strict than that of JT.

CS/CB requires time for switching a receiving beam or for switching a base station, hence it is preferable to set a greater time difference than the threshold value for reception time difference $T_{jt}$ for JT.

The threshold value for reception time difference $T_{th}$ is set with taking the above factors taking into account. Whether CoMP transmission is feasible is determined based on the threshold value for reception time difference $T_{th}$, and if it is determined that CoMP transmission is feasible, a non-serving base station is selected.

Figure 47:
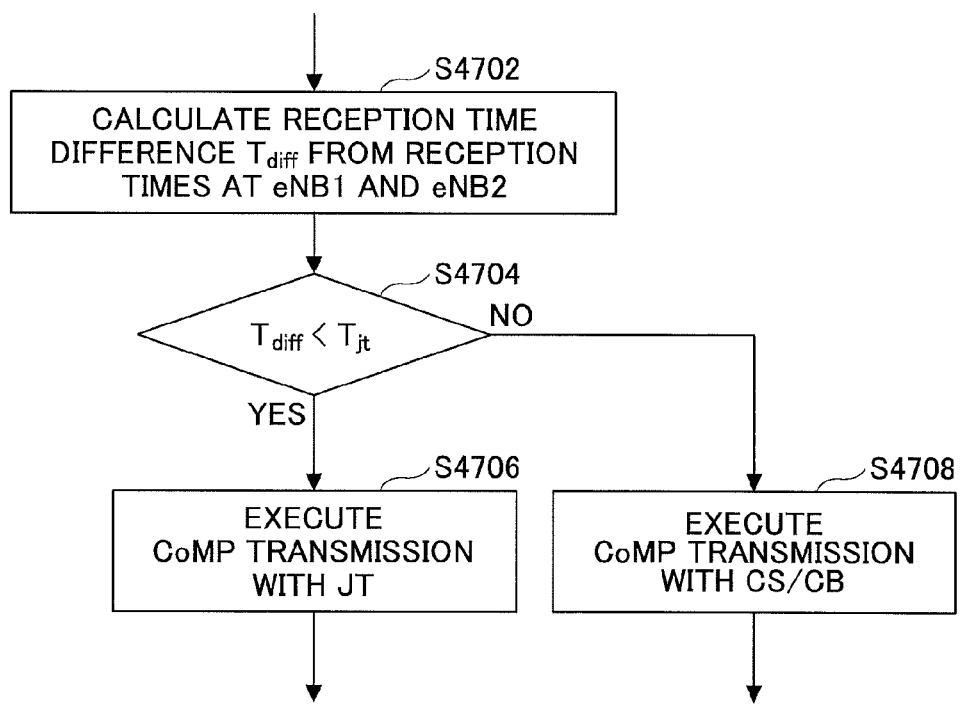
FIG. 47 illustrates an example of operation of a wireless communication system according to an embodiment.

FIG. 47 illustrates a procedure for determining whether CoMP transmission is feasible. FIG. 47 mainly illustrates process steps executed by the CoMP communication control unit 214.

The serving base station 200₁ calculates a reception time difference $T_{diff}$ between a reception time from the base station 200₁ (eNB1) notified by a user terminal 100 and a reception time from the base station 200₂ (eNB2) notified by the user terminal 100 similarly (Step S4702).

The serving base station 200₁ determines whether the reception time difference $T_{diff}$ is less than a threshold value for reception time difference $T_{jt}$ (Step S4704).

If the reception time difference $T_{diff}$ is less than the threshold value for reception time difference $T_{jt}$ (Step S4704 YES), the serving base station 200₁ determines that CoMP transmission is feasible (Step S4606). In this case, CoMP transmission is executed using JT.

If the reception time difference $T_{diff}$ is not less than the threshold value for reception time difference $T_{jt}$ (Step S4704 NO), the serving base station 200₁ determines to execute CoMP transmission using CS/CB (Step S4708).

In the flow illustrated in FIG. 47, although the reception time difference $T_{diff}$ between the reception time from the base station 200₁ and the reception time from the base station 200₂ is calculated, a reception time difference between the reception time from the base station 200₁ and a reception time from a base station other than the base station 200₂ may be calculated.

Figure 48:
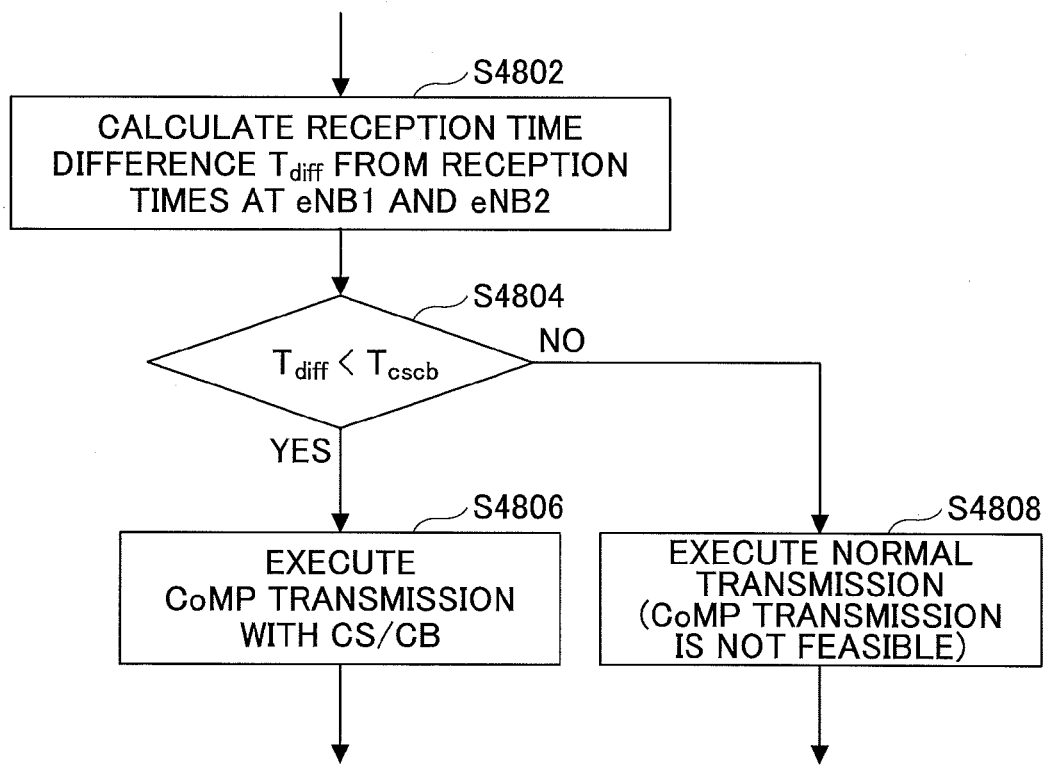
FIG. 48 illustrates an example of operation of a wireless communication system according to an embodiment.

FIG. 48 illustrates a procedure for determining whether CoMP transmission is feasible. FIG. 48 mainly illustrates process steps executed by the CoMP communication control unit 214.

The serving base station 200₁ calculates a reception time difference $T_{diff}$ between a reception time from the base station 200₁ (eNB1) notified by a user terminal 100 and a reception time from the base station 200₂ (eNB2) notified by the user terminal 100 similarly (Step S4802).

The serving base station 200₁ determines whether the reception time difference $T_{diff}$ is less than a threshold value for reception time difference $T_{cscb}$ (Step S4804).

If the reception time difference $T_{diff}$ is less than the threshold value for reception time difference $T_{cscb}$ (Step S4804 YES), the serving base station 200₁ determines that CoMP transmission is feasible using CS/CB (Step S4806). In this case, CoMP transmission is executed using CS/CB.

If the reception time difference $T_{diff}$ is not less than the threshold value for reception time difference $T_{cscb}$ (Step S4804 NO), the serving base station 200₁ determines not to execute CoMP transmission (Step S4808). In this case, currently executing communication is continued.

In the flow illustrated in FIG. 48, although the reception time difference $T_{diff}$ between the reception time from the base station 200₁ and the reception time from the base station 200₂ is calculated, a reception time difference between the reception time from the base station 200₁ and a reception time from a base station other than the base station 200₂ may be calculated.

Fifth Modified Example

A CoMP transmission method may be switched depending on a threshold value for reception time difference.

A case will be described as an example where one of JT and CS/CB is used as a CoMP transmission method.

For example, as a threshold value for reception time difference between base stations at a user terminal notified by a user terminal, a threshold value for reception time difference $T_{jt}$ is set that does not induce transmission quality degradation with JT.

The CoMP communication control unit 214 of the serving base station 200₁ selects a CoMP transmission method based on the threshold value for reception time difference $T_{jt}$. Specifically, the CoMP communication control unit 214 selects JT if the reception time difference $T_{diff}$ is less than the threshold value for reception time difference $T_{jt}$, otherwise, selects CS/CB. The CoMP communication control unit 214 may determine whether CoMP transmission is feasible, and select a CoMP transmission method. Also, the CoMP communication control unit 214 determines whether CoMP transmission is feasible, and if determining it is feasible, the CoMP communication control unit 214 may select a CoMP transmission method. Also, the CoMP communication control unit 214 may select a CoMP transmission method first, then determine whether CoMP transmission is feasible.

Also, when selecting a CoMP transmission method, the CoMP communication control unit 214 may select it based on QoS of transmission data or QoS class. For example, even if JT is required to be executed to satisfy required transmission speed or required maximum transmission delay specified by QoS or attributes of QoS class, CoMP transmission is not executed as long as the reception time difference $T_{diff}$ is greater than the threshold value $T_{jt}$. Conversely, if the reception time difference $T_{diff}$ is less than the threshold value $T_{jt}$, CoMP transmission is feasible.

Also, one of JT and DCS or one of CS/CB and DCS may be selected as a CoMP transmission method.

Also, if one of JT and CS is used as a CoMP transmission method for uplink CoMP transmission, a threshold value for reception time difference $T_{jt}$ is set for differences of reception times between the serving base station and other base stations.

Sixth Modified Example

The threshold value for reception time difference may be set for each CoMP transmission method.

A case will be described as an example where one of JT and CS/CB is used as a CoMP transmission method.

For example, as threshold values for reception time difference between base stations at a user terminal notified by the user terminal, a threshold value for reception time difference $T_{jt}$ is set that does not induce transmission quality degradation with JT, and a threshold value for reception time difference $T_{cscb}$ is set that does not induce transmission quality degradation with CS/CB.

The CoMP communication control unit 214 of the serving base station selects a CoMP transmission method based on the threshold values for reception time difference. Specifically, the CoMP communication control unit 214 selects JT if the reception time difference $T_{diff}$ is smaller than the threshold value for reception time difference $T_{jt}$. The CoMP communication control unit 214 selects CS/CB if the reception time difference $T_{diff}$ is greater than the threshold value for reception time difference $T_{jt}$ and less than reception time threshold value $T_{cscb}$. The CoMP communication control unit 214 determines not to execute CoMP transmission if the reception time difference $T_{diff}$ is greater than the reception time threshold value $T_{cscb}$.

FIG. 49 illustrates a procedure for determining whether CoMP transmission is feasible. FIG. 49 mainly illustrates process steps executed by the CoMP communication control unit 214.

The serving base station 200₁ calculates a reception time difference $T_{diff}$ between a reception time from the base station 200₁ (eNB1) notified by a user terminal 100 and a reception time from the base station 200₂ (eNB2) notified by the user terminal 100 similarly (Step S4902).

The serving base station 200₁ determines whether the reception time difference $T_{diff}$ is less than the threshold value for reception time difference $T_{jt}$ (Step S4904).

If the reception time difference $T_{diff}$ at the user terminal is less than the threshold value for reception time difference $T_{jt}$ (Step S4904 YES), the serving base station 200₁ determines to execute CoMP transmission using JT (Step S4906).

If the reception time difference $T_{diff}$ at the user terminal is not less than the threshold value for reception time difference $T_{jt}$ (Step S4904 NO), the serving base station 200₁ determines whether the reception time difference $T_{diff}$ at the user terminal is less than the threshold value for reception time difference $T_{cscb}$ (Step S4908).

If the reception time difference $T_{diff}$ is less than the threshold value for reception time difference $T_{cscb}$ (Step S4908 YES), the serving base station 200₁ determines that CoMP transmission is feasible using CS/CB (Step S4910).

If the reception time difference $T_{diff}$ is not less than the threshold value for reception time difference $T_{cscb}$ (Step S4908 NO), the serving base station 200₁ determines not to execute CoMP transmission (Step S4912). In this case, currently executing communication is continued.

In the flow illustrated in FIG. 49, although the reception time difference $T_{diff}$ between the reception time from the base station 200₁ notified by the user terminal and the reception time from the base station 200₂ notified by the user terminal is calculated, a reception time difference between the reception time from the base station 200₁ notified by the user terminal and a reception time from a base station other than the base station 200₂ notified by the user terminal may be calculated.

Also, for a case where one of JT and DCS is used, threshold values for reception time difference may be set. Also, for a case where one of JT, DCS, and CB/CS is used, respective threshold values for reception time difference may be set.

Moreover, if one of JR and CS is used as a CoMP transmission method for uplink CoMP transmission, a threshold value for reception time difference $T_{jt}$ may be set for a difference of reception times between the serving base station and other base stations. In this way, a CoMP transmission method can be selected for uplink similarly to downlink.

According to the embodiments and modified examples described above, a wireless communication system can execute coordinated communication between a plurality of base stations and mobile stations where the base stations include a primary base station and the other base stations. When the wireless communication system configures a set of transmission stations and reception stations of coordinated communication, one of the reception stations of the coordinated communication transmits information about a result of measuring a known signal as a pilot from the transmission stations in response to request signals from the other stations, respectively, to the primary base station.

In case of uplink coordinated communication, the primary base station transmits a start request for coordinated communication to a mobile station. In case of uplink coordinated communication, the transmission station is a mobile station, and the reception stations are the primary base station and the other base stations. Namely, in this case, the "reception stations of coordinated communication" include "the other base stations", "the other stations" includes "the primary base station", and "transmission stations" includes "a mobile station".

According to at least one of the embodiments, it is possible to determine whether coordinated communication is feasible between base stations. Also, coordinated communication can be executed between base stations. Moreover, using reception time difference, it is possible to determine whether coordinated communication is feasible between base stations.

Also, a CP can be selected for coordinated communication between base stations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a primary base station;
   a plurality of base stations other than the primary base station; and
   a mobile station,
   wherein coordinated communication is executed among the primary base station, the plurality of base stations, and the mobile station, wherein
   when configuring a set of one or more transmission stations and one or more reception stations of the coordinated communication, one of the reception stations of the coordinated communication transmits information about a result of measuring a known signal as a pilot from the transmission stations in response to request signals from the other base stations, respectively, to the primary base stationl;
   the information about the result of the measuring transmitted from the one of the reception stations of the coordinated communication to the primary base station includes a timing when the one of the reception stations of the coordinated communication receives the known signal; and
   in response to receiving the information about the result of the measuring, the primary base station notifies an execution of the coordinated communication to the transmission stations and the reception stations based on a reception time difference of the known signal between the transmission stations based on timings when the known signal included in the information about the result of the measuring is received at the transmission stations, respectively.

2. The wireless communication system according to claim 1, wherein
in response to receiving the information about the result of the measuring, the primary base station notifies the execution of the coordinated communication based also on the information about the result of the measuring.

3. The wireless communication system according to claim 1, wherein
in response to receiving the information about the result of the measuring, the primary base station notifies information about a structure of a wireless frame depending on the information about the result of the measuring to the transmission stations and the reception stations.

4. A wireless communication method for coordinated communication among a primary base station, a plurality of other base stations, and a mobile station, the method comprising:
when configuring a set of one or more transmission stations and one or more reception stations of the coordinated communication, having one of the reception stations of the coordinated communication transmit information about a result of measuring a known signal as a pilot from the transmission stations in response to request signals from the other base stations, respectively, to the primary base station, wherein
the information about the result of the measuring transmitted from the one of the reception stations of the coordinated communication to the primary base station includes a timing when the one of the reception stations of the coordinated communication receives the known signal; and
in response to receiving the information about the result of the measuring, the primary base station notifies an execution of the coordinated communication to the transmission stations and the reception stations based on a reception time difference of the known signal between the transmission stations based on timings when the known signal included in the information about the result of the measuring is received at the transmission stations, respectively.

5. The wireless communication system according to claim 1, wherein
one of the transmission stations transmits request signals to one of the reception stations, in response to a coordinated communication signal from the one of the reception stations.

6. The wireless communication system according to claim 2, wherein
the primary base station notifies the execution of the coordinated communication, and then, transmits transmission data to the transmission stations notified with the execution of the coordinated communication, the transmission data being to be transmitted to one of the reception stations from the transmission stations.

7. The wireless communication system according to claim 1, wherein
the primary base station is a base station connected with the mobile station.

8. The wireless communication system according to claim 1, wherein
the information about the result of the measuring includes information about wireless channel quality.

9. The wireless communication system according to claim 1, wherein
the primary base station notifies the execution of the coordinated communication, and then, transmits information about wireless resources and transmission timing, to the transmission stations.

10. The wireless communication system according to claim 3, wherein
the information about the structure of the wireless frame includes information about a length of cyclic prefix.

\* \* \* \* \*